US009701820B2

(12) United States Patent
Shibata et al.

(10) Patent No.: US 9,701,820 B2
(45) Date of Patent: Jul. 11, 2017

(54) NATURAL RUBBER-CONTAINING THERMOPLASTIC RESIN COMPOSITION AND MOLDED ARTICLE THEREOF

(71) Applicants: Toray Industries, Inc., Tokyo (JP); Toray Plastics (Malaysia) Sdn. Bhd., Prai (MY)

(72) Inventors: Takuya Shibata, Ichihara (JP); Masafumi Koyama, Ichihara (JP); Takamasa Owaki, Ichihara (JP); Nobuaki Shirakawa, Ichihara (JP); Yoshiyasu Naito, Ichihara (JP); Akira Saito, Ichihara (JP); Tadakatsu Takasaki, Ichihara (JP); Kosuke Shirotani, Ichihara (JP); Takashi Ueda, Ichihara (JP); Akira Morito, Ichihara (JP)

(73) Assignees: Toray Industries, Inc. (JP); Toray Plastics (Malaysia) Sdn. Bhd. (MY)

( * ) Notice: Subject to any disclaimer, the term of this patent is extended or adjusted under 35 U.S.C. 154(b) by 0 days.

(21) Appl. No.: 14/427,745

(22) PCT Filed: Sep. 20, 2013

(86) PCT No.: PCT/JP2013/075456

§ 371 (c)(1),
(2) Date: Mar. 12, 2015

(87) PCT Pub. No.: WO2014/050734

PCT Pub. Date: Apr. 3, 2014

(65) Prior Publication Data

US 2015/0247026 A1 Sep. 3, 2015

(30) Foreign Application Priority Data

| | | |
|---|---|---|
| Sep. 25, 2012 | (JP) | 2012-210531 |
| Feb. 21, 2013 | (JP) | 2013-032086 |
| Feb. 28, 2013 | (JP) | 2013-038538 |
| Mar. 15, 2013 | (JP) | 2013-053350 |
| May 29, 2013 | (JP) | 2013-112654 |
| May 31, 2013 | (JP) | 2013-115264 |
| Jun. 4, 2013 | (JP) | 2013-117785 |

(51) Int. Cl.

| | |
|---|---|
| ***C08L 7/00*** | (2006.01) |
| ***C08L 25/08*** | (2006.01) |
| ***C08L 33/14*** | (2006.01) |
| ***C08L 51/04*** | (2006.01) |
| ***C08L 67/02*** | (2006.01) |
| ***C08F 253/00*** | (2006.01) |
| ***C08L 25/12*** | (2006.01) |
| *C08L 33/08* | (2006.01) |
| *C08L 35/06* | (2006.01) |

(52) U.S. Cl.

CPC .............. *C08L 7/00* (2013.01); *C08F 253/00* (2013.01); *C08L 25/08* (2013.01); *C08L 25/12* (2013.01); *C08L 33/14* (2013.01); *C08L 51/04* (2013.01); *C08L 67/02* (2013.01); *C08L 33/08* (2013.01); *C08L 35/06* (2013.01)

(58) Field of Classification Search

None

See application file for complete search history.

(56) References Cited

U.S. PATENT DOCUMENTS

| | | | | |
|---|---|---|---|---|
| 2011/0224351 A1 | 9/2011 | Mori et al. | | |
| 2015/0307694 A1* | 10/2015 | Kwampian | C08L 55/02 | 524/504 |

FOREIGN PATENT DOCUMENTS

| | | | |
|---|---|---|---|
| CN | 102239194 | | 11/2011 |
| JP | 1-163243 | | 6/1989 |
| JP | 01-163243 | A | 6/1989 |
| JP | 4-100809 | | 4/1992 |
| JP | 04-100809 | A | 4/1992 |
| JP | 06-056902 | A | 3/1994 |
| JP | 3294903 | B2 | 4/2002 |
| JP | 2004-099696 | A | 4/2004 |
| JP | 2009-084333 | A | 4/2009 |
| JP | 2011-225791 | | 11/2011 |
| JP | 2011-225792 | * | 11/2011 |
| JP | 2011-225792 | A | 11/2011 |
| WO | 2011/132794 | A1 | 10/2011 |
| WO | 2011/132795 | A1 | 10/2011 |
| WO | WO 2011132795 | * | 10/2011 |

OTHER PUBLICATIONS

Techno Polymer, electronic translation of the specifcation of JP 2011-225792, Nov. 2011.*

The First Office Action dated May 3, 2016, of corresponding Chinese Application No. 201380049958.3, along with an English translation.

Notification of Reasons for Refusal drafted Dec. 24, 2015 from corresponding Japanese Patent Application No. 2014-538463 along with its English translation.

* cited by examiner

*Primary Examiner* — Jeffrey Mullis

(74) *Attorney, Agent, or Firm* — DLA Piper LLP (US)

(57) ABSTRACT

A natural rubber-containing thermoplastic resin composition includes a graft copolymer (A) obtained by graft-polymerizing a vinyl monomer mixture (a) including at least an aromatic vinyl monomer to a rubbery polymer (R) composed of 10 to 70% by mass of a natural rubber having a weight average particle size of 0.3 to 1.2 μm and 30 to 90% by mass of a synthetic rubber having a weight-average particle size of 0.2 to 0.4 μm, wherein particles of the natural rubber include not less than 5% by mass of natural rubber articles with a size of 1.0 μm or larger; and particles of the rubbery polymer (R) with a size of 1.0 μm or larger have an internal graft ratio of 20% or higher.

20 Claims, 1 Drawing Sheet

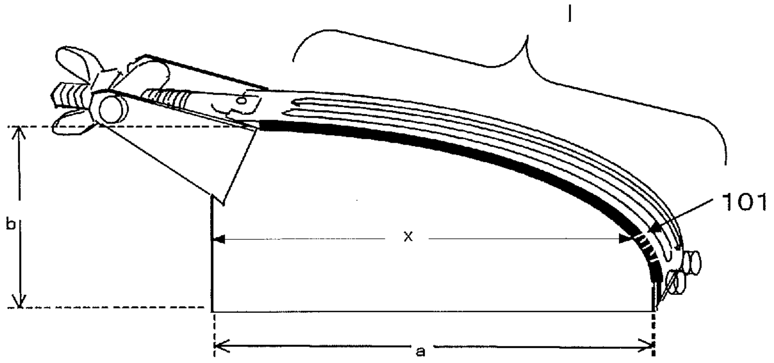
I
101
b
x
a

NATURAL RUBBER-CONTAINING THERMOPLASTIC RESIN COMPOSITION AND MOLDED ARTICLE THEREOF

TECHNICAL FIELD

This disclosure relates to a natural rubber-containing thermoplastic resin composition and a molded article thereof.

BACKGROUND

Thermoplastic resin compositions used in fields such as automobile materials, home electric appliances and general merchandise are demanded to have a good balance between mechanical strength such as impact resistance and rigidity, and moldability. Therefore, rubbery polymer-containing rubber-reinforced thermoplastic resin compositions represented by high-impact polystyrenes (HIPS) and acrylonitrile-butadiene-styrene (ABS) resins are widely utilized.

Meanwhile, from the viewpoint of achieving carbon neutrality, there is an increasing need for a resin composition utilizing a naturally-occurring material represented by polylactic acid. One example of application of a naturally-occurring material to a rubbery polymer-containing thermoplastic resin composition is a technology that substitutes a synthetic rubber used as a rubbery polymer such as polybutadiene, with a natural rubber.

WO 2011/132795 describes a rubbery polymer-containing ABS resin comprising a deproteinized natural rubber having a nitrogen content of 0.1% by mass or less and a synthetic rubber. However, WO '795 explains that deproteinization of natural rubber latex by a known deproteinization method is necessary because impurities contained in natural rubber, particularly proteins, interfere with graft polymerization reaction. Furthermore, WO '795 explains that a high impact resistance-improving effect could not be obtained by using undeproteinized natural rubber latex. As natural rubber deproteinization methods, specifically, a method of degrading proteins by an addition of a proteinase to a natural rubber latex (JP H6-56902 A), a method of washing a natural rubber with a surfactant (JP 2004-99696 A) and a method of degrading proteins by an addition of an urea-based protein denaturant to a natural rubber latex (JP 2009-84333 A) have been disclosed.

Deproteinization of a natural rubber is a complicated process. Therefore, practical application of a deproteinized natural rubber as a rubbery polymer (R) of a rubber-reinforced thermoplastic resin composition such as HIPS or ABS resin is difficult at an industrial level. In view of this, it could be helpful to provide a natural rubber-containing thermoplastic resin composition having an excellent balance of physical properties in terms of impact resistance, fluidity and color tone, by using a natural rubber latex, but without requiring a complicated deproteinization treatment of a natural rubber.

SUMMARY

We thus provide:

A first composition group relates a natural rubber-containing thermoplastic resin composition comprising a graft copolymer (A) and is constituted by the below-described composition (1) as well as compositions (2) to (5):

(1) A natural rubber-containing thermoplastic resin composition, comprising a graft copolymer (A) obtained by graft-polymerizing a vinyl monomer mixture (a) comprising at least an aromatic vinyl monomer to a rubbery polymer (R) composed of 10 to 70% by mass of a natural rubber having a weight-average particle size in a range of 0.3 to 1.2 μm and 30 to 90% by mass of a synthetic rubber having a weight-average particle size in a range of 0.2 to 0.4 μm, wherein particles of the natural rubber include not less than 5% by mass of natural rubber particles with a size of 1.0 μm or larger; and particles of the rubbery polymer (R) with a size of 1.0 μm or larger have an internal graft ratio of 20% or higher.

(2) The natural rubber-containing thermoplastic resin composition according to (1), wherein the graft copolymer (A) is obtained by graft-polymerizing 35 to 95 parts by mass of the vinyl monomer mixture (a) to 5 to 65 parts by mass of the rubbery polymer (R); and the vinyl monomer mixture (a) composed of 60 to 80% by mass of the aromatic vinyl monomer, 20 to 40% by mass of a cyanovinyl monomer and 0 to 20% by mass, preferably 0 to 10% by mass, of a vinyl monomer copolymerizable with these monomers.

(3) The natural rubber-containing thermoplastic resin composition according to (1), wherein the graft copolymer (A) is obtained by graft-polymerizing 40 to 60 parts by mass of the vinyl monomer mixture (a) to 40 to 60 parts by mass of the rubbery polymer (R); and the vinyl monomer mixture (a) composed of 60 to 80% by mass of the aromatic vinyl monomer, 20 to 40% by mass of a cyanovinyl monomer and 0 to 20% by mass, preferably 0 to 10% by mass, of a vinyl monomer copolymerizable with these monomers.

(4) A method of producing the natural rubber-containing thermoplastic resin composition according to any one of (1) to (3), the method comprising, in graft polymerization of the vinyl monomer mixture (a) to the rubbery polymer (R) comprising the natural rubber, the steps of: bringing not less than 10% by mass of the vinyl monomer mixture (a) into contact with the rubbery polymer (R) for 30 minutes or longer; and subsequently graft-polymerizing the vinyl monomer mixture (a) to the rubbery polymer (R).

(5) A molded article, obtained by molding the natural rubber-containing thermoplastic resin composition according to any one of (1) to (3).

A second composition group relates to a natural rubber-containing thermoplastic resin composition comprising a styrene-based resin (I) obtained by mixing the above-described graft copolymer (A) and the below-described vinyl-based copolymer (B-1) and is constituted by the below-described composition (1) as well as compositions (2) to (5):

(1) A natural rubber-containing thermoplastic resin composition, comprising a styrene-based resin (I) obtained by mixing the graft copolymer (A) and a vinyl-based copolymer (B-1) obtained by copolymerizing a vinyl monomer mixture (b-1) comprising at least an aromatic vinyl monomer.

(2) The natural rubber-containing thermoplastic resin composition according to (1), wherein the vinyl monomer mixture (b-1) is composed of 60 to 80% by mass of the aromatic vinyl monomer, 20 to 40% by mass of a cyanovinyl monomer and 0 to 20% by mass, preferably 0 to 10% by mass, of a vinyl monomer copolymerizable with these monomers.

(3) The natural rubber-containing thermoplastic resin composition according to (1) or (2), comprising 5 to 50% by mass of the rubbery polymer (R) in a total of 100% by mass of the graft copolymer (A) and the vinyl-based copolymer (B-1) that constitute the styrene-based resin (I).

(4) The natural rubber-containing thermoplastic resin composition according to any one of (1) to (3), comprising 10 to 50 parts by mass of the graft copolymer (A) and 90 to 50 parts by mass of the vinyl-based copolymer (B-1).

(5) A molded article, obtained by molding the natural rubber-containing thermoplastic resin composition according to any one of (1) to (4).

The third composition group relates to a natural rubber-containing thermoplastic resin composition comprising: the styrene-based resin (I) comprising the graft copolymer (A); and an ethylene-carbon monoxide-(meth)acrylate copolymer (C), and is constituted by the below-described composition (1) as well as compositions (2) to (5):

(1) A natural rubber-containing thermoplastic resin composition, comprising: the styrene-based resin (I) comprising the graft copolymer (A); and an ethylene-carbon monoxide-(meth)acrylate copolymer (C), wherein the natural rubber-containing thermoplastic resin composition comprises the ethylene-carbon monoxide-(meth)acrylate copolymer (C) in an amount of 0.5 to 6.0 parts by mass with respect to 100 parts by mass of the styrene-based resin (I) comprising the graft copolymer (A).

(2) The natural rubber-containing thermoplastic resin composition according to (1), comprising the rubbery polymer (R) in an amount of 5 to 50 parts by mass with respect to 100 parts by mass of the styrene-based resin (I).

(3) The natural rubber-containing thermoplastic resin composition according to (1) or (2), wherein the styrene-based resin (I) further comprises the vinyl-based copolymer (B-1) and the amount thereof is 90 to 50 parts by mass with respect to 10 to 50 parts by mass of the graft copolymer (A).

(4) The natural rubber-containing thermoplastic resin composition according to (3), wherein the styrene-based resin (I) comprises: the graft copolymer (A); and the vinyl-based copolymer (B-1) obtained by copolymerizing a vinyl monomer mixture (b-1) composed of 60 to 80% by mass of an aromatic vinyl monomer, 20 to 40% by mass of a cyanovinyl monomer and 0 to 20% by mass, preferably 0 to 10% by mass, of a vinyl monomer copolymerizable with these monomers.

(5) A molded article, obtained by molding the natural rubber-containing thermoplastic resin composition according to any one of (1) to (4).

A fourth composition group relates to a natural rubber-containing thermoplastic resin composition, comprising: a styrene-based resin (I) comprising a composition containing the graft copolymer (A) of the first composition group or the vinyl-based copolymer (B-1) of the second composition group; a phosphate-based flame retardant (J); and an aromatic polycarbonate oligomer (K), and is constituted by the below-described composition (1) as well as compositions (2) to (11):

(1) A natural rubber-containing thermoplastic resin composition, comprising 6 to 15 parts by mass of a phosphate-based flame retardant (J) and 0.1 to 3 parts by mass of an aromatic carbonate oligomer (K) having a viscosity-average molecular weight [Mv] of 1,000 to 10,000, with respect to 100 parts by mass of the styrene-based resin (I) comprising the graft copolymer (A).

(2) The natural rubber-containing thermoplastic resin composition according to (1), wherein the phosphate-based flame retardant (J) is represented by the following Formula (1):

(1)

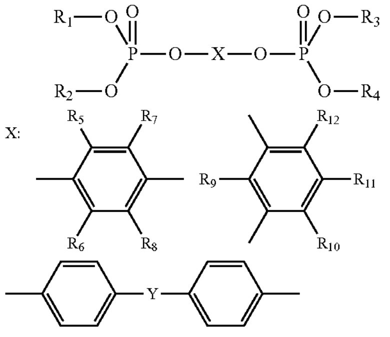

wherein, $R_1$ to $R_4$ each represent a phenyl group or a phenyl group substituted with a halogen-free organic group, and may be the same or different from each other; $R_5$ to $R_{12}$ each represent a hydrogen atom or an alkyl group having 1 to 5 carbon atoms, and may be the same or different from each other; Y represents any one of a direct bond, O, S, $SO_2$, $C(CH_3)_2$, $CH_2$ and CHPh; and Ph represents a phenyl group.

(3) The natural rubber-containing thermoplastic resin composition according to (1) or (2), wherein the aromatic carbonate oligomer (K) comprises a repeating structural unit represented by the following Formula (2):

(2)

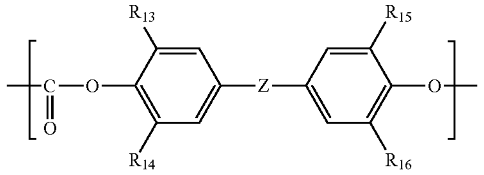

wherein, Z represents a substituted or unsubstituted alkylidene group having 2 to 5 carbon atoms, a substituted or unsubstituted cyclohexylidene group, an oxygen atom, a sulfur atom or a sulfonyl group; and $R_{13}$ to $R_{16}$ each represent a hydrogen atom or an alkyl group having 1 to 3 carbon atoms and may be the same or different from each other.

(4) The natural rubber-containing thermoplastic resin composition according to any one of (1) to (3), comprising the rubbery polymer (R) in an amount of 5 to 50 parts by mass with respect to 100 parts by mass of the styrene-based resin (I).

(5) The natural rubber-containing thermoplastic resin composition according to any one of (1) to (4), wherein the styrene-based resin (I) further comprises the vinyl-based copolymer (B-1) and the amount thereof is 90 to 50 parts by mass with respect to 10 to 50 parts by mass of the graft copolymer (A).

(6) The natural rubber-containing thermoplastic resin composition according to (5), wherein the styrene-based resin (I) comprises: the graft copolymer (A); and the vinyl-based copolymer (B-1) obtained by copolymerizing a vinyl monomer mixture (b-1) composed of 60 to 80% by mass of an aromatic vinyl monomer, 20 to 40% by mass of a cyanovinyl monomer and 0 to 20% by mass, preferably 0 to 10% by mass, of a vinyl monomer copolymerizable with these monomers.

(7) The natural rubber-containing thermoplastic resin composition according to any one of (1) to (6), wherein the phosphate-based flame retardant (J) is resorcinol-bis(dixylyl phosphate) and/or resorcinol-bis(diphenyl phosphate).

(8) The natural rubber-containing thermoplastic resin composition according to any one of (1) to (7), further comprising a phosphorus-containing organic compound-based antioxidant (M) in an amount of 0.1 to 1 part by mass.

(9) The natural rubber-containing thermoplastic resin composition according to any one of (1) to (8), further comprising a silicone compound (N) in an amount of 0.1 to 1 part by mass.

(10) A molded article, obtained by molding the natural rubber-containing thermoplastic resin composition according to any one of (1) to (9).

(11) The molded article according to (10), having flame retardancy satisfying the UL94 V-2 standard.

A fifth composition group relates to a natural rubber-containing thermoplastic resin composition comprising: the styrene-based resin (I) comprising the graft copolymer (A); and a polyethylene terephthalate resin (D), and is constituted by the below-described composition (1) as well as compositions (2) to (7):

(1) A natural rubber-containing thermoplastic resin composition, comprising: the styrene-based resin (I) comprising the graft copolymer (A); and a polyethylene terephthalate resin (D), the natural rubber-containing thermoplastic resin composition comprising an epoxy group-containing acryl-styrene-based copolymer (S) in an amount of 0.01 to 1 part by mass with respect to a total of 100 parts by mass of the styrene-based resin (I) comprising the graft copolymer (A) and the polyethylene terephthalate resin (D).

(2) The natural rubber-containing thermoplastic resin composition according to (1), wherein the epoxy group-containing acryl-styrene-based copolymer (S) has a weight-average molecular weight [Mw] of 2,000 to 20,000.

(3) The natural rubber-containing thermoplastic resin composition according to (1) or (2), wherein the epoxy group-containing acryl-styrene-based copolymer (S) has an epoxy value of 0.5 to 4.0 (meq/g).

(4) The natural rubber-containing thermoplastic resin composition according to any one of (1) to (3), comprising 50 to 99 parts by mass of the styrene-based resin (I) and 50 to 1 parts by mass of the polyethylene terephthalate resin (D) in a total of 100 parts by mass of the styrene-based resin (I) and the polyethylene terephthalate resin (D).

(5) The natural rubber-containing thermoplastic resin composition according to any one of (1) to (4), wherein the styrene-based resin (I) comprises the graft copolymer (A) in an amount of 10 to 50 parts by mass and a vinyl-based copolymer (B-2) (provided that the definition of the vinyl-based copolymer (B-2) does not include the above-described epoxy group-containing acryl-styrene-based copolymer (S)) in an amount of 90 to 50 parts by mass.

(6) The natural rubber-containing thermoplastic resin composition according to any one of (1) to (5), wherein the entirety or a part of the polyethylene terephthalate resin (D) is a recycled material made of a molded article of the polyethylene terephthalate resin (D).

(7) A molded article, obtained by molding the natural rubber-containing thermoplastic resin composition according to any one of (1) to (6).

A sixth composition group relates to a natural rubber-containing thermoplastic resin composition comprising: the styrene-based resin (I) comprising the graft copolymer (A); and a polyamide elastomer (E), and is constituted by the below-described composition (1) as well as compositions (2) to (5):

(1) A natural rubber-containing thermoplastic resin composition, comprising: the styrene-based resin (I) comprising the graft copolymer (A); and a polyamide elastomer (E), the natural rubber-containing thermoplastic resin composition comprising 0.01 to 20 parts by mass of a modified vinyl-based copolymer (T) containing at least one functional group selected from a carboxyl group, a hydroxyl group, an epoxy group, an amino group and an oxazoline group, with respect to a total of 100 parts by mass of the styrene-based resin (I) comprising the graft copolymer (A) and the polyamide elastomer (E).

(2) The natural rubber-containing thermoplastic resin composition according to (1), wherein the polyamide elastomer (E) comprises a poly(alkylene oxide)glycol having a number-average molecular weight [Mn] of 200 to 6,000 as a constituent of polymer skeleton.

(3) The natural rubber-containing thermoplastic resin composition according to (1) or (2), comprising 50 to 97 parts by mass of the styrene-based resin (I) and 50 to 3 parts by mass of the polyamide elastomer (E) in a total of 100 parts by mass of the styrene-based resin (I) and the polyamide elastomer (E).

(4) The natural rubber-containing thermoplastic resin composition according to any one of (1) to (3), wherein the styrene-based resin (I) comprises the graft copolymer (A) in an amount of 10 to 50 parts by mass and a vinyl-based copolymer (B-3) (provided that the definition of the vinyl-based copolymer (B-3) does not include the above-described modified vinyl-based copolymer (T)) in an amount of 90 to 50 parts by mass.

(5) A molded article, obtained by molding the natural rubber-containing thermoplastic resin composition according to any one of (1) to (4).

A seventh composition group relates to a natural rubber-containing thermoplastic resin composition comprising: the styrene-based resin (I) comprising the graft copolymer (A); and a polylactic acid-based resin (F), and is constituted by the below-described compositions (1) and (2):

(1) A natural rubber-containing thermoplastic resin composition, comprising a phosphoric acid and/or monosodium phosphate (U) in an amount of 0.01 to 5 parts by mass with respect to 100 parts by mass of a resin composition composed of 10 to 80 parts by mass of a vinyl-based copolymer (B-4), 5 to 70 parts by mass of the graft copolymer (A) and 1 to 85 parts by mass of a polylactic acid-based resin (F).

(2) A molded article, obtained by molding the natural rubber-containing thermoplastic resin composition according to (1).

An eighth composition group relates to a natural rubber-containing thermoplastic resin composition comprising: the styrene-based resin (I) comprising the graft copolymer (A);

and a polycarbonate resin (G), and is constituted by the below-described composition (1) as well as compositions (2) and (3):

(1) A natural rubber-containing thermoplastic resin composition, comprising: 5 to 25 parts by mass of the graft copolymer (A); 10 to 55 parts by mass of a vinyl-based copolymer (B-5); and 40 to 85 parts by mass of a polycarbonate resin (G).

(2) The natural rubber-containing thermoplastic resin composition according to (1), wherein the vinyl-based copolymer (B-5) is obtained by copolymerizing a vinyl monomer mixture (b-5) composed of 60 to 85% by mass of an aromatic vinyl monomer, 15 to 40% by mass of a cyanovinyl monomer and 0 to 20% by mass, preferably 0 to 10% by mass, of a vinyl monomer copolymerizable with these monomers.

(3) A molded article, obtained by molding the natural rubber-containing thermoplastic resin composition according to (1) or (2).

A natural rubber-containing thermoplastic resin composition having an excellent balance of physical properties in terms of impact resistance, fluidity and color tone can be obtained without requiring a complicated deproteinization treatment of a natural rubber.

According to the third composition group, a natural rubber-containing thermoplastic resin composition that not only has an excellent balance of impact resistance, fluidity and color tone, but also has excellent chemical resistance can be obtained.

According to the fourth composition group, a natural rubber-containing thermoplastic resin composition that not only has an excellent balance of impact resistance, fluidity and color tone, but also has excellent flame retardancy can be obtained.

According to the fifth composition group, a natural rubber-containing thermoplastic resin composition that not only has an excellent balance of impact resistance, fluidity and color tone, but also has excellent outer appearance and chemical resistance can be obtained.

According to the sixth composition group, a natural rubber-containing thermoplastic resin composition that not only has an excellent balance of impact resistance, fluidity and color tone, but also has excellent surface specific resistance and electrostatic diffusivity can be obtained.

According to the seventh composition group, a natural rubber-containing thermoplastic resin composition that not only has an excellent balance of impact resistance, fluidity and color tone, but also imposes only a small environmental stress and has heat resistance and thermal stability, can be obtained.

According to the eighth composition group, a natural rubber-containing thermoplastic resin composition that not only has an excellent balance of impact resistance, fluidity and color tone, but also has excellent heat resistance can be obtained.

BRIEF DESCRIPTION OF THE DRAWING

FIG. 1 is a schematic view showing the chemical resistance evaluation method used in the Examples.

DESCRIPTION OF SYMBOLS

I: Plate test piece
a: Major axis of jig
b: Minor axis of jig
X: Distance from the position of crack generation
101: Position of crack generation

DETAILED DESCRIPTION

The natural rubber-containing thermoplastic resin composition (hereinafter, may be simply referred to as "the thermoplastic resin composition") is constituted by the below-described eight composition groups.

In the thermoplastic resin composition of the first composition group, the particle sizes of the natural rubber and the synthetic rubber that are contained in the graft copolymer (A) as well as the internal graft ratio of the particles of the rubbery polymer (R) containing these particles are the characteristic features. These characteristic features are also common to the second to eighth composition groups.

The thermoplastic resin composition is characterized in that: it comprises a graft copolymer (A) obtained by graft-polymerizing a vinyl monomer mixture (a) comprising at least an aromatic vinyl monomer to a rubbery polymer (R) composed of 10 to 70% by mass of a natural rubber having a weight-average particle size of 0.3 to 1.2 μm and 30 to 90% by mass of a synthetic rubber having a weight-average particle size of 0.2 to 0.4 μm; particles of the natural rubber include not less than 5% by mass of natural rubber particles with a size of 1.0 μm or larger with respect to all of the particles of the natural rubber; and particles of the rubbery polymer (R) with a size of 1.0 μm or larger have an internal graft ratio of 20% or higher.

The "natural rubber" used in the graft copolymer (A) refers to a substance that is normally contained in the sap of a rubber tree and comprises cis-poly-1,4-isoprene as a main repeating structural unit. In addition to such natural rubber produced by in-vivo addition polymerization, the sap contains a trace amount of impurities such as proteins and fatty acids. It is preferred to use a natural rubber that is contained in a natural rubber latex obtained by purifying a sap (having a natural rubber concentration of about 30% by mass) by an arbitrary purification/solid-liquid separation method and subsequently adjusting the natural rubber concentration to be 60% by mass or higher. The natural rubber is not required to be subjected to a deproteinization treatment in advance and a deproteinized natural rubber latex may be used, or the natural rubber may be deproteinized in the process of producing the thermoplastic resin composition.

The natural rubber used in the graft copolymer (A) is characterized by comprising particles with a size of 1.0 μm or larger in an amount of not less than 5% by mass with respect to all of the particles of the natural rubber and having a weight-average particle size of 0.3 to 1.2 μm.

The size of the natural rubber particles influences the shock-absorbing properties of the graft copolymer (A) as well as those of a resin composition containing the graft copolymer (A). Therefore, a focus was given to natural rubber particles with a size of 1.0 μm or larger that exhibit superior shock-absorbing properties. When the amount of the natural rubber particles with a size of 1.0 μm or larger is less than 5% by mass with respect to all of the particles of the natural rubber, the impact resistance of the thermoplastic resin composition is reduced.

The content of the natural rubber particles with a size of 1.0 μm or larger is preferably not less than 20% by mass with respect to all of the particles of the natural rubber. Meanwhile, the upper limit of the content of the natural rubber particles with a size of 1.0 μm or larger is not particularly restricted. However, from the standpoint of further improving the impact resistance, the content is preferably not greater than 50% by mass, more preferably not greater than 45% by mass, with respect to all of the particles of the natural rubber.

Further, in addition to the difficulty of collecting a natural rubber with a weight-average particle size of smaller than 0.3 μm and the laborious secondary processing thereof, when the weight-average particle size of the natural rubber is smaller than 0.3 μm, the impact resistance of the thermoplastic resin composition may be reduced. It is thus preferred that the natural rubber have a weight-average particle size of 0.6 μm or larger. Meanwhile, when the weight-average particle size of the natural rubber is larger than 1.2 μm, the impact resistance, color tone and surface gloss of the thermoplastic resin composition may be deteriorated. It is thus preferred that the natural rubber have a weight-average particle size of 1.0 μm or smaller.

The content of the natural rubber particles with a size of 1.0 μm or larger and the weight-average particle size of the natural rubber can be determined by the following method. First, using water as a medium, the natural rubber (or natural rubber latex) is diluted and dispersed to measure the particle size distribution using a laser scattering-diffraction particle size distribution analyzer. As the laser scattering-diffraction particle size distribution analyzer, "LS 13 320" (Beckman Coulter, Inc.) or the like can be employed. From the thus obtained particle size distribution, the content of the natural rubber particles with a size of 1.0 μm or larger is calculated, and the weight-average particle size of the rubber particles is calculated using Equation 1:

$$\frac{\sum n_i d_i^4}{\sum n_i d_i^3} \quad (1)$$

wherein, $n_i$ represents the number of particles with a size of $d_i$; and $d_i$ represents the size of the $i^{th}$ particle.

Examples of the synthetic rubber used in the graft copolymer (A) include polybutadiene, poly(butadiene-styrene) (SBR), poly(butadiene-acrylonitrile) (NBR), polyisoprene, poly(butadiene-butyl acrylate), poly(butadiene-methyl methacrylate), poly(butyl acrylate-methyl methacrylate), poly(butadiene-ethyl acrylate), ethylene-propylene rubber, poly(ethylene-isoprene) and poly(ethylene-methyl acrylate). Two or more of these synthetic rubbers may be used in combination. Thereamong, from the standpoint of further improving the impact resistance, polybutadiene, SBR, NBR and ethylene-propylene rubber are preferred.

As the synthetic rubber used in the graft copolymer (A), it is preferred to employ one which is contained in a synthetic rubber latex produced by addition polymerization.

The synthetic rubber is characterized by having a weight-average particle size of 0.2 to 0.4 μm. When the weight-average particle size of the synthetic rubber is smaller than 0.2 μm, the impact resistance of the thermoplastic resin composition is reduced. Meanwhile, also when the weight-average particle size of the synthetic rubber is larger than 0.4 μm, the impact resistance of the thermoplastic resin composition is reduced. It is thus preferred that the synthetic rubber have a weight-average particle size of 0.3 μm or smaller.

The weight-average particle size of the synthetic rubber can be determined by the following method. First, using an aqueous medium, the synthetic rubber (or synthetic rubber latex) is diluted and dispersed to measure the particle size distribution using a laser scattering-diffraction particle size distribution analyzer. As the laser scattering-diffraction particle size distribution analyzer, "LS 13 320" (Beckman Coulter, Inc.) or the like can be employed. From the thus obtained particle size distribution, the weight-average particle size of the synthetic rubber is calculated using the above-described Equation 1.

The rubbery polymer (R) used in the graft copolymer (A) is characterized by being composed of 10 to 70% by mass of the natural rubber and 30 to 90% by mass of the synthetic rubber. When the amount of the natural rubber is less than 10% by mass and that of the synthetic rubber is greater than 90% by mass, the impact resistance of the thermoplastic resin composition is reduced. It is thus preferred that the amount of the natural rubber be 20% by mass or greater and that of the synthetic rubber be 80% by mass or less, and it is more preferred that the amount of the natural rubber be 25% by mass or greater and that of the synthetic rubber be 75% by mass or less. Meanwhile, when the amount of the natural rubber is greater than 70% by mass and that of the synthetic rubber is less than 30% by mass, the impact resistance, color tone and surface gloss of the thermoplastic resin composition are markedly deteriorated. It is thus preferred that the amount of the natural rubber be 50% by mass or less and that of the synthetic rubber be 50% by mass or greater, and it is more preferred that the amount of the natural rubber be 40% by mass or less and that of the synthetic rubber be 60% by mass or greater.

The graft copolymer (A) is obtained by graft-polymerizing a vinyl monomer mixture (a) comprising at least an aromatic vinyl monomer to the above-described rubbery polymer (R). The graft copolymer (A) comprises a vinyl-based copolymer grafted to the rubbery polymer (R) and an ungrafted vinyl-based copolymer. As for the mass ratio of the rubbery polymer (R) and that of the vinyl monomer mixture (a) in the graft polymerization, it is preferred that the rubbery polymer (R) be in an amount of 5 to 65 parts by mass and the vinyl monomer mixture (a) be in an amount of 35 to 95 parts by mass, with respect to a total of 100 parts by mass of these components. By using the rubbery polymer (R) in an amount of 5 parts by mass or greater and the vinyl monomer mixture (a) in an amount of 95 parts by mass or less, the productivity of the graft copolymer (A) can be improved. It is more preferred that the rubbery polymer (R) be in an amount of 40 parts by mass or greater and the vinyl monomer mixture (a) be in an amount of 60 parts by mass or less, and it is still more preferred that the rubbery polymer (R) be in an amount of 45 parts by mass or greater and the vinyl monomer mixture (a) be in an amount of 55 parts by mass or less. Meanwhile, by using the rubbery polymer (R) in an amount of 65 parts by mass or less and the vinyl monomer mixture (a) in an amount of 35 parts by mass or greater, the impact resistance of the thermoplastic resin composition can be further improved. It is more preferred that the rubbery polymer (R) be in an amount of 60 parts by mass or less and the vinyl monomer mixture (a) be in an amount of 40 parts by mass or greater, and it is still more preferred that the rubbery polymer (R) be in an amount of 55 parts by mass or less and the vinyl monomer mixture (a) be in an amount of 45 parts by mass or greater.

The vinyl monomer mixture (a) comprises at least an aromatic vinyl monomer and may further contain other vinyl monomer. It is preferred that the vinyl monomer mixture (a) contain a cyanovinyl monomer. Further, it is also preferred that the vinyl monomer mixture (a) further contain a vinyl monomer copolymerizable with these monomers.

Examples of the aromatic vinyl monomer that can be contained in the vinyl monomer mixture (a) include styrene, α-methylstyrene, p-methylstyrene, m-methylstyrene, o-methylstyrene, vinyl toluene and t-butylstyrene, among which styrene is preferred. These aromatic vinyl monomers may be used individually, or two or more thereof may be used in combination. From the standpoint of further improving the fluidity of the thermoplastic resin composition, the amount of the aromatic vinyl monomer(s) contained in the vinyl monomer mixture (a) is preferably not less than 1% by mass, more preferably not less than 10% by mass, still more preferably not less than 15% by mass, yet still more preferably not less than 60% by mass. Meanwhile, from the standpoint of further improving the impact resistance of the thermoplastic resin composition, the amount of the aromatic vinyl monomer(s) contained in the vinyl monomer mixture (a) is preferably 90% by mass or less, more preferably 80% by mass or less.

Examples of the cyanovinyl monomer that can be contained in the vinyl monomer mixture (a) include acrylonitrile, methacrylonitrile and ethacrylonitrile, among which acrylonitrile is preferred. These cyanovinyl monomers may be used individually, or two or more thereof may be used in combination. From the standpoint of further improving the impact resistance of the thermoplastic resin composition, the amount of the cyanovinyl monomer(s) contained in the vinyl monomer mixture (a) is preferably not less than 3% by mass, more preferably not less than 4% by mass, still more preferably not less than 20% by mass. Meanwhile, from the standpoint of further improving the color tone of the thermoplastic resin composition, the amount of the cyanovinyl monomer(s) contained in the vinyl monomer mixture (a) is preferably 50% by mass or less, more preferably 40% by mass or less.

Other monomers that can be contained in the vinyl monomer mixture (a) and copolymerized with the above-described monomers are not particularly restricted as long as it is a vinyl monomer different from the above-described aromatic vinyl monomer and cyanovinyl monomer and does not impair the effects. Specific examples of such other monomer include unsaturated carboxylic acid alkyl ester monomers, unsaturated fatty acids, acrylamide monomers, and maleimide monomers. These monomers may be used individually, or two or more thereof may be used in combination.

The unsaturated carboxylic acid alkyl ester monomer that can be contained in the vinyl monomer mixture (a) is not particularly restricted; however, it is preferably an ester formed by an alcohol having 1 to 6 carbon atoms and acrylic acid or methacrylic acid. The alcohol having 1 to 6 carbon atoms may further contain a substituent(s) such as a hydroxyl group and a halogen group.

Specific examples of the unsaturated carboxylic acid alkyl ester monomer include methyl (meth)acrylate, ethyl (meth) acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth) acrylate and 2,3,4,5-tetrahydroxypentyl (meth)acrylate, among which methyl (meth)acrylate is preferred. The term "(meth)acrylate" used herein refers to acrylate or methacrylate.

Examples of the fatty acids include itaconic acid, maleic acid, fumaric acid, butenoic acid, acrylic acid and methacrylic acid.

Examples of the acrylamide monomers include acrylamide, methacrylamide and N-methyl acrylamide.

Examples of the maleimide monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide and N-phenylmaleimide.

The amount of the vinyl monomer copolymerizable with these monomers that is contained in the vinyl monomer mixture (a) is 0 to 20% by mass, preferably 0 to 10% by mass. By controlling the amount of the copolymerizable vinyl monomer contained in the vinyl monomer mixture (a) to be 10% by mass or less, the impact resistance, fluidity and color tone of the thermoplastic resin composition can all be satisfied at high levels.

The method of producing the graft copolymer (A) of the first composition group is not particularly restricted. The natural rubber and the synthetic rubber may be mixed with each other and the vinyl monomer mixture (a) may then be graft-polymerized thereto, or the natural rubber and the synthetic rubber may each be graft-polymerized with the vinyl monomer mixture (a) and the resulting graft copolymers may then be mixed with each other.

As the method of graft-polymerizing the rubbery polymer (R) and the vinyl monomer mixture (a), an arbitrary method such as an emulsion polymerization method, a suspension polymerization method, a continuous bulk polymerization method or a continuous solution polymerization method can be employed, and it is preferred to employ an emulsion polymerization method or a bulk polymerization method. Thereamong, an emulsion polymerization method is most preferred because the particle size of the rubbery polymer (R) can be easily controlled and the polymerization stability affected by heat removal during polymerization can also be easily controlled.

When an emulsion polymerization method is employed as a graft polymerization method of producing the graft copolymer (A), various surfactants may be added as emulsifiers.

Examples of the various surfactants that are particularly preferably used in the graft polymerization method include a anionic-type surfactant such as carboxylic acid salt-type, sulfuric acid ester salt-type and sulfonic acid salt-type anionic surfactants.

Specific examples of the carboxylic acid salt-type emulsifier include caprylates, caprates, laurates, myristates, palmitates, stearates, oleates, linoleates, linolenates, rosinates, behenates, and dialkyl sulfosuccinates.

Specific examples of the sulfuric acid ester salt-type emulsifier include castor oil sulfate, lauryl alcohol sulfate, polyoxyethylene lauryl sulfate, polyoxyethylene alkyl ether sulfate, and polyoxyethylene alkyl phenyl ether sulfate.

Specific examples of the sulfonic acid salt-type emulsifier include dodecylbenzene sulfonate, alkylnaphthalene sulfonate, alkyl diphenyl ether disulfonate, and naphthalene sulfonate condensate.

The term "salt" used herein refers to, for example, an alkali metal salt, an ammonium salt, a sodium salt, a lithium salt or a potassium salt. These emulsifiers may be used individually, or two or more thereof may be used in combination.

Examples of an initiator used in the graft polymerization include peroxides, azo compounds and aqueous potassium persulfate. These initiators may be used individually, or two or more thereof may be used in combination.

Specific examples of the peroxides include benzoyl peroxide, cumene hydroperoxide, dicumyl peroxide, diisopropylbenzene hydroperoxide, t-butyl hydroperoxide, t-butyl peroxyacetate, t-butyl peroxybenzoate, t-butyl isopropyl carbonate, di-t-butyl peroxide, t-butyl peroctate, 1,1-bis(t-butylperoxy)-3,3,5-trimethylcyclohexane, 1,1-bis(t-butylperoxy)cyclohexane, and t-butylperoxy-2-ethylhexanoate.

Specific examples of the azo compounds include azobisisobutyronitrile, azobis(2,4-dimethylvaleronitrile), 2-phenylazo-2,4-dimethyl-4-methoxyvaleronitrile, 2-cyano-2-propylazo-formamide, 1,1'-azobiscyclohexane-1-carbonitrile, azobis(4-methoxy-2,4-dimethylvaleronitrile), dimethyl-2,2'-azobisisobutylate, 1-t-butylazo-2-cyanobutane, and 2-t-butylazo-2-cyano-4-methoxy-4-methylpentane.

Thereamong, for example, potassium persulfate and cumene hydroperoxide are preferably used. Further, these initiators can also be used in a redox system.

For the purpose of adjusting the polymerization degree and graft ratio of the graft copolymer (A), a chain transfer agent such as mercaptan or terpene can be used, and specific examples thereof include n-octyl mercaptan, t-dodecyl mercaptan, n-dodecyl mercaptan, n-tetradecyl mercaptan, n-octadecyl mercaptan, and terpinolene. When used, these chain transfer agents may be used individually, or two or more thereof may be used in combination. Thereamong, n-octyl mercaptan and t-dodecyl mercaptan are preferably used.

Generally, the graft copolymer (A) is recovered by adding a coagulant to a graft copolymer latex produced by an emulsion polymerization method. As the coagulant, an acid or a water-soluble salt is preferably used.

Examples of the acid include sulfuric acid, hydrochloric acid, phosphoric acid and acetic acid. Examples of the water-soluble salt include calcium chloride, magnesium chloride, barium chloride, aluminum chloride, magnesium sulfate, aluminum sulfate, aluminum ammonium sulfate, aluminum potassium sulfate and aluminum sodium sulfate. These coagulants may be used individually, or two or more thereof may be used in combination. To obtain a resin having superior color tone, it is preferred that no emulsifier remains in the resin. So, it is preferred that an alkali fatty acid salt is used as an emulsifier and coagrated by the acid.

When an emulsion polymerization method is used to produce the graft copolymer (A), the method of supplying the rubbery polymer (R) and the vinyl monomer mixture (a) is not particularly restricted. For example, both of these components may be supplied at once in the beginning. Alternatively, to control the distribution of the resulting copolymer composition, a part of the vinyl monomer mixture (a) may be continuously supplied, or a part or the entirety of the vinyl monomer mixture (a) may be supplied in portions. Continuous supplying of a part of the vinyl monomer mixture (a) means that a portion of the vinyl monomer mixture (a) is supplied in the beginning and the rest is continuously supplied with time. Further, supplying of a part or the entirety of the vinyl monomer mixture (a) in portions means that a part or the entirety of the vinyl monomer mixture (a) is supplied later than the initial supplying. To control the internal graft ratio of the particles of the rubbery polymer (R) with a size of 1.0 μm or larger to be 20% or higher as described below, it is preferred to supply not less than 10% by mass of the whole vinyl monomer mixture (a) prior to the start of polymerization. By supplying not less than 10% by mass of the whole vinyl monomer mixture (a) prior to the start of polymerization, under such an environment where the natural rubber and the vinyl monomer mixture (a) are brought into contact with each other, the vinyl monomer mixture (a) is made likely to infiltrate into the natural rubber particles coated with protein. Therefore, the graft copolymer (A), in which the particles of the rubbery polymer (R) with a size of 1.0 μm or larger have an internal graft ratio of 20% or higher, can be easily produced. The term "start of polymerization" used herein refers to the time when addition of an initiator is started.

There is no particular restriction with regard to the duration of contact between the natural rubber and the vinyl monomer mixture (a) prior to the start of polymerization. However, to allow the natural rubber to be sufficiently impregnated with the vinyl monomer mixture (a), it is preferably 30 minutes or longer. Even if the contact is made for an excessively long time, the effect thereof tends to be saturated; therefore, the duration of the contact is preferably 90 minutes or shorter. For example, it is preferred to start the supplying of the vinyl monomer mixture (a) at least 30 to 90 minutes before the start of polymerization. Further, it is not necessary to bring the whole vinyl monomer mixture (a) into contact with the natural rubber before the polymerization, and not less than 10% by mass of the vinyl monomer mixture (a) to be reacted may be brought into contact with the natural rubber.

The temperature at which the vinyl monomer mixture (a) is supplied before the start of polymerization is not particularly restricted. However, it is preferably 40 to 70° C. By setting the supplying temperature at 40° C. or higher, the vinyl monomer mixture (a) is allowed to sufficiently infiltrate into the natural rubber. Meanwhile, by setting the loading temperature at 70° C. or lower, emulsification stability of latex can be maintained.

The pH in the emulsion polymerization is not particularly restricted. However, it is preferably 10 to 12. By controlling the pH from 10 to 12, the emulsified state of the graft copolymer (A) can be stabilized. In addition, hydrolysis of some proteins is facilitated so that graft polymerization is likely to proceed. To control the pH in a range of 10 to 12, for example, potassium hydroxide or sodium hydroxide is used, and potassium hydroxide is more preferably used because of its excellent emulsification stability.

The graft ratio of the graft copolymer (A) is preferably 30% or higher, more preferably 35% or higher, still more preferably 40% or higher. When the graft ratio is 30% or higher, the compatibility between the rubbery polymer (R) contained in the thermoplastic resin composition and the below-described vinyl-based copolymer (B) can be further improved. Meanwhile, from the standpoint of further improving the impact resistance, the upper limit of the graft ratio is preferably 70% or lower, more preferably 60% or lower.

The particles of the rubbery polymer (R) with a size of 1.0 μm or larger that are contained in the thermoplastic resin composition are characterized by having an internal graft ratio of 20% or higher. As described above, the size of the natural rubber particles influences the shock-absorbing properties of the graft copolymer (A) as well as those of a resin composition containing the graft copolymer (A). By allowing the particles of the rubbery polymer (R) with a size of 1.0 μm or larger to have an internal graft ratio of 20% or higher, the rubbery polymer (R) can be incorporated into the thermoplastic resin composition in a dispersed manner. The "internal graft ratio" refers to the ratio of the amount of the vinyl-based copolymer (Y) contained in the rubbery polymer (R), with respect to the total amount [(Y)+(R)] of the rubbery polymer (R) and the vinyl-based (Y) copolymer contained therein. Specifically, in a photograph of a sample adjusted by osmic acid staining which was taken under an electron microscope (TEM) at a magnification of ×20,000, 5 particles of the rubbery polymer (R) with a size of 1.0 μm or larger are randomly selected, and the ratio between the cross-sectional area of each rubbery polymer (R) particle and the area of the vinyl-based copolymer (Y) existing inside the cross-sectional area is determined and an average thereof is calculated. The internal graft ratio of the rubbery polymer (R) is determined without differentiation between a natural rubber and a synthetic rubber. When the particles of the rubbery polymer (R) with a size of 1.0 μm or larger have an internal graft ratio of lower than 20%, the compatibility between the rubbery polymer (R) contained in the thermoplastic resin composition and ungrafted vinyl-based copolymer is reduced so that the thermoplastic resin composition tends to have a reduced impact resistance. The internal graft ratio of the particles of the rubbery polymer (R) with a size of 1.0 μm or larger is preferably 30% or higher. Meanwhile, the upper limit of the internal graft ratio of the particles of the rubbery polymer (R) with a size of 1.0 μm or larger is not particularly restricted. However, it is preferably 50% or lower. As a means of controlling the internal graft ratio at 20% or higher, for example, a method in which, as described above, emulsion polymerization is initiated after supplying 10% by mass or more of the vinyl monomer mixture (a) and the remaining vinyl monomer mixture (a) is added thereafter, can be employed.

The graft copolymer (A) may also contain a component that dissolves in a solvent. The weight-average molecular weight [Mw] of an acetone-soluble component is not particularly restricted; however, from the standpoint of improving the compatibility between the rubbery polymer (R) and the below-described vinyl-based copolymer (B), it is preferably 30,000 to 150,000, more preferably 40,000 to 10,000. The weight-average molecular weight [Mw] of the acetone-soluble component of the graft copolymer (A) refers to a value which is measured by gel permeation chromatography (GPC) using a tetrahydrofuran solvent and calculated in terms of standard polystyrene.

The second composition group relates to a thermoplastic resin composition comprising a styrene-based resin (I) obtained by mixing the graft copolymer (A) according to the first composition group and a vinyl-based copolymer (B-1).

The styrene-based resin (I) of the second composition group is a preferred mode of the first composition group and obtained by further mixing a vinyl-based copolymer (B-1) with the graft copolymer (A).

The vinyl-based copolymer (B-1) constituting the styrene-based resin (I) of the second composition group is preferably a copolymer obtained by copolymerizing a vinyl monomer mixture (b-1) comprising at least an aromatic vinyl monomer.

Specific examples of the vinyl-based copolymer (B-1) obtained by copolymerizing an aromatic vinyl monomer-containing vinyl monomer mixture (b-1) include polystyrenes, HIPS (for example, a styrene resin comprising a graft polymer obtained by graft-polymerizing styrene to a butadiene rubber), acrylonitrile-styrene (AS) resins, acrylonitrile-styrene-acrylate (ASA) resins, acrylonitrile-ethylene-propylene-diene-styrene (AES) resins, methyl methacrylate-acrylo-nitrile-styrene (MAS) resins, and methyl methacrylate-styrene (MS) resins. Such vinyl-based copolymer (B-1) may be used individually, or two or more thereof may be used in combination. The vinyl monomer mixture (b-1) contains at least an aromatic vinyl monomer and may also contain other vinyl monomer. This other vinyl monomer preferably contains a cyanovinyl monomer and may further contain a monomer copolymerizable with these monomers.

Examples of the aromatic vinyl monomer that can be contained in the vinyl monomer mixture (b-1) include the same ones as those exemplified for the aromatic vinyl monomer that can be contained in the vinyl monomer mixture (a), among which styrene is preferred. Those aromatic vinyl monomers may be used individually, or two or more thereof may be used in combination.

From the standpoint of further improving the fluidity of the thermoplastic resin composition, the amount of the aromatic vinyl monomer(s) contained in the vinyl monomer mixture (b-1) is preferably 1% by mass or greater, more preferably 10% by mass or greater, still more preferably 15% by mass or greater, yet still more preferably 60% by mass or greater. Meanwhile, from the standpoint of further improving the impact resistance of the thermoplastic resin composition, the amount of the aromatic vinyl monomer(s) contained in the vinyl monomer mixture (b-1) is preferably 90% by mass or less, more preferably 80% by mass or less.

Examples of the cyanovinyl monomer that can be contained in the vinyl monomer mixture (b-1) include the same ones as those exemplified for the cyanovinyl monomer that can be contained in the vinyl monomer mixture (a), among which acrylonitrile is preferred. Those cyanovinyl monomers may be used individually, or two or more thereof may be used in combination.

From the standpoint of further improving the impact resistance of the thermoplastic resin composition, the amount of the cyanovinyl monomer(s) contained in the vinyl monomer mixture (b-1) is preferably 3% by mass or greater, more preferably 4% by mass or greater, still more preferably 20% by mass or greater. Meanwhile, from the standpoint of further improving the color tone of the thermoplastic resin composition, the amount of the cyanovinyl monomer(s) contained in the vinyl monomer mixture (b-1) is preferably 50% by mass or less, more preferably 40% by mass or less.

Other monomers that can be contained in the vinyl monomer mixture (b-1) and copolymerized with the above-described monomers is a vinyl monomer different from the above-described aromatic vinyl monomer and cyanovinyl monomer. Examples of such other monomer include the same ones as those exemplified for copolymerizable other monomer that can be contained in the vinyl monomer mixture (a). Those monomers may be used individually, or two or more thereof may be used in combination. The amount of the vinyl monomer copolymerizable with these monomers that is contained in the vinyl monomer mixture (b-1) is 0 to 20% by mass, preferably 0 to 10% by mass. By controlling the amount of the copolymerizable vinyl monomer contained in the vinyl monomer mixture (b-1) to be 10% by mass or less, the impact resistance, fluidity and color tone of the thermoplastic resin composition can all be satisfied at high levels.

As a method of producing the vinyl-based copolymer (B-1) constituting the styrene-based resin (I) of the second composition group, an arbitrary method such as a suspension polymerization method, an emulsion polymerization method, a bulk polymerization method or a solution polymerization method can be employed. Taking into consideration the easiness of controlling polymerization, the easiness of post-treatment and the productivity, it is preferred to employ a bulk polymerization method or a suspension polymerization method.

When a suspension polymerization method is employed as the method of producing the vinyl-based copolymer (B-1) constituting the styrene-based resin (I) of the second composition group, examples of a suspension stabilizer used in the suspension polymerization include inorganic suspension stabilizers such as clay, barium sulfate and magnesium hydroxide; and organic suspension stabilizers such as polyvinyl alcohol, carboxymethyl cellulose, hydroxyethyl cellulose, polyacrylamide and methyl methacrylate-acrylamide copolymers. Thereamong, from the standpoint of the color tone stability, an organic suspension stabilizer is preferably used. These suspension stabilizers may be used individually, or two or more thereof may be used in combination.

As an initiator used in the suspension polymerization, the same initiator as the one used in the emulsion polymerization of the graft copolymer (A) can be employed. Further, for the purpose of adjusting the polymerization degree of the vinyl-based copolymer (B-1), in the same manner as in the polymerization of the graft copolymer (A), a chain transfer agent such as mercaptan or terpene can be used as well. The suspension polymerization yields a slurry of the vinyl-based copolymer (B-1), which is subsequently dehydrated and dried to obtain the vinyl-based copolymer (B-1) in the form of beads.

In the suspension polymerization as well, the method of supplying the monomers is not particularly restricted, and any of a method of supplying the monomers altogether in the beginning, a method of continuously supplying some or all of the monomers and a method of supplying some or all of the monomers in portions can be employed.

The weight-average molecular weight [Mw] of the vinyl-based copolymer (B-1) is not particularly restricted. However, from the standpoint of further improving the impact resistance of the thermoplastic resin composition, it is preferably not less than 10,000, more preferably not less than 50,000. Meanwhile, from the standpoint of further improving the fluidity of the thermoplastic resin composition, the weight-average molecular weight [Mw] of the vinyl-based copolymer (B-1) is preferably 400,000 or less, more preferably 150,000 or less. The weight-average molecular weight [Mw] of the vinyl-based copolymer (B-1) refers to a value which is measured by gel permeation chromatography (GPC) using a tetrahydrofuran solvent and calculated in terms of standard polystyrene.

It is preferred that the styrene-based resin (I) of the second composition group contain 5 to 50% by mass of the rubbery polymer (R) in a total of 100% by mass of the graft copolymer (A) and the vinyl-based copolymer (B-1) that constitute the styrene-based resin (I). As long as the content of the rubbery polymer (R) is not less than 5% by mass, the impact resistance is further improved. The content of the rubbery polymer (R) is more preferably not less than 10% by mass, still more preferably not less than 15% by mass. Meanwhile, when the content of the rubbery polymer (R) is 50% by mass or less, the fluidity is improved. The content of the rubbery polymer (R) is more preferably 40% by mass or less, still more preferably 30% by mass or less.

In a total of 100% by mass of the graft copolymer (A) and the vinyl-based copolymer (B-1) that constitute the styrene-based resin (I) of the second composition group, the content of the graft copolymer (A) and that of the vinyl-based copolymer (B-1) are not particularly restricted.

As for the content of the graft copolymer (A) and that of the vinyl-based copolymer (B-1) in a total of 100% by mass of the graft copolymer (A) and the vinyl-based copolymer (B-1) that constitute the styrene-based resin (I), from the standpoint of further improving the impact resistance of the thermoplastic resin composition, the styrene-based resin (I) contains preferably 10% by mass or more of the graft copolymer (A) and 90% by mass or less of the vinyl-based copolymer (B-1), more preferably 20% by mass or more of the graft copolymer (A) and 80% by mass or less of the vinyl-based copolymer (B-1). Meanwhile, from the standpoint of further improving the fluidity of the thermoplastic resin composition, the styrene-based resin (I) contains preferably 80% by mass or less of the graft copolymer (A) and 20% by mass or more of the vinyl-based copolymer (B-1), more preferably 50% by mass or less of the graft copolymer (A) and 50% by mass or more of the vinyl-based copolymer (B-1), still more preferably 40% by mass or less of the graft copolymer (A) and 60% by mass or more of the vinyl-based copolymer (B-1).

The thermoplastic resin composition may contain other thermoplastic resin (II) in addition to the above-described styrene-based resin (I). Examples of such other thermoplastic resin (II) include polyolefin resins such as polyvinyl chloride, polyethylene and polypropylene; polyester-based resins such as polyethylene terephthalate, polybutylene terephthalate, polypropylene terephthalate, polycyclohexane dimethyl terephthalate, polycyclohexylene dimethylene ethylene terephthalate, polyarylate, polycarbonate, liquid crystal polymers, polycaprolactone and polylactic acid-based resins; polyamide resins such as nylon 6, nylon 66, nylon 6/10, nylon 4/6, nylon 6T, nylon 9T and nylon 11; fluorocarbon resins such as polytetrafluoroethylene; polyphenylene sulfide (PPS) resins; polyacetal resins; crystalline styrene resins and polyphenylene ether (PPE) resins; and various elastomers. Two or more of these resins may be used in combination. Thereamong, the thermoplastic resin composition preferably contains at least one resin selected from a polyethylene terephthalate resin (D), a polylactic acid-based resin (F), a polycarbonate resin (G), an acrylic resin (V), a polyamide elastomer (E) and an ethylene-carbon monoxide-(meth)acrylate copolymer (C).

Disclosure of the third composition group relates to a thermoplastic resin composition comprising the styrene-based resin (I) according to the second composition group and an ethylene-carbon monoxide-(meth)acrylate copolymer (C).

The thermoplastic resin composition of the third composition group, which comprises the styrene-based resin (I) and an ethylene-carbon monoxide-(meth)acrylate copolymer (C), has an excellent balance of impact resistance, fluidity and color tone and also shows chemical resistance.

The styrene-based resin (I) constituting the thermoplastic resin composition of the third composition group is constituted by the above-described graft copolymer (A) and the above-described vinyl-based copolymer (B-1) that is optionally incorporated.

In the third composition group as well, it is not required to mix the vinyl-based copolymer (B-1). However, for the same reason as in the second composition group, it is preferred to mix the vinyl-based copolymer (B-1). When the vinyl-based copolymer (B-1) is mixed, for the same reason as in the second composition group, in a total of 100% by mass of the graft copolymer (A) and the vinyl-based copolymer (B-1) that constitute the styrene-based resin (I), the styrene-based resin (I) contains preferably 10% by mass or more of the graft copolymer (A) and 90% by mass or less of the vinyl-based copolymer (B-1), more preferably 20% by mass or more of the graft copolymer (A) and 80% by mass or less of the vinyl-based copolymer (B-1). Meanwhile, the styrene-based resin (I) contains preferably 80% by mass or less of the graft copolymer (A) and 20% by mass or more of the vinyl-based copolymer (B-1), more preferably 50% by mass or less of the graft copolymer (A) and 50% by mass or more of the vinyl-based copolymer (B-1), still more preferably 40% by mass or less of the graft copolymer (A) and 60% by mass or more of the vinyl-based copolymer (B-1).

Further, in the third composition group, as in the second composition group, it is preferred that the thermoplastic resin composition contain the rubbery polymer (R) in an amount of 5 to 50 parts by mass with respect to 100 parts by mass of the styrene-based resin (I). The amount of the rubbery polymer (R) is more preferably 10 parts by mass or greater, still more preferably 15 parts by mass or greater. Meanwhile, the amount of the rubbery polymer (R) is more preferably 40 parts by mass or less, still more preferably 30 parts by mass or less.

In the ethylene-carbon monoxide-(meth)acrylate copolymer (C) constituting the thermoplastic resin composition of the third composition group, (meth)acrylate contained therein may be linear or branched. Its ester group preferably has 1 to 18 carbon atoms and examples of such an ester group include methyl ester, ethyl ester, n-propyl ester, n-butyl ester, sec-butyl ester, t-butyl ester, isobutyl ester, hexyl ester, 2-ethylhexyl ester, octyl ester, dodecyl ester, undecyl ester and stearyl ester, among which those having 2 to 8 carbon atoms are more preferred. Further, in a preferred composition ratio of the ethylene-carbon monoxide-(meth)acrylate copolymer (C), ethylene is contained in an amount of 10 to 85% by mass, more preferably 40 to 80% by mass; carbon monoxide is contained in an amount of 5 to 40% by mass, more preferably 5 to 20% by mass; and (meth)acrylate is contained in an amount of 10 to 50% by mass, more preferably 15 to 40% by mass, and the ethylene-carbon monoxide-(meth)acrylate copolymer (C) may also be copolymerized with other copolymerizable monomer as required.

From the standpoint of further improving the chemical resistance, the amount of the ethylene-carbon monoxide-(meth)acrylate copolymer (C) constituting the thermoplastic resin composition of the third composition group is preferably not less than 0.5 parts by mass, more preferably not less than 0.8 parts by mass, still more preferably not less than 0.9 parts by mass, with respect to 100 parts by mass of the styrene-based resin (I). Meanwhile, from the standpoint inhibiting the layer delamination on the surface of the resulting molded article and further improving the outer appearance of the molded article, the amount of the ethylene-carbon monoxide-(meth)acrylate copolymer (C) is preferably not greater than 6.0 parts by mass, more preferably not greater than 5.1 parts by mass, still more preferably not greater than 5.0 parts by mass.

Disclosure of the fourth composition group relates to a thermoplastic resin composition comprising: a styrene-based resin (I) containing the graft copolymer (A) of the first composition group and the vinyl-based copolymer (B-1) described in the second composition group; a phosphate-based flame retardant (J); and an aromatic polycarbonate oligomer (K).

The thermoplastic resin composition of the fourth composition group, which comprises a phosphate-based flame retardant (J) and an aromatic polycarbonate oligomer (K), has an excellent balance of impact resistance, fluidity and color tone and also shows flame retardancy.

The styrene-based resin (I) constituting the thermoplastic resin composition of the fourth composition group is constituted by the above-described graft copolymer (A) and the above-described vinyl-based copolymer (B-1) that is optionally incorporated.

In the fourth composition group as well, mixing of the vinyl-based copolymer (B-1) is optional and, when the vinyl-based copolymer (B-1) is mixed, the amount thereof is also determined arbitrarily. For the same reason as in the second composition group, in a total of 100% by mass of the graft copolymer (A) and the vinyl-based copolymer (B-1) that constitute the styrene-based resin (I), the styrene-based resin (I) contains preferably 10% by mass or more of the graft copolymer (A) and 90% by mass or less of the vinyl-based copolymer (B-1), more preferably 20% by mass or more of the graft copolymer (A) and 80% by mass or less of the vinyl-based copolymer (B-1). Meanwhile, the styrene-based resin (I) contains preferably 80% by mass or less of the graft copolymer (A) and 20% by mass or more of the vinyl-based copolymer (B-1), more preferably 50% by mass or less of the graft copolymer (A) and 50% by mass or more of the vinyl-based copolymer (B-1), still more preferably 40% by mass or less of the graft copolymer (A) and 60% by mass or more of the vinyl-based copolymer (B-1).

Further, in the fourth composition group, as in the second composition group, it is preferred that the thermoplastic resin composition contain the rubbery polymer (R) in an amount of 5 to 50 parts by mass with respect to 100 parts by mass of the styrene-based resin (I). The amount of the rubbery polymer (R) is more preferably 10 parts by mass or greater, still more preferably 15 parts by mass or greater. Meanwhile, the amount of the rubbery polymer (R) is more preferably 40 parts by mass or less, still more preferably 30 parts by mass or less.

As the phosphate-based flame retardant (J) used in the fourth composition group, phosphates such as trimethyl phosphate, triethyl phosphate, tributyl phosphate, trioctyl phosphate, tributoxyethyl phosphate, triphenyl phosphate, tricresyl phosphate and octyldiphenyl phosphate are preferred, and halogen-free phosphates are more preferred.

Further, as the phosphate-based flame retardant (J), from the standpoint of the flame-retarding efficiency, those represented by Formula (1) are still more preferred:

(1)

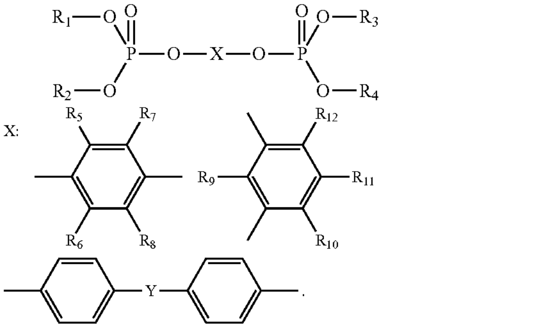

wherein, $R_1$ to $R_4$ each represent a phenyl group or a phenyl group substituted with a halogen-free organic group, and may be the same or different from each other; $R_5$ to $R_{12}$ each represent a hydrogen atom or an alkyl group having 1 to 5 carbon atoms, and may be the same or different from each other; Y represents any one of a direct bond, O, S, $SO_2$, $C(CH_3)_2$, $CH_2$ and CHPh; and Ph represents a phenyl group. Materials indicated above are preferred from the standpoint of the flame-retarding efficiency.

In the phosphate-based flame retardant (J) represented by Formula (1), $R_1$ to $R_4$ each represent a phenyl group or a phenyl group substituted with a halogen-free organic group, and may be the same or different from each other. Specific examples thereof include a phenyl group, a tolyl group, a xylyl group, a cumenyl group, a mesityl group, a naphthyl group, an indenyl group and an anthryl group. Thereamong, a phenyl group, a tolyl group, a xylyl group, a cumenyl group and a naphthyl group are preferred, and a phenyl group, a tolyl group and a xylyl group are more preferred.

In Formula (1), $R_5$ to $R_{12}$ each represent a hydrogen atom or an alkyl group having 1 to 5 carbon atoms, and may be the same or different from each other. Specific examples of the alkyl group having 1 to 5 carbon atoms include a methyl group, an ethyl group, an n-propyl group, an isopropyl group, an n-butyl group, a sec-butyl group, a tert-butyl group, an n-isopropyl group, a neopentyl group, a tert-pentyl group, a 2-isopropyl group, a 3-isopropyl group and a neoisopropyl group. $R_5$ to $R_{12}$ are each preferably a hydrogen atom, a methyl group or an ethyl group, more preferably a hydrogen atom.

Further, Y represents any one of a direct bond, O, S, $SO_2$, $C(CH_3)_2$, $CH_2$ and CHPh, and Ph represents a phenyl group. Thereamong, Y is preferably $C(CH_3)_2$.

Specific examples of the phosphate-based flame retardant (J) represented by Formula (1) include bisphenol A-bisphosphate, bisphenol A-bis(diphenyl phosphate), hydroquinone bisphosphate, resorcinol-bis(dixylyl phosphate), resorcinol-bisphosphate, resorcinol(diphenyl phosphate), resorcinol-bis(diphenyl phosphate), and substitution products and condensates of these compounds. Resorcinol-bis(dixylyl phosphate), resorcinol-bis(diphenyl phosphate) and the like have an excellent balance of rigidity and flame retardancy and are thus preferably used. These phosphate-based flame retardants may be used individually, or two or more thereof may be used in combination.

In the fourth composition group, from the standpoint of further improving the flame retardancy, the phosphate-based flame retardant (J) is incorporated in an amount of preferably not less than 6 parts by mass, more preferably not less than 8 parts by mass, with respect to 100 parts by mass of the styrene-based resin (I). Meanwhile, from the standpoint of further improving the mechanical strength and heat resistance and inhibiting gas generation during molding, the phosphate-based flame retardant (J) is incorporated in an amount of preferably 15 parts by mass or less, more preferably 12 parts by mass or less.

It is preferred that the thermoplastic resin composition of the fourth composition group comprise an aromatic carbonate oligomer (K) in addition to the above-described flame retardant.

The aromatic carbonate oligomer (K) used in the fourth composition group preferably has a viscosity-average molecular weight [Mv] of 1,000 to 10,000. The viscosity-average molecular weight [Mv] means a value obtained by measuring the limiting viscosity [η] (unit: dl/g) at 20° C. with an Ubbelohde viscometer using dichloromethane as a solvent, followed by calculation using the Schnell's viscosity formula, that is, $[\eta]=1.23\times10^{-4}\times(Mv)^{0.83}$. The limiting viscosity [η] is a value obtained by measuring the specific viscosity $[\eta_{sp}]$ at each solution concentration [C] (g/dl), followed by calculation using the following formula:

$$\eta=\lim\eta_{sp}/c(c\rightarrow0).$$

The aromatic carbonate oligomer (K) is obtained by reaction between an aromatic dihydroxy compound, which is typically exemplified by 2,2-bis(4-hydroxyphenyl)propane or 2,2-bis(3,5-dimethyl-4-hydroxyphenyl)propane, and a carbonate precursor typically exemplified by phosgene.

Examples of the aromatic dihydroxy compound include bis(hydroxyaryl)alkanes such as 2,2-bis(4-hydroxyphenyl) propane (hereinafter, may be referred to as "bisphenol A"), 1,1-bis(4-hydroxyphenyl)ethane, 2,2-bis(4-hydroxyphenyl) butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane and bis(4-hydroxyphenyl)diphenylmethane; bis(hydroxyaryl)cycloalkane such as 1,1-bis(4-hydroxyphenyl)cyclopentane, 1,1-bis(4-hydroxyphenyl)cyclohexane and 1,1-bis(4-hydroxyphenyl)-3,3,5-trimethylcyclohexane; cardo structure-containing bisphenols such as 9,9-bis(4-hydroxyphenyl)fluorene and 9,9-bis(4-hydroxy-3-methylphenyl)fluorene; dihydroxydiaryl ether such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone; resorcin; and 4,4'-dihydroxydiphenyl.

Thereamong, bis(4-hydroxyphenyl)alkanes are preferred, and bisphenol A is particularly preferred. These aromatic dihydroxy compounds may be used individually, or two or more thereof may be used in combination.

As the carbonate precursor to be reacted with the aromatic dihydroxy compound, for example, a carbonyl halide, a carbonate ester or a haloformate is used, and specific examples thereof include phosgene; diaryl carbonates such as diphenyl carbonate and ditolyl carbonate; dialkyl carbonates such as dimethyl carbonate and diethyl carbonate; and dihaloformates of bivalent phenols. Thereamong, phosgene is often preferably used. These carbonate precursors may also be used individually, or two or more thereof may be used in combination.

The method of producing the aromatic carbonate oligomer (K) is not particularly restricted, and a conventionally known method can be employed. Specific examples thereof include interfacial polymerization (phosgene method), melt transesterification, solution polymerization (pyridine method), ring-opening polymerization of a cyclic carbonate compound, and solid-phase transesterification of a prepolymer.

When an interfacial polymerization method is employed, in the presence of an inert organic solvent and an aqueous alkaline solution, an aromatic dihydroxy compound is allowed to react with phosgene using, as required, a molecular weight modifier (terminal blocking agent) and an antioxidant for antioxidation of the aromatic dihydroxy compound, normally while maintaining the pH at 9 or higher, and a polymerization catalyst such as a tertiary amine or a quarter-nary ammonium salt is subsequently added to perform interfacial polymerization, thereby the aromatic polycarbonate oligomer (K) is obtained. The timing of the addition of the molecular weight modifier is not particularly restricted as long as it is between the phosgenation and the start of the polymerization reaction. The reaction temperature is, for example, 0 to 40° C., and the reaction time is, for example, several minutes (e.g., 10 minutes) to several hours (e.g., 6 hours).

The organic solvent used in the interfacial polymerization method may be any organic solvent as long as it is inert to the interfacial polymerization reaction and is not miscible with water. Examples of such an organic solvent include chlorinated hydrocarbons such as dichloromethane, 1,2-dichloroethane, chloroform, monochlorobenzene and dichlorobenzene; and aromatic hydrocarbons such as benzene, toluene and xylene. Examples of the alkali compound used in the aqueous alkaline solution include alkali metal hydroxides such as sodium hydroxide and potassium hydroxide.

Examples of the molecular weight modifier used in the interfacial polymerization method include compounds having a monovalent phenolic hydroxyl group; and phenyl chloroformate. Examples of the compounds having a monovalent phenolic hydroxyl group include m-methylphenol, p-methylphenol, m-propylphenol, p-propylphenol, p-tert-butylphenol and p-long chain alkyl-substituted phenol. The molecular weight modifier is used in an amount of preferably not less than 0.5 mol, more preferably not less than 1 mol, with respect to 100 mol of the aromatic dihydroxy compound.

Examples of the polymerization catalyst used in the interfacial polymerization method include tertiary amines such as trimethylamine, triethylamine, tributylamine, tripropylamine, trihexylamine and pyridine; and quaternary ammonium salts such as trimethylbenzylammonium chloride, tetrabutylammonium chloride, tetramethylammonium chloride, triethylbenzylammonium chloride and trioctylmethylammonium chloride.

The reaction performed by the melt transesterification method is, for example, a transesterification reaction between a carbonic acid diester and an aromatic dihydroxy compound. Examples of the aromatic dihydroxy compound include the same ones as those exemplified above, and these aromatic dihydroxy compounds may be used individually, or two or more thereof may be used in combination. Thereamong, bisphenol A is preferred.

Examples of the carbonic acid diester include dialkyl carbonate compounds such as dimethyl carbonate, diethyl carbonate and di-tert-butyl carbonate; and substituted diphenyl carbonates such as diphenyl carbonate and ditolyl carbonate. The carbonic acid diester is preferably diphenyl carbonate, dimethyl carbonate or a substituted diphenyl carbonate, more preferably diphenyl carbonate or dimethyl carbonate, particularly preferably diphenyl carbonate.

Generally speaking, by adjusting the mixing ratio of the carbonic acid diester and the aromatic dihydroxy compound or by adjusting the degree of pressure reduction during the reaction, an aromatic polycarbonate oligomer (K) having a desired molecular weight and terminal hydroxyl group amount can be obtained. As a more active method, an adjustment method in which a terminal blocking agent is separately added during the reaction is also well known. Examples of the terminal blocking agent used in this case include monovalent phenols, monovalent carboxylic acids, and carbonic acid diesters. The amount of terminal hydroxyl groups greatly affects the thermal stability, hydrolytic stability, color tone and the like of the product polycarbonate. Although the amount of terminal hydroxyl groups varies depending on the use, from the standpoint of providing practical physical properties, the amount of terminal hydroxyl groups is preferably 1,000 ppm or less, more preferably 700 ppm or less.

When the aromatic polycarbonate oligomer (K) is produced by an transesterification method, the amount of terminal hydroxyl groups is preferably not less than 100 ppm. By using such an amount of terminal hydroxyl groups, a reduction in the molecular weight can be suppressed and superior color tone can be attained. Accordingly, the carbonic acid diester is used in an amount of preferably an equimolar amount or greater, more preferably 1.01 to 1.30 mol, particularly preferably at a molar ratio of 1.02 to 1.2, with respect to 1 mol of the aromatic dihydroxy compound.

When the aromatic polycarbonate oligomer (K) is produced by an transesterification method, a transesterification catalyst is usually used. The transesterification catalyst is not particularly restricted, and an alkali metal compound and/or an alkaline earth metal compound is/are preferably used. It is also possible to supplementarily use a basic compound such as a basic boron compound, a basic phosphorus compound, a basic ammonium compound or an amine-based compound in combination. Examples of a method that performs transesterification reaction using the above-described materials include a method in which reaction is performed at a temperature of 100 to 320° C. and melt polycondensation reaction is eventually performed under reduced pressure of $2.6\times10^2$ Pa (2 mmHg) or less in terms of the absolute pressure, while by-products such as an aromatic hydroxy compound are removed.

The melt polycondensation can be carried out in a batch-wise manner or in a continuous manner. However, taking into consideration the stability and the like of the aromatic carbonate oligomer (K) component, the melt polycondensation is preferably carried out in a continuous manner. As an inactivator of the catalyst used in the aromatic carbonate oligomer (K) produced by a transesterification method, a compound that neutralizes the catalyst such as a sulfur-containing acidic compound or a derivative formed therefrom, is preferably used. Such a compound that neutralizes the catalyst is added in an amount of preferably 0.5 to 10 equivalents, more preferably 1 to 5 equivalents, with respect to the alkali metal contained in the catalyst. Further, such a compound that neutralizes the catalyst is added in an amount of preferably 1 to 100 ppm, more preferably 1 to 20 ppm, with respect to the aromatic polycarbonate oligomer (K).

The molecular weight of the aromatic carbonate oligomer (K) in the fourth composition group is preferably 1,000 to 10,000 in terms of the viscosity-average molecular weight [Mv] calculated from the limiting viscosity [η]. By controlling the viscosity-average molecular weight [Mv] to be not less than 1,000, occurrence of bleed-out from the resulting molded article can be inhibited and the impact resistance can be further improved. The viscosity-average molecular weight [Mv] is more preferably not less than 1,500, still more preferably not less than 2,000. Meanwhile, by controlling the viscosity-average molecular weight [Mv] to be 10,000 or less, the flame retardancy of the resulting molded article is further improved and the molded article is thus made likely to stably express flame retardancy that satisfies UL94 V-2. The viscosity-average molecular weight [Mv] is more preferably 9,000 or less, still more preferably 8,000 or less. The above-described viscosity-average molecular weight [Mv] may also be attained by mixing two or more kinds of aromatic carbonate oligomers (K) having different viscosity-average molecular weights. In this case, an aromatic carbonate oligomer (K) whose viscosity-average molecular weight [Mv] is not in the above-described preferred range may also be used for the mixing.

The aromatic carbonate oligomer (K) in the fourth composition group is not particularly restricted as long as it is obtained by the above-described method, and one which has a repeating structural unit represented by Formula (2) is preferably used:

(2)

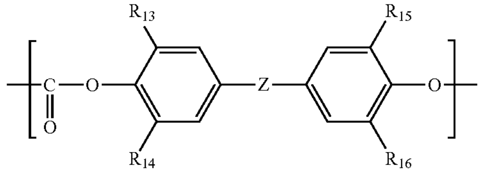

wherein, Z represents a substituted or unsubstituted alkylidene group having 2 to 5 carbon atoms, a substituted or unsubstituted cyclohexylidene group, an oxygen atom, a sulfur atom or a sulfonyl group; and $R_{13}$ to $R_{16}$ each represent a hydrogen atom or an alkyl group having 1 to 6 carbon atoms, and may be the same or different from each other.

In the fourth composition group, from the standpoint of further improving the flame retardancy, the aromatic carbonate oligomer (K) is incorporated in an amount of preferably not less than 0.1 parts by mass, more preferably not less than 0.2 parts by mass, still more preferably not less than 0.3 parts by mass, with respect to 100 parts by mass of the styrene-based resin (I). Meanwhile, from the standpoint of further improving the mechanical strength and heat resistance and inhibiting gas generation during molding, the aromatic carbonate oligomer (K) is incorporated in an amount of preferably 3.0 parts by mass or less, more preferably 2.5 parts by mass or less, still more preferably 2.0 parts by mass or less.

In the thermoplastic resin composition of the fourth composition group, from the standpoint of inhibiting deterioration of the thermoplastic resin during melting, it is preferred to incorporate an antioxidant. The antioxidant is preferably a phosphorus-containing organic compound-based antioxidant (M) because it does not adversely affect the flame retardancy. Examples of the phosphorus-containing organic compound-based antioxidant (M) include trisnonylphenyl phosphite, tris(2,4-di-t-butylphenyl)phosphite, distearyl pentaerythritol diphosphite, bis(2,4-di-t-butylphenyl)pentaerythritol phosphite, bis(2,6-di-t-butyl-4-methylphenyl)pentaerythritol phosphite, 2,2-methylene-bis(4,6-di-t-butylphenyl)octyl phosphite and tetrakis(4,6-di-t-butylphenyl)-4,4-biphenylene-di-phosphonite, among which distearyl pentaerythritol diphosphite is preferably used.

In the fourth composition group, from the standpoint of inhibiting deterioration during melting, the phosphorus-containing organic compound-based antioxidant (M) is incorporated in an amount of preferably not less than 0.1 parts by mass, more preferably not less than 0.3 parts by mass, with respect to 100 parts by mass of the styrene-based resin (I). Meanwhile, from the standpoint of inhibiting gas generation during molding, the phosphorus-containing organic compound-based antioxidant (M) is incorporated in an amount of preferably 1.0 part by mass or less, more preferably 0.8 parts by mass or less.

In the thermoplastic resin composition of the fourth composition group, from the standpoint of improving the flame retardancy, it is preferred to incorporate a silicone compound (N). Examples of the silicone compound (N) include silicone powders, silicone rubbers, silicone oils and silicone resins, as well as derivatives thereof having improved compatibility and/or reactivity. The silicone compound (N) may also contain a silica filler, and a known method can be applied as a method of incorporating the silicone compound (N).

In the fourth composition group, from the standpoint of further improving the flame retardancy, the silicone compound (N) is incorporated in an amount of preferably not less than 0.1 parts by mass, more preferably not less than 0.3 parts by mass, with respect to 100 parts by mass of the styrene-based resin (I). Meanwhile, from the standpoint of maintaining the fluidity and mechanical properties of the thermoplastic resin composition, the silicone compound (N) is incorporated in an amount of preferably 1.0 part by mass or less, more preferably 0.8 parts by mass or less.

Disclosed as the fifth composition group is a thermoplastic resin composition comprising: the styrene-based resin (I) comprising the graft copolymer (A); and a polyethylene terephthalate resin (D).

The thermoplastic resin composition comprising the styrene-based resin (I) and the polyethylene terephthalate resin (D) has a superior balance of impact resistance, fluidity and color tone and is also excellent in both outer appearance and chemical resistance.

The styrene-based resin (I) of the fifth composition group is constituted by the above-described graft copolymer (A) and the below-described vinyl-based copolymer (B-2) that is optionally added.

The graft copolymer (A) constituting the styrene-based resin (I) of the fifth composition group is the same as the graft copolymer (A) described in the first composition group.

The "vinyl-based copolymer (B-2)" constituting the styrene-based resin (I) of the fifth composition group refers to a copolymer that is included in the vinyl-based copolymer (B-1) of the second composition group, but excludes the below-described epoxy group-containing acryl-styrene-based copolymer (S). The reason why the vinyl-based copolymer (B-2) is defined to "exclude . . . epoxy group-containing acryl-styrene-based copolymer (S)" is because there are polymers that are included in both the scope of the "vinyl-based copolymer (B-1)" and the scope of the "epoxy group-containing acryl-styrene-based copolymer (S)" and it is desired to clarify the definition. The same descriptions as those made for the vinyl-based copolymer (B-1) of the second composition group apply to the vinyl-based copolymer (B-2), except that the vinyl-based copolymer (B-2) is a copolymer that excludes the below-described epoxy group-containing acryl-styrene-based copolymer (S) from the vinyl-based copolymer (B-1).

In the fifth composition group as well, mixing of the vinyl-based copolymer (B-2) is optional and, for the same reason as in the second composition group, in a total of 100% by mass of the graft copolymer (A) and the vinyl-based copolymer (B-2) that constitute the styrene-based resin (I), the styrene-based resin (I) contains preferably 10% by mass or more of the graft copolymer (A) and 90% by mass or less of the vinyl-based copolymer (B-2), more preferably 20% by mass or more of the graft copolymer (A) and 80% by mass or less of the vinyl-based copolymer (B-2). Meanwhile, the styrene-based resin (I) contains preferably 80% by mass or less of the graft copolymer (A) and 20% by mass or more of the vinyl-based copolymer (B-2), more preferably 50% by mass or less of the graft copolymer (A) and 50% by mass or more of the vinyl-based copolymer (B-2), still more preferably 40% by mass or less of the graft copolymer (A) and 60% by mass or more of the vinyl-based copolymer (B-2).

Further, in the fifth composition group, as in the second composition group, it is preferred that the thermoplastic resin composition contain the rubbery polymer (R) in an amount of 5 to 50 parts by mass with respect to 100 parts by mass of the styrene-based resin (I).

The "polyethylene terephthalate resin (D)" in the fifth composition group is a high-molecular-weight thermoplastic polyester resin which contains terephthalic acid as an acid component and ethylene glycol as a glycol component and has an ester bond in the main chain. As an acid component other than terephthalic acid, isophthalic acid, adipic acid, oxalic acid or the like can also be used in an amount of 20% by mol or less with respect to the total amount of acid components. Further, as a glycol component other than ethylene glycol, for example, propylene glycol, 1,4-butanediol, neopentyl glycol, 1,5-pentanediol, 1,6-hexanediol, decamethylene glycol, cyclohexane dimethanol, cyclohexanediol or a long-chain glycol having a molecular weight of 400 to 6,000 (i.e., polyethylene glycol, poly-1,3-propylene glycol, polytetramethylene glycol or the like) can also be used in an amount of 20% by mol or less with respect to the total amount of glycol components.

When the polyethylene terephthalate resin (D) is incorporated, the polyethylene terephthalate resin (D) may be a polyester that has not been subjected to any thermal history such as molding, that is, a "virgin material", or a recycled material made of a molded article of the polyethylene terephthalate resin (D) (hereinafter, simply referred to as "recycled material"). From the standpoint of resource conservation, it is preferred that the polyethylene terephthalate resin (D) contain a recycled material in its entirety or a part thereof. Specific examples of the recycled material include scrap materials obtained by recovering molded articles that had been molded into PET bottles or the like at least once; and waste materials that are generated in the trimming process when molding sheet-form articles. Specific examples of the form of the recycled material include flakes, powder, and repelletized forms for removal of foreign matters. Further, it is preferred that the recycled material be free of contamination with a reinforcing material such as a glass fiber.

When the thermoplastic resin composition of the fifth composition group contains the polyethylene terephthalate resin (D), the amount thereof is not particularly restricted. However, to further improve the impact resistance of the resulting thermoplastic resin, in a total of 100 parts by mass of the styrene-based resin (I) containing the graft copolymer (A) and the polyethylene terephthalate resin (D), the thermoplastic resin composition contains preferably 50 parts by mass or more of the styrene-based resin (I) and 50 parts by mass or less of the polyethylene terephthalate resin (D), more preferably 55 parts by mass or more of the styrene-based resin (I) and 45 parts by mass or less of the polyethylene terephthalate resin (D). Meanwhile, from the standpoint of improving the fluidity of the thermoplastic resin composition, the thermoplastic resin composition contains preferably 99 parts by mass or less of the styrene-based resin (I) and 1 part by mass or more of the polyethylene terephthalate resin (D), more preferably 90 parts by mass or less of the styrene-based resin (I) and 10 parts by mass or more of the polyethylene terephthalate resin (D).

When the thermoplastic resin composition of the fifth composition group contains the styrene-based resin (I) and the polyethylene terephthalate resin (D), it is preferred that the thermoplastic resin composition further contain the above-described epoxy group-containing acryl-styrene-based copolymer (S). By incorporating the epoxy group-containing acryl-styrene-based copolymer (S), the impact resistance of the thermoplastic resin composition can be further improved. The "epoxy group-containing acryl-styrene-based copolymer (S)" refers to a copolymer which comprises an epoxy group and is different from the vinyl-based copolymer (B-2).

The method of producing the epoxy group-containing acryl-styrene-based copolymer (S) in the fifth composition group is not particularly restricted, and examples thereof include a method of copolymerizing an epoxy group-containing (meth)acrylic ester monomer, an epoxy group-free (meth)acrylic or (meth)acrylic ester monomer such as (meth)acrylic acid, and an aromatic vinyl monomer; and a method in which, after an epoxy group-free (meth)acrylic or (meth)acrylic ester monomer such as (meth)acrylic acid is copolymerized with an aromatic vinyl monomer, an epoxy group-containing alcohol is added to the carboxyl group of the (meth)acrylic acid unit of the resulting copolymer by condensation reaction.

Examples of the epoxy group-containing (meth)acrylic ester monomer include glycidyl methacrylate and glycidyl acrylate, among which glycidyl methacrylate is preferred. Two or more of these monomers may be used in combination.

Specific examples of the epoxy group-free (meth)acrylic or (meth)acrylic ester monomer include (meth)acrylic acid, methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate and 2-chloroethyl (meth)acrylate, among which (meth)acrylic acid, methyl (meth)acrylate, ethyl (meth)acrylate or n-butyl (meth)acrylate is preferably used. These monomers may be used individually, or two or more thereof may be used in combination.

Examples of the aromatic vinyl monomer include styrene, α-methylstyrene, p-methylstyrene, m-methylstyrene, o-methylstyrene, vinyl toluene and t-butylstyrene, among which styrene is preferred. These aromatic vinyl monomers may be used individually, or two or more thereof may be used in combination.

From the standpoint of further improving the fluidity of the thermoplastic resin composition, the weight-average molecular weight [Mw] of the epoxy group-containing acryl-styrene-based copolymer (S) is preferably not less than 2,000, more preferably not less than 5,000. Meanwhile, from the standpoint of inhibiting bleed-out, the weight-average molecular weight [Mw] of the epoxy group-containing acryl-styrene-based copolymer (S) is preferably 20,000 or less, more preferably 15,000 or less. The weight-average molecular weight [Mw] refers to a value which is measured by gel permeation chromatography (GPC) using a tetrahydrofuran solvent and calculated by using standard polystyrene.

From the standpoint of further improving the impact resistance, the epoxy value of the epoxy group-containing acryl-styrene-based copolymer (S) is preferably not less than 0.5 (meq/g), more preferably not less than 1.5 (meq/g). Meanwhile, from the standpoint of further improving the outer surface gloss, the epoxy value is preferably 4.0 (meq/g) or less, more preferably 3.5 (meq/g) or less. The epoxy value used herein is a value determined by a hydrochloric acid-dioxane method.

The polymerization method of the epoxy group-containing acryl-styrene-based copolymer (S) is not particularly restricted, and any known polymerization method such as bulk polymerization, solution polymerization, suspension polymerization or emulsion polymerization can be employed. A method of performing continuous bulk polymerization at a high temperature of not lower than 150° C. under pressure (preferably not less than 1 MPa) for a short time (preferably 5 to 30 minutes) is preferably employed because this method achieves high polymerization rate and does not use any polymerization initiator, chain transfer agent or solvent that causes generation of impurities and sulfur content.

When the thermoplastic resin composition of the fifth composition group contains the epoxy group-containing acryl-styrene-based copolymer (S), the amount thereof is, from the standpoint of further improving the impact resistance of the thermoplastic resin composition, preferably not less than 0.01 parts by mass, more preferably not less than 0.03 parts by mass, still more preferably not less than 0.05 parts by mass, with respect to a total of 100 parts by mass of the styrene-based resin (I) and the polyethylene terephthalate resin (D). Meanwhile, from the standpoint of improving the outer surface gloss of the thermoplastic resin composition, the amount of the epoxy group-containing acryl-styrene-based copolymer (S) is preferably 1 part by mass or less, more preferably 0.7 parts by mass or less, still more preferably 0.5 parts by mass or less.

The sixth composition group relates to a thermoplastic resin composition comprising the styrene-based resin (I) and a polyamide elastomer (E).

The thermoplastic resin composition comprising the styrene-based resin (I) and the polyamide elastomer (E) has an excellent balance of impact resistance, fluidity and color tone and exhibits excellent surface specific resistance and electrostatic diffusivity performance.

The styrene-based resin (I) of the sixth composition group is constituted of the above-described graft copolymer (A) and a vinyl-based copolymer (B-3) that is optionally added.

The graft copolymer (A) constituting the styrene-based resin (I) of the sixth composition group is the same as the graft copolymer (A) described in the first composition group.

The "vinyl-based copolymer (B-3)" constituting the styrene-based resin (I) of the sixth composition group refers to a copolymer that is included in the vinyl-based copolymer (B-1) of the second composition group, but excludes the below-described modified vinyl-based copolymer (T). The reason why the vinyl-based copolymer (B-3) is defined to "exclude . . . modified vinyl-based copolymer (T)" is because there are polymers that are included in both the scope of vinyl-based copolymer and the scope of the "modified vinyl-based copolymer (T)" and it is desired to clarify the definition. The same descriptions as those made for the vinyl-based copolymer (B-1) of the second composition group apply to the vinyl-based copolymer (B-3), except that the vinyl-based copolymer (B-3) is a copolymer that excludes the below-described modified vinyl-based copolymer (T) from the vinyl-based copolymer (B-1).

In the sixth composition group as well, the amount of the vinyl-based copolymer (B-3) to be mixed is determined arbitrarily. For the same reason as in the second composition group, in a total of 100% by mass of the graft copolymer (A) and the vinyl-based copolymer (B-3) that constitute the styrene-based resin (I), the styrene-based resin (I) contains preferably 10% by mass or more of the graft copolymer (A) and 90% by mass or less of the vinyl-based copolymer (B-3), more preferably 20% by mass or more of the graft copolymer (A) and 80% by mass or less of the vinyl-based copolymer (B-3). Meanwhile, the styrene-based resin (I) contains preferably 80% by mass or less of the graft copolymer (A) and 20% by mass or more of the vinyl-based copolymer (B-3), more preferably 50% by mass or less of the graft copolymer (A) and 50% by mass or more of the vinyl-based copolymer (B-3), still more preferably 40% by mass or less of the graft copolymer (A) and 60% by mass or more of the vinyl-based copolymer (B-3).

Further, in the sixth composition group, in the same manner as described for the second composition group, it is preferred that the thermoplastic resin composition contain the rubbery polymer (R) in an amount of 5 to 50 parts by mass with respect to 100 parts by mass of the styrene-based resin (I).

As the polyamide elastomer (E) to be incorporated in the thermoplastic resin composition of the sixth composition group, an arbitrary elastomer, examples of which include block copolymers and graft copolymers that are formed by polyamide and polyalkylene oxide, can be used. Examples of a component constituting the polyamide include aminocarboxylic acids and lactams. It is preferred that these aminocarboxylic acids and lactams each have 6 or more carbon atoms. Examples of other component constituting the polyamide include combinations of diamine and dicarboxylic acid. It is preferred that these diamine and dicarboxylic acid each have 6 or more carbon atoms. The diamine and dicarboxylic acid may be mixed to form a salt in advance. Examples of a component constituting the polyalkylene oxide include poly(alkylene oxide)glycols, among which polyethylene oxide glycol is preferred. The poly(alkylene oxide)glycols preferably have a number-average molecular weight [Mn] of 200 to 6000. In cases where the polyamide elastomer (E) is a block copolymer of polyamide and polyalkylene oxide, the polyamide and the polyalkylene oxide are normally linked via an amide bond or an ester bond.

Specific examples of the aminocarboxylic acids and lactams each having 6 or more carbon atoms and those of the salt formed by diamine and dicarboxylic acid each having 6 or more carbon atoms include aminocarboxylic acids such as ω-aminocaproic acid, ω-aminoenanthic acid, ω-aminocaprylic acid, ω-aminopergonic acid, ω-aminocapric acid, 11-aminoundecanoic acid and 12-aminoundecanoic acid; lactams such as caprolactam, enanthlactam, caprylolactam and laurolactam; and nylon salts such as hexamethylene diamine-adipic acid salt, hexamethylene diamine-sebacic acid salt and hexamethylene diamine-isophthalic acid salt.

Examples of the poly(alkylene oxide)glycols include polyethylene oxide glycol, poly(1,2-propylene oxide)glycol, poly(1,3-propylene oxide)glycol, poly(tetramethylene oxide)glycol, poly(hexamethylene oxide)glycol, block or random copolymers of ethylene oxide and propylene oxide, and block or random copolymers of ethylene oxide and tetrahydrofuran. Further, an alkylene oxide adduct of bisphenol A, fatty acid or the like may also be copolymerized. These poly(alkylene oxide)glycols have a number-average molecular weight [Mn] in a range of preferably 200 to 6,000, particularly preferably 300 to 4,000. Further, as required, both terminals of the poly(alkylene oxide)glycol component may be aminated or carboxylated.

It is also possible to use a component other than the above-described ones such as a dicarboxylic acid or diamine. In this case, from the standpoints of the polymerizability, color tone and physical properties, the dicarboxylic acid component is preferably a dicarboxylic acid having 4 to 20 carbon atoms, examples of which include aromatic dicarboxylic acids such as terephthalic acid, isophthalic acid, phthalic acid, naphthalene-2,7-dicarboxylic acid, diphenyl-4,4-dicarboxylic acid, diphenoxyethane dicarboxylic acid and sodium 3-sulfoisophthalate; alicyclic dicarboxylic acids such as 1,4-cyclohexane dicarboxylic acid, 1,2-cyclohexane dicarboxylic acid and dicyclohexyl-4,4-dicarboxylic acid; and aliphatic dicarboxylic acids such as succinic acid, oxalic acid, adipic acid, sebacic acid and 1,10-decane dicarboxylic acid.

Meanwhile, as the diamine component, aromatic, alicyclic and aliphatic diamines can be used, among which hexamethylene diamine that is an aliphatic diamine is preferably used.

The method of producing the polyamide elastomer (E) used in the sixth composition group is not particularly restricted, and an arbitrary production method can be employed. For example, a method in which (O) an aminocarboxylic acid, a lactam or a salt formed by a diamine and a dicarboxylic acid and (P) a dicarboxylic acid are allowed to react to produce a polyamide prepolymer having a carboxylic acid group on both terminals and (Q) a poly(alkylene oxide)glycol is then allowed to react with the polyamide prepolymer under vacuum can be employed. Examples of other method include a method in which the above-described compounds of (O), (P) and (Q) are supplied to a reaction vessel where, in the presence or absence of water, the supplied compounds are allowed to react under heating at a high temperature to generate a polyamide elastomer (E) with carboxylic acid ends, and polymerization thereof is then allowed to proceed at normal pressure or under reduced pressure. Alternatively, a method in which the above-described compounds of (O), (P) and (Q) are simultaneously supplied to a reaction vessel and melt-polymerized and the polymerization degree is subsequently further increased under high vacuum can also be employed.

When the thermoplastic resin composition of the sixth composition group contains the polyamide elastomer (E), the amount thereof is not particularly restricted. From the standpoint of further improving the impact resistance of the thermoplastic resin composition, in a total of 100 parts by mass of the styrene-based resin (I) and the polyamide elastomer (E), the thermoplastic resin composition contains preferably 50 parts by mass or more of the styrene-based resin (I) and 50 parts by mass or less of the polyamide elastomer (E), more preferably 70 parts by mass or more of the styrene-based resin (I) and 30 parts by mass or less of the polyamide elastomer (E). Meanwhile, from the standpoints of the surface specific resistance and electrostatic diffusivity performance, the thermoplastic resin composition contains preferably 97 parts by mass or less of the styrene-based resin (I) and 3 parts by mass or more of the polyamide elastomer (E), more preferably 95 parts by mass or less of the styrene-based resin (I) and 5 parts by mass or more of the polyamide elastomer (E).

When the thermoplastic resin composition of the sixth composition group contains the styrene-based resin (I) and the polyamide elastomer (E), it is preferred that the thermoplastic resin composition further contain a modified vinyl-based copolymer (T). By incorporating a modified vinyl-based copolymer (T), the flame retardancy, moldability and impact resistance of the thermoplastic resin composition can be further improved. The modified vinyl-based copolymer (T) is a polymer that is not included in the definition of the vinyl-based copolymer (B-3).

The modified vinyl-based copolymer (T) in the sixth composition group has a structure obtained by polymerization or copolymerization of the aromatic vinyl monomer, cyanovinyl monomer and monomer copolymerizable therewith, which monomers are used in the vinyl-based copolymer (B-1) of the second composition group. Examples of the modified vinyl-based copolymer (T) include copolymers that contain at least one functional group selected from a carboxyl group, a hydroxyl group, an epoxy group, an amino group and an oxazoline group in the molecule. The content of a monomer having the above-described functional group(s) is not restricted. However, it is particularly preferably 0.01 to 20% by mass with respect to the amount of the monomers constituting the modified vinyl-based polymer (T).

Examples of a method of producing the modified vinyl-based polymer (T) having a carboxyl group include: a method of copolymerizing a vinyl monomer having a carboxyl group or an anhydrous carboxyl group such as acrylic acid, methacrylic acid, maleic acid, monoethyl maleate, maleic anhydride, phthalic acid or itaconic acid, with a prescribed vinyl monomer(s); a method of binding a residue of a polymerization initiator having a carboxyl group such as γ,γ'-azobis(γ-cyanovaleric acid), α,α'-azobis(α-cyanoethyl)-p-benzoic acid or succinic acid peroxide, to a terminal or side chain of a polymer; a method of binding a residue of a chain transfer agent having a carboxyl group such as thioglycolic acid, α-mercaptopropionic acid, β-mercaptopropionic acid, α-mercapto-isobutyric acid or 2,3- or 4-mercaptobenzoic acid, to a terminal or side chain of a polymer; and a method of allowing a copolymer of a (meth)acrylate monomer such as methyl methacrylate or methyl acrylate, an aromatic vinyl monomer and, as required, a cyanovinyl monomer to generate a carboxyl group by saponification with an alkali.

Examples of a method of producing the modified vinyl-based polymer (T) having a hydroxyl group include a method of copolymerizing a vinyl monomer having a hydroxyl group such as 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene or 4-dihydroxy-2-butene, with other vinyl monomer(s).

Examples of a method of producing the modified vinyl-based polymer (T) having an epoxy group include a method of copolymerizing a vinyl monomer having an epoxy group such as glycidyl acrylate, glycidyl methacrylate, glycidyl ethacrylate, glycidyl itaconate, allyl glycidyl ether, styrene-p-glycidyl ether or p-glycidylstyrene, with other vinyl monomer(s).

Examples of a method of producing the modified vinyl-based polymer (T) having an amino group include a method of copolymerizing a vinyl monomer having an amino group or a derivative thereof such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine or p-aminostyrene, with other vinyl monomer(s).

Examples of a method of producing the modified vinyl-based polymer (T) having an oxazoline group include a method of copolymerizing a vinyl monomer having an oxazoline group such as 2-isopropenyl-oxazoline, 2-vinyl-oxazoline, 2-acryloyl-oxazoline or 2-styryl-oxazoline, with other vinyl monomer(s).

In the sixth composition group, the limiting viscosity [η] of the modified vinyl-based polymer (T) measured at 30° C. using methyl ethyl ketone as a solvent is preferably 0.20 to 0.65 dl/g, more preferably 0.35 to 0.60 dl/g. Further, the limiting viscosity [η] measured at 30° C. using N,N-dimethylformamide as a solvent is preferably 0.30 to 0.90 dl/g, more preferably 0.40 to 0.75 dl/g. By controlling the limiting viscosity [η] of the modified vinyl-based polymer (T) in the above-described range, a resin composition having excellent flame retardancy, impact resistance and moldability can be obtained.

From the standpoint of further improving the impact resistance of the thermoplastic resin composition, the amount of the modified vinyl-based copolymer (T) to be incorporated is preferably not less than 0.01 parts by mass with respect to a total of 100 parts by mass of the styrene-based resin (I) and the polyamide elastomer (E). Meanwhile, from the standpoint of improving the outer surface gloss of the thermoplastic resin composition, the amount of the modified vinyl-based copolymer (T) is preferably 20 parts by mass or less.

The seventh composition group is a thermoplastic resin composition comprising the styrene-based resin (I) and a polylactic acid-based resin (F).

The thermoplastic resin composition of the seventh composition group, which comprises the styrene-based resin (I) and a polylactic acid-based resin (F), has a further improved balance of impact resistance, fluidity, color tone, outer surface gloss and can provide an environmentally friendly thermoplastic resin composition.

The styrene-based resin (I) of the seventh composition group is constituted of the graft copolymer (A) and the below-described vinyl-based copolymer (B-4) that is optionally added.

The graft copolymer (A) constituting the styrene-based resin (I) of the seventh composition group has the following characteristics.

In the rubbery polymer (R) used in the graft copolymer (A) of the seventh composition group, the natural rubber and the synthetic rubber that are described in the first composition group are used in combination.

The graft copolymer (A) of the seventh composition group is obtained by graft-polymerizing the vinyl monomer mixture (a) comprising at least an aromatic vinyl monomer to the rubbery polymer (R) having a weight-average particle size as described in the first composition group, and the graft copolymer (A) includes a vinyl-based copolymer grafted to the rubbery polymer (R) and an ungrafted vinyl-based copolymer. As for the mass ratio of the rubbery polymer (R) and the vinyl monomer mixture (a) in the graft polymerization, it is preferred that the rubbery polymer (R) be used in an amount of 40 to 60 parts by mass and the vinyl monomer mixture (a) be used in an amount of 40 to 60 parts by mass. When the amount of the rubbery polymer (R) is less than 40 parts by mass, the productivity is reduced, while when the amount is greater than 60 parts by mass, the dispersibility of the rubbery polymer (R) in the graft copolymer (A) is reduced so that the impact resistance of the thermoplastic resin composition may be impaired.

It is preferred that the vinyl monomer mixture (a) contain an aromatic vinyl monomer, a cyanovinyl monomer, an unsaturated carboxylic acid alkyl ester monomer, and a vinyl monomer copolymerizable with these monomers.

Examples of the aromatic vinyl monomer that can be contained in the vinyl monomer mixture (a) include styrene, α-methylstyrene, p-methylstyrene, m-methylstyrene, o-methylstyrene, vinyl toluene and t-butylstyrene, among which styrene is preferred. These aromatic vinyl monomers may be used individually, or two or more thereof may be used in combination.

Examples of the cyanovinyl monomer that can be contained in the vinyl monomer mixture (a) include acrylonitrile, methacrylonitrile and ethacrylonitrile, among which acrylonitrile is preferred. These cyanovinyl monomers may be used individually, or two or more thereof may be used in combination.

The unsaturated carboxylic acid alkyl ester monomer that can be contained in the vinyl monomer mixture (a) is not particularly restricted. However, it is preferably an ester formed by an alcohol having 1 to 6 carbon atoms and (meth)acrylic product. The alcohol having 1 to 6 carbon atoms may further comprise a substituent(s) such as a hydroxyl group and a halogen group. Specific examples of the unsaturated carboxylic acid alkyl ester monomer include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth) acrylate, 2,3,4,5,6-pentahydroxyhexyl (meth)acrylate and 2,3,4,5-tetrahydroxypentyl (meth)acrylate, among which methyl methacrylate is most preferably used. These unsaturated carboxylic acid alkyl ester monomers may be used individually, or two or more thereof may be used in combination.

Other vinyl monomer that can be contained in the vinyl monomer mixture (a) is not particularly restricted as long as it is copolymerizable with the aromatic vinyl monomer, the cyanovinyl monomer and the unsaturated carboxylic acid alkyl ester monomer. Specific examples of such other vinyl monomer include maleimide monomers such as N-methylmaleimide, N-ethylmaleimide, N-cyclohexylmaleimide and N-phenylmaleimide; vinyl monomers having a carboxyl group or an anhydrous carboxyl group such as acrylic acid, methacrylic acid, maleic acid, monoethyl maleate, maleic anhydride, phthalic acid and itaconic acid; vinyl monomers having a hydroxyl group such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene and 4,4-dihydroxy-2-butene; vinyl monomers having an epoxy group such as glycidyl acrylate, glycidyl methacrylate, glycidyl ethacrylate, glycidyl itaconate, allyl glycidyl ether, styrene-p-glycidyl ether and p-glycidylstyrene; vinyl monomers having an amino group or a derivative thereof such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine and p-aminostyrene; and vinyl monomers having an oxazoline group such as 2-isopropenyl-oxazoline, 2-vinyl-oxazoline, 2-acryloyl-oxazoline and 2-styryl-oxazoline. These other vinyl monomers may be used individually, or two or more thereof may be used in combination.

As for the blending ratio in the vinyl monomer mixture (a), the vinyl monomer mixture (a) contains preferably 1 to 100% by mass of the aromatic vinyl monomer, 0 to 50% by mass of the cyanovinyl monomer, 0 to 99% by mass of the unsaturated carboxylic acid alkyl ester monomer and 0 to 99% by mass of other vinyl monomer copolymerizable with these monomers, more preferably 10 to 90% by mass of the aromatic vinyl monomer, 3 to 40% by mass of the cyanovinyl monomer, 0 to 90% by mass of the unsaturated carboxylic acid alkyl ester monomer and 0 to 50% by mass of other vinyl monomer copolymerizable with these monomers, still more preferably 15 to 80% by mass of the aromatic vinyl monomer, 4 to 30% by mass of the cyanovinyl monomer, 0 to 80% by mass of the unsaturated carboxylic acid alkyl ester monomer and 0 to 30% by mass of other vinyl monomer copolymerizable with these monomers. By incorporating the cyanovinyl monomer into the vinyl monomer mixture (a), the impact resistance of the thermoplastic resin composition can be further improved. Meanwhile, when the amount thereof is 50% by mass or less, yellowness of the resin can be suppressed and fluidity can be maintained. Further, by incorporating the unsaturated carboxylic acid alkyl ester, the thermoplastic resin composition shows a favorable color after it is colored.

Further, the graft copolymer (A) of the seventh composition group is the same as the graft copolymer (A) described in the first composition group and can be produced in the same manner, except for the preferred mixing ratio of the monomers in the vinyl monomer mixture (a) constituting the graft copolymer (A).

The vinyl-based copolymer (B-4) constituting the styrene-based resin (I) of the seventh composition group has the following characteristics.

The vinyl-based copolymer (B-4) of the seventh composition group is obtained by polymerization such as bulk polymerization, bulk-suspension polymerization, solution polymerization, precipitation polymerization or emulsion polymerization, of an aromatic vinyl monomer such as styrene, α-methylstyrene, o-methylstyrene, p-methylstyrene, o-ethylstyrene, p-ethylstyrene or p-t-butylstyrene. The vinyl-based copolymer (B-4) is preferably a copolymer obtained by copolymerization of a vinyl monomer mixture (b-4) containing at least an aromatic vinyl monomer and, as required, a cyanovinyl monomer and other vinyl monomer copolymerizable with these monomers. The definition of the vinyl-based copolymer (B-4) does not include the graft copolymer (A) obtained by graft-polymerizing a monomer component to the rubbery polymer (R).

Examples of the aromatic vinyl monomer constituting the vinyl-based copolymer (B-4) include the same ones as those exemplified for the vinyl monomer mixture (a) of the first composition group, among which styrene is preferred. Those aromatic vinyl monomers may be used individually, or two or more thereof may be used in combination.

Examples of the cyanovinyl monomer constituting the vinyl-based copolymer (B-4) include the same ones as those exemplified for the vinyl monomer mixture (a) of the first composition group, among which acrylonitrile is preferred. Those cyanovinyl monomers may be used individually, or two or more thereof may be used in combination. Those cyanovinyl monomers may be used individually, or two or more thereof may be used in combination.

Other monomers that constitute the vinyl-based copolymer (B-4) and can be copolymerized with the above-described monomers is a vinyl monomer different from the aromatic vinyl monomer and cyanovinyl monomer of the first composition group, and examples such other monomers include the same ones as those exemplified for other monomers that can be contained in the vinyl monomer mixture (a) and copolymerized with the above-described monomers.

As for the mixing ratio in the monomer mixture (b-4) constituting the vinyl-based copolymer (B-4), the vinyl monomer mixture (b-4) contains preferably 1 to 100% by mass of the aromatic vinyl monomer, 0 to 50% by mass of the cyanovinyl monomer, 0 to 99% by mass of the unsaturated carboxylic acid alkyl ester monomer and 0 to 99% by mass of other vinyl monomer copolymerizable with these monomers, more preferably 10 to 90% by mass of the aromatic vinyl monomer, 3 to 40% by mass of the cyanovinyl monomer, 0 to 90% by mass of the unsaturated carboxylic acid alkyl ester monomer and 0 to 50% by mass of other vinyl monomer copolymerizable with these monomers, still more preferably 15 to 80% by mass of the aromatic vinyl monomer, 4 to 30% by mass of the cyanovinyl monomer, 0 to 80% by mass of the unsaturated carboxylic acid alkyl ester monomer and 0 to 30% by mass of other vinyl monomer copolymerizable with these monomers. By controlling the mixing ratio of these monomers, not only good dispersion of the graft copolymer (A) can be attained and sufficient mechanical strength can be expressed, but also a thermoplastic resin composition having excellent chemical resistance, surface gloss and moldability can be obtained.

Further, the vinyl-based copolymer (B-4) of the seventh composition group is the same as the vinyl-based copolymer (B-1) described in the second composition group, except for the mixing ratio of the monomers in the monomer mixture constituting the vinyl-based copolymer (B-4). The vinyl-based copolymer (B-4) can be produced in the same manner as described in the second composition group.

In the seventh composition group, there is no particular restriction on the content of the graft copolymer (A) and that of the vinyl-based copolymer (B-4) in a total of 100% by mass of the graft copolymer (A) and the vinyl-based copolymer (B-4) that constitute the styrene-based resin (I). However, from the standpoint of further improving the impact resistance of the thermoplastic resin composition, the styrene-based resin (I) contains preferably 10% by mass or more of the graft copolymer (A) and 90% by mass or less of the vinyl-based copolymer (B-4), more preferably 20% by mass or more of the graft copolymer (A) and 80% by mass or less of the vinyl-based copolymer (B-4). Meanwhile, from the standpoint of further improving the fluidity of the thermoplastic resin composition, the styrene-based resin (I) contains preferably 80% by mass or less of the graft copolymer (A) and 20% by mass or more of the vinyl-based copolymer (B-4), more preferably 50% by mass or less of the graft copolymer (A) and 50% by mass or more of the vinyl-based copolymer (B-4), still more preferably 40% by mass or less of the graft copolymer (A) and 60% by mass or more of the vinyl-based copolymer (B-4).

Further, in the seventh composition group, as in the second composition group, it is preferred that the thermoplastic resin composition contain the rubbery polymer (R) in an amount of 5 to 50 parts by mass with respect to 100 parts by mass of the styrene-based resin (I).

The polylactic acid-based resin (F) in the seventh composition group is a polymer containing lactic acid as a main constituent, that is, a polylactic acid, and may also contain a copolymerization component other than lactic acid in such a range that does not adversely affect the desired effects. Examples of such other copolymerization component unit include polyvalent carboxylic acids, polyvalent hydric alcohols, hydroxycarboxylic acids and lactones. Specific examples include polyvalent carboxylic acids such as oxalic acid, malonic acid, succinic acid, glutaric acid, adipic acid, azelaic acid, sebacic acid, dodecanedioic acid, fumaric acid, cyclohexane dicarboxylic acid, terephthalic acid, isophthalic acid, phthalic acid, 2,6-naphthalene dicarboxylic acid, 5-sodium sulfoisophthalic acid and 5-tetrabutyl phosphonium sulfoisophthalic acid; polyvalent alcohols such as ethylene glycol, propylene glycol, butanediol, heptanediol, hexanediol, octanediol, nonanediol, decanediol, 1,4-cyclohexane dimethanol, neopentyl glycol, glycerin, trimethylolpropane, pentaerythritol, bisphenol A, aromatic polyvalent alcohols obtained by addition reaction of ethylene oxide to bisphenol, diethylene glycol, triethylene glycol, polyethylene glycol, polypropylene glycol and polytetramethylene glycol; hydroxycarboxylic acids such as glycolic acid, 3-hydroxybutyric acid, 4-hydroxybutyric acid, 4-hydroxyvaleric acid, 6-hydroxycaproic acid and hydroxybenzoic acid; and lactones such as glycolide, ϵ-caprolactone glycolide, ϵ-caprolactone, β-propiolactone, δ-butyrolactone, β- or γ-butyrolactone, pivalolactone and δ-valerolactone. These copolymerization components may be used individually, or two or more thereof may be used in combination.

From the standpoint of the heat resistance of the resulting resin composition, the optical purity of the lactic acid component of the polylactic acid (F) is preferably high and it is preferred that, in the total lactic acid component, L-isomers or D-isomers be contained in an amount of not less than 80% by mol, more preferably not less than 90% by mol, particularly preferably not less than 95% by mol.

Further, from the standpoints of the heat resistance and the moldability, it is also one of the preferred examples to use a stereocomplex of a polylactic acid as the polylactic acid-based resin (F). Examples of a method of forming a stereocomplex of a polylactic acid include a method of mixing a poly-L-lactic acid containing not less than 90% by mol, preferably not less than 95% by mol, more preferably not less than 98% by mol of L-isomers with a poly-D-lactic acid containing not less than 90% by mol, preferably not less than 95% by mol, more preferably not less than 98% by ml of D-isomers by melt-kneading, solution-kneading or the like. Other examples include a method of block-copolymerizing a poly-L-lactic acid and a poly-D-lactic acid. The latter method of block-copolymerizing a poly-L-lactic acid and a poly-D-lactic acid is preferred because it is capable of easily forming a stereocomplex of a polylactic acid.

As a method of producing the polylactic acid-based resin (F), an arbitrary polymerization method can be employed. Particularly, for the production of a polylactic acid, for example, direct polymerization of lactic acid or ring-opening polymerization via lactide can be employed.

The molecular weight and the molecular weight distribution of the polylactic acid-based resin (F) are not particularly restricted as long as the polylactic acid-based resin (F) can be substantially molded, and the weight-average molecular weight [Mw] is preferably not less than 10,000, more preferably not less than 40,000, still more preferably not less than 80,000. The weight-average molecular weight [Mw] refers to a value which is measured by gel permeation chromatography (GPC) using hexafluoroisopropanol as a solvent and calculated in terms of polymethyl methacrylate (PMMA).

The melting point of the polylactic acid-based resin (F) is not particularly restricted. However, it is preferably 90° C. or higher, more preferably 150° C. or higher.

The melt viscosity ratio of the vinyl-based copolymer (B-4) and the polylactic acid-based resin (F) (melt viscosity of the vinyl-based copolymer (B-4)/melt viscosity of the polylactic acid-based resin (F)) is preferably in a range of 0.1 to 10, because this enables to obtain a resin composition having excellent heat resistance. The melt viscosity is a value measured using a capillary graph measuring apparatus (CAPILOGRAPH 1C manufactured by Toyo Seiki Seisaku-Sho, Ltd.; orifice length: 20 mm, orifice diameter: 1 mm) at a temperature of 220° C. and a shear rate of 1,000 $s^{-1}$.

When the thermoplastic resin composition of the seventh composition group contains the polylactic acid-based resin (F), the amount thereof is not particularly restricted. However, from the standpoint of further improving the impact resistance of the thermoplastic resin composition, in a total of 100 parts by mass of the styrene-based resin (I) and the polylactic acid-based resin (F), the thermoplastic resin composition contains preferably 15 parts by mass or more of the styrene-based resin (I) and 85 parts by mass or less of the polylactic acid-based resin (F), more preferably 30 parts by mass or more of the styrene-based resin (I) and 70 parts by mass or less of the polylactic acid-based resin (F). Meanwhile, from the standpoint of improving the moldability of the thermoplastic resin composition, the thermoplastic resin composition contains preferably 99 parts by mass or less of the styrene-based resin (I) and 1 part by mass or more of the polylactic acid-based resin (F), more preferably 95 parts by mass or less of the styrene-based resin (I) and 5 parts by mass or more of the polylactic acid-based resin (F).

When the thermoplastic resin composition of the seventh composition group contains the styrene-based resin (I) and the polylactic acid-based resin (F), it is preferred that the thermoplastic resin composition further contain an acrylic resin (V). By incorporating an acrylic resin (V), the impact resistance of the thermoplastic resin composition can be further improved.

The acrylic resin (V) used in the seventh composition group is a polymer or copolymer of an alkyl (meth)acrylate monomer(s) and is not included in the scope of the graft copolymer (A) or that of the vinyl-based copolymer (B-4).

Examples of the alkyl (meth)acrylate monomer include methyl methacrylate, methyl acrylate, ethyl acrylate, ethyl methacrylate, butyl acrylate, butyl methacrylate, cyclohexyl methacrylate, hydroxyethyl methacrylate, glycidyl methacrylate, allyl methacrylate, aminoethyl acrylate, propylaminoethyl acrylate, 2-hydroxyethyl acrylate, 2-hydroxypropyl acrylate, glycidyl acrylate, dicyclopentenyloxyethyl acrylate, dicyclopentanyl acrylate, butanediol diacrylate, nonanediol diacrylate, polyethylene glycol diacrylate, methyl 2-(hydroxymethyl)acrylate, ethyl 2-(hydroxymethyl)acrylate, methacrylic acid, ethyl methacrylate, butyl methacrylate, cyclohexyl methacrylate, dimethylaminoethyl methacrylate, ethylaminopropyl methacrylate, phenylaminoethyl methacrylate, cyclohexylaminoethyl methacrylate, 2-hydroxyethyl methacrylate, 2-hydroxypropyl methacrylate, glycidyl methacrylate, dicyclopentenyloxyethyl methacrylate, dicyclopentanyl methacrylate, pentamethylpiperidyl methacrylate, tetramethylpiperidyl methacrylate, benzyl methacrylate, ethylene glycol dimethacrylate, propylene glycol dimethacrylate, and polyethylene glycol dimethacrylate. These alkyl (meth)acrylate monomers may be used individually, or two or more thereof may be used in combination.

Further, a copolymer containing a ring structural unit such as a lactone ring, maleic anhydride or glutaric anhydride in the main chain can also be used.

The acrylic resin (V) is preferably a polymethyl methacrylate-based resin comprising a methyl methacrylate component unit as a main component, more preferably a polymethyl methacrylate-based resin comprising a methyl methacrylate component unit in an amount of not less than 70% by mass, still more preferably a polymethyl methacrylate (PMMA) resin.

The molecular weight and the molecular weight distribution of the acrylic resin (V) are not particularly restricted as long as the acrylic resin (V) can be substantially molded. However, from the standpoint of moldability, the weight-average molecular weight [Mw] is preferably not less than 1,000, more preferably not less than 10,000, still more preferably not less than 30,000. Meanwhile, the weight-average molecular weight [Mw] is preferably 450,000 or less, more preferably 200,000 or less, still more preferably 150,000 or less. The weight-average molecular weight [Mw] means a value which is measured by GPC using tetrahydrofuran as a solvent and calculated in terms of polymethyl methacrylate (PMMA).

Further, from the standpoint of the heat resistance, the glass transition temperature of the acrylic resin (V) is preferably 60° C. or higher, more preferably 70° C. or higher, still more preferably 80° C. or higher, particularly preferably 90° C. or higher, most preferably 100° C. or higher. The upper limit is not particularly restricted. However, from the standpoint of moldability, the glass transition temperature is preferably not higher than 150° C. The glass transition temperature used herein is a value determined by differential scanning calorimetry (DSC), which is a temperature at which the change in specific heat capacity in the grass transition temperature region is reduced by half.

When a polymethyl methacrylate-based resin is used as the acrylic resin (V), the syndiotacticity of the methacrylic resin is preferably 20% or higher, more preferably 30% or higher, still more preferably 40% or higher. The upper limit is not particularly restricted; however, from the standpoint of moldability, the syndiotacticity is preferably not higher than 90%. In addition, from the standpoint of heat resistance, the heterotacticity is preferably not higher than 50%, more preferably not higher than 40%, still more preferably not higher than 30%. Further, from the standpoint of heat resistance, the isotacticity is not higher than 20%, more preferably not higher than 15%, still more preferably not higher than 10%. The syndiotacticity, the heterotacticity and the isotacticity are each a value calculated from the integrated intensity ratio of linear branched methyl group determined by $^1$H-NMR measurement using deuterated chloroform as solvent.

As a method of producing the acrylic resin (V), an arbitrary polymerization method such as bulk polymerization, solution polymerization, suspension polymerization or emulsion polymerization, can be employed.

When the acrylic resin (V) is used in combination in the seventh composition group, from the standpoint of the impact resistance, the acrylic resin (V) is incorporated in an amount of preferably not less than 1 part by mass, more preferably not less than 2 parts by mass, with respect to 100 parts by mass of the thermoplastic resin comprising the styrene-based resin (I) and the polylactic acid-based resin (F). Meanwhile, the amount of the acrylic resin (V) to be incorporated is preferably 30 parts by mass or less, more preferably 20 parts by mass or less. The amount of the acrylic resin (V) is sufficient at 30 parts by mass, and there is no major effect of improving the impact resistance even if the acrylic resin (V) is incorporated in a larger amount.

When the thermoplastic resin composition of the seventh composition group contains the styrene-based resin (I) and the polylactic acid-based resin (F), it is preferred that the thermos-plastic resin composition further contain phosphoric acid and/or monosodium phosphate (U).

The graft copolymer (A) shows alkalinity in its production process. This consequently causes degradation of the polylactic acid resin (F). By incorporating the above-described phosphorus compound, the degradation of the polylactic acid-based resin (F) can be suppressed to improve the thermal stability of the thermoplastic resin composition. Besides, from the standpoint of the influence of irritating odor on human safety and hygiene, which irritating odor is generated during the material blending and melt-compounding of resin composition and molding of the resulting resin composition, as well as from the standpoint of the thermal stability and the like of the resin composition, the phosphorus compound is superior to already-known other neutralizers including organic acids.

Particularly, when the use of the thermoplastic resin composition is expanded to applications such as food utensils and toys where human safety and hygiene are more stringently required, monosodium phosphate (U) is preferably used. Monosodium phosphate (U) itself is widely used in the medical field and food additives and its safety upon ingestion has already been confirmed. Moreover, monosodium phosphate (U) has been determined suitable as a resin additive also by Japan Hygienic Olefin And Styrene Plastics Association, a self-regulatory organization of the industry for prevention of hygienic harm caused by food utensils and the like.

When the thermoplastic resin composition contains phosphoric acid and/or monosodium phosphate (U), the amount thereof is, from the standpoints of inhibiting alkaline degradation of the polylactic acid-based resin (F) and further improving the initial impact resistance and the post-heat holding impact resistance of the thermoplastic resin composition, preferably not less than 0.01 parts by mass, more preferably not less than 0.1 parts by mass, with respect to a total of 100 parts by mass of the styrene-based resin (I) and the polylactic acid-based resin (F). Meanwhile, from the standpoints of inhibiting foaming of a molded article during heat holding and improving the surface appearance of the molded article, the amount of phosphoric acid and/or monosodium phosphate (U) to be contained is preferably 5 parts by mass or less, more preferably 2 parts by mass or less, still more preferably 0.5 parts by mass or less.

In addition, an acidic substance capable of neutralizing the alkalinity of the graft copolymer (A) can also be used in such a range where the properties of the phosphoric acid and/or monosodium phosphate (U) are not impaired and the safety and hygiene of the production are not adversely affected. Specific examples of the acidic substance include inorganic acids such as hydrochloric acid, sulfuric acid and nitric acid; organic acids such as acetic acid, oxalic acid, malonic acid, succinic acid, maleic acid, adipic acid, sebacic acid, azelaic acid, dodecanedioic acid, cyclohexanedicarboxylic acid, citric acid, terephthalic acid, isophthalic acid, orthophthalic acid, benzoic acid, trimellitic acid, pyromellitic acid, phenol, naphthalenedicarboxylic acid and diphenic acid; and acid anhydrides of oxalic acid, malonic acid, succinic acid, maleic acid, adipic acid, sebacic acid, azelaic acid, dodecanedioic acid, citric acid, orthophthalic acid, trimellitic acid and pyromellitic acid. Two or more of these acidic substances may be used in combination.

From the standpoint of improving the heat resistance, it is preferred that the thermoplastic resin composition of the seventh composition group further contain a crystal nucleating agent. As the crystal nucleating agent, those that are commonly used as a crystal nucleating agent of a polymer can be used without any particular restriction, and both inorganic and organic crystal nucleating agents can be used. These crystal nucleating agents may be used individually, or two or more thereof may be used in combination.

Specific examples of the inorganic crystal nucleating agent include talc, kaolinite, montmorillonite, mica, synthetic mica, clay, zeolite, silica, graphite, carbon black, zinc oxide, magnesium oxide, calcium oxide, titanium oxide, calcium sulfide, boron nitride, magnesium carbonate, calcium carbonate, barium sulfate, aluminum oxide, neodymium oxide, and metal salts of phenylphosphonate. Thereamong, talc, kaolinite, montmorillonite and synthetic mica are preferred because of their excellent heat resistance-improving effects. These inorganic crystal nucleating agents may be used individually, or two or more thereof may be used in combination. These inorganic crystal nucleating agents are preferably modified with an organic substance to improve the dispersibility in the composition.

The content of the inorganic crystal nucleating agent(s) is preferably 0.01 to 100 parts by mass, more preferably 0.05 to 50 parts by mass, still more preferably 0.1 to 30 parts by mass, with respect to 100 parts by mass of the polylactic acid-based resin (F).

Specific examples of the organic crystal nucleating agent include metal salts of organic carboxylic acids such as sodium benzoate, potassium benzoate, lithium benzoate, calcium benzoate, magnesium benzoate, barium benzoate, lithium terephthalate, sodium terephthalate, potassium terephthalate, calcium oxalate, monosodium laurate, potassium laurate, sodium myristate, potassium myristate, calcium myristate, sodium octacosanoate, calcium octacosanoate, monosodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate and sodium cyclohexanecarboxylate; organic sulfonates such as sodium p-toluenesulfonate and sodium sulfoisophthalate; carboxylic acid amides such as stearic acid amide, ethylene bislauric acid amide, palmitic acid amide, hydroxystearic acid amide, erucic acid amide and trimesic acid tris(t-butylamide); polymers such as low-density polyethylene, high-density polyethylene, polypropylene, polyisopropylene, polybutene, poly-4-methylpentene, poly-3-methylbutene-1, polyvinyl cycloalkane, polyvinyl trialkylsilane and high-melting-point polylactic acid; sodium salts or potassium salts of carboxyl group-containing polymer (so-called ionomer) such as sodium salts of ethylene-acrylic acid or ethylene-methacrylic acid copolymers and sodium salts of styrene-maleic anhydride copolymers; benzylidene sorbitol and derivatives thereof; metal salts of phosphorus compounds such as sodium-2,2'-methylene-bis(4,6-di-t-butylphenyl)phosphate; and 2,2-methylbis(4,6-di-t-butyl-phenyl)sodium. From the standpoint of improving the heat resistance, metal salts of organic carboxylic acids and carboxylic acid amides are preferred. These organic crystal nucleating agents may be used individually, or two or more thereof may be used in combination.

The content of the organic crystal nucleating agent(s) is preferably 0.01 to 30 parts by mass, more preferably 0.05 to 10 parts by mass, still more preferably 0.1 to 5 parts by mass, with respect to 100 parts by mass of the polylactic acid-based resin (F).

From the standpoint of improving the heat resistance, it is preferred that the thermoplastic resin composition further contain a plasticizer. As the plasticizer, those that are commonly used as a plasticizer of a polymer can be used without any particular restriction, and examples thereof include polyester-based plasticizers, glycerin-based plasticizers, polyvalent carboxylic acid ester-based plasticizers, polyalkylene glycol-based plasticizers, and epoxy-based plasticizers. These plasticizers may be used individually, or two or more thereof may be used in combination.

Specific examples of the polyester-based plasticizers include polyesters composed of an acid component such as adipic acid, sebacic acid, terephthalic acid, isophthalic acid, naphthalene dicarboxylic acid or diphenyldicarboxylic acid, and a diol component such as propylene glycol, 1,3-butanediol, 1,4-butanediol, 1,6-hexanediol, ethylene glycol or diethylene glycol; and polyesters composed of hydroxycarboxylic acid such as polycaprolactone. The terminals of these polyesters may be sealed with a monofunctional carboxylic acid or a monofunctional alcohol, or with an epoxy compound or the like.

Specific examples of the glycerin-based plasticizers include glycerin monoacetomonolaurate, glycerin diacetomonolaurate, glycerin monoacetomonostearate, glycerin diacetomonooleate and glycerin monoacetomonomontanate.

Specific examples of the polyvalent carboxylic acid-based plasticizers include phthalic acid esters such as dimethyl phthalate, diethyl phthalate, dibutyl phthalate, dioctyl phthalate, diheptyl phthalate, dibenzyl phthalate and butyl benzyl phthalate; trimellitic acid esters such as tributyl trimellitate, trioctyl trimellitate and trihexyl trimellitate; sebacic acid esters such as diisodecyl adipate and n-octyl-n-decyl adipate; citric acid esters such as acetyl triethyl citrate and acetyl tributyl citrate; azelaic acid esters such as di-2-ethylhexyl azelate; and sebacic acid esters such as dibutyl sebacate and di-2-ethylhexyl sebacate.

Specific examples of the polyalkylene glycol-based plasticizers include polyalkylene glycols such as polyethylene glycol, polypropylene glycol, poly(ethylene oxide/propylene oxide) block and/or random copolymers, polytetramethylene glycol, ethylene oxide addition polymers of bisphenols, propylene oxide addition polymers of bisphenols, and tetrahydrofuran addition polymers of bisphenols; and compounds having a sealed terminal(s) such as compounds having an epoxy-modified terminal, compounds having an ester-modified terminal and compounds having an ether-modified terminal.

Examples of the epoxy-based plasticizers generally include epoxy triglycerides composed of an alkyl epoxy stearate and soybean oil. In addition, so-called epoxy resins, which are produced mainly from bisphenol A and epichlorohydrin, can also be used as the plasticizer.

Specific examples of other plasticizers include benzoic acid esters of aliphatic polyols such as neopentyl glycol dibenzoate, diethylene glycol dibenzoate, and triethylene glycol di-2-ethylbutyrate; fatty acid amides such as stearic acid amide; aliphatic carboxylic acid esters such as butyl oleate; oxy acid esters such as methyl acetyl ricinoleate and butyl acetyl ricinoleate; pentaerythritol; various sorbitols; polyacrylic acid esters; silicone oils; and paraffins.

As the plasticizer, among the above-described plasticizers, at least one selected from the polyester-based plasticizers and the polyalkylene glycol-based plasticizers is particularly preferably used.

The content of the plasticizer(s) is preferably 0.01 to 30 parts by mass, more preferably 0.1 to 20 parts by mass, still more preferably 0.5 to 10 parts by mass, with respect to 100 parts by mass of the polylactic acid-based resin (F).

In the seventh composition group, these crystal nucleating agents and plasticizers may each be used individually. However, they are preferably used in combination.

In the seventh composition group, from the standpoints of inhibiting hydrolysis of the polylactic acid-based resin (F) to further improve the heat resistance and the durability, it is preferred that the thermoplastic resin composition further contain a reactive terminal blocking agent to the carboxyl group. The reactive terminal blocking agent to the carboxyl group is not particularly restricted as long as it is a compound capable of sealing a terminal carboxyl group of a polymer, and any compound used as a sealant of a terminal carboxyl group of a polymer can be used. The reactive terminal blocking agent to the carboxyl group is capable of sealing not only a terminal of the polylactic acid-based resin (F), but also carboxyl groups of acidic low-molecular-weight compounds such as lactic acid and formic acid, that are generated by pyrolysis or hydrolysis of a naturally-occurring organic filler. Further, it is more preferred that the terminal blocking agent be a compound capable of sealing also a terminal hydroxyl group generated by pyrolysis of an acidic low-molecular-weight compound.

As such a reactive terminal blocking agent to the carboxyl group, it is preferred to use at least one compound selected from epoxy compounds, oxazoline compounds, oxazine compounds, carbodiimide compounds and isocyanate compounds, among which an epoxy compound and/or a carbodiimide compound are preferred.

The content of the reactive terminal blocking agent(s) to the carboxyl group is preferably 0.01 to 10 parts by mass, more preferably 0.05 to 5 parts by mass, with respect to 100 parts by mass of the polylactic acid-based resin (F).

The timing of adding the reactive terminal blocking agent to the carboxyl group is not particularly restricted. However, it is preferred to melt-knead the reactive terminal blocking agent to the carboxyl group with the polylactic acid-based resin (F) in advance and then knead the resultant with other components, because not only heat resistance but also mechanical properties and thermal stability can be thereby improved.

Disclosure of the eighth composition group relates to a thermoplastic resin composition comprising the styrene-based resin (I) and a polycarbonate resin (G).

The thermoplastic resin composition of the eighth composition group, which comprises the styrene-based resin (I) and a polycarbonate resin (G), has an excellent balance of impact resistance, fluidity, color tone, outer surface gloss, as well as heat resistance and mechanical strength.

The styrene-based resin (I) of the eighth composition group is constituted by the above-described graft copolymer (A) and the below-described vinyl-based copolymer (B-5) that is optionally added.

The graft copolymer (A) constituting the styrene-based resin (I) of the eighth composition group is the same as the graft copolymer (A) described in the first composition group.

The vinyl-based copolymer (B-5) constituting the styrene-based resin (I) of the eighth composition group is included in the scope of the vinyl-based copolymer (B-1) of the second composition group. However, it is preferred that the vinyl-based copolymer (B-5) be a copolymer obtained by copolymerizing 60 to 85% by mass of an aromatic vinyl monomer, 15 to 40% by mass of a cyanovinyl monomer and 0 to 20% by mass, preferably 0 to 10% by mass, of a vinyl monomer copolymerizable with these monomers. By copolymerizing an aromatic vinyl monomer in an amount of not less than 60% by mass, the impact resistance can be further improved. Meanwhile, by copolymerizing an aromatic vinyl monomer in an amount of 85% by mass or less, the compatibility with the graft copolymer (A) can be improved and the impact resistance and chemical resistance can be thereby further improved. The vinyl-based copolymer (B-5) is obtained by copolymerizing preferably 65 to 83% by mass of an aromatic vinyl monomer, 17 to 35% by mass of a cyanovinyl monomer and 0 to 20% by mass, preferably 0 to 10% by mass, of a vinyl monomer copolymerizable with these monomers, more preferably 65 to 77% by mass of an aromatic vinyl monomer, 23 to 35% by mass of a cyanovinyl monomer and 0 to 20% by mass, preferably 0 to 10% by mass, of a vinyl monomer copolymerizable with these monomers.

Other features of the vinyl-based copolymer (B-5) are the same as those of the vinyl-based copolymer (B-1) of the second composition group and the vinyl-based copolymer (B-5) can thus be produced in the same manner.

In the eighth composition group as well, mixing of the vinyl-based copolymer (B-5) is optional and is not required. However, for the same reason as in the second composition group, in a total of 100% by mass of the graft copolymer (A) and the vinyl-based copolymer (B-5) that constitute the styrene-based resin (I), the styrene-based resin (I) contains preferably 10% by mass or more of the graft copolymer (A) and 90% by mass or less of the vinyl-based copolymer (B-5), more preferably 20% by mass or more of the graft copolymer (A) and 80% by mass or less of the vinyl-based copolymer (B-5).

Meanwhile, the styrene-based resin (I) contains preferably 80% by mass or less of the graft copolymer (A) and 20% by mass or more of the vinyl-based copolymer (B-5), more preferably 50% by mass or less of the graft copolymer (A) and 50% by mass or more of the vinyl-based copolymer (B-5), still more preferably 40% by mass or less of the graft copolymer (A) and 60% by mass or more of the vinyl-based copolymer (B-5).

Further, in the eighth composition group, as in the second composition group, it is preferred that the thermoplastic resin composition contain the rubbery polymer (R) in an amount of 5 to 50 parts by mass with respect to 100 parts by mass of the styrene-based resin (I).

The polycarbonate resin (G) of the eighth composition group is a resin having a repeating structural unit represented by Formula (3):

(3)

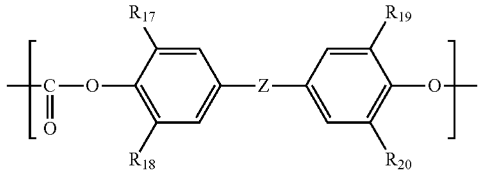

wherein, Z represents a substituted or unsubstituted alkylidene group having 2 to 5 carbon atoms, a cyclohexylidene group, an oxygen atom, a sulfur atom or a sulfonyl group; and $R_{17}$, $R_{18}$, $R_{19}$ and $R_{20}$ each represent a hydrogen atom or an alkyl group having 1 to 6 carbon atoms, and may be the same or different from each other.

The polycarbonate resin (G) is obtained by reaction between an aromatic dihydroxy compound, which is typically exemplified by 2,2-bis(4-hydroxyphenyl)propane or 2,2-bis(3,5-dimethyl-4-hydroxyphenyl)propane, and a carbonate precursor typically exemplified by phosgene.

Examples of the aromatic dihydroxy compound include the same ones as those exemplified for the aromatic dihydroxy compound used as a material of the aromatic polycarbonate oligomer (K) in the fourth composition group. Bis(4-hydroxyphenyl)alkanes are preferred, and bisphenol A is particularly preferred. These aromatic dihydroxy compounds may be used individually, or two or more thereof may be used in combination or copolymerized.

Examples of the carbonate precursor reacted with the aromatic dihydroxy compound include the same ones as those exemplified for the aromatic dihydroxy compound used as a material of the aromatic polycarbonate oligomer (K) in the fourth composition group. Phosgene is often preferably used. These carbonate precursors may also be used individually, or two or more thereof may be used in combination.

The method of producing the polycarbonate resin (G) used in the eighth composition group is not particularly restricted, and a conventionally known method can be employed. Specific examples thereof include interfacial polymerization (phosgene method), melt transesterification, solution polymerization (pyridine method), ring-opening polymerization of a cyclic carbonate compound, and solid-phase transesterification of a prepolymer.

As a representative production method, a production method utilizing interfacial polymerization will now be described. In the presence of an inert organic solvent and an aqueous alkaline solution, an aromatic dihydroxy compound is allowed to react with phosgene using, as required, a molecular weight modifier (terminal blocking agent) and an antioxidant for antioxidation of the aromatic dihydroxy compound, normally while maintaining the pH at 9 or higher, and a polymerization catalyst such as a tertiary amine or a quaternary ammonium salt is subsequently added to perform interfacial polymerization, thereby the polycarbonate resin (G) is obtained. The timing of the addition of the molecular weight modifier is not particularly restricted as long as it is between the phosgenation and the start of the polymerization reaction. The reaction temperature is, for example, 0 to 40° C., and the reaction time is, for example, 2 to 5 hours.

The organic solvent that can be used in the interfacial polymerization may be any organic solvent as long as it is inert to the interfacial polymerization reaction, is not miscible with water and is capable of dissolving the polycarbonate resin (G). Examples of such an organic solvent include chlorinated hydrocarbons such as dichloromethane, 1,2-dichloroethane, tetrachloro-ethane, chloroform, monochlorobenzene and dichlorobenzene; and aromatic hydrocarbons such as benzene, toluene and xylene. Examples of the alkali compound used in the aqueous alkaline solution include alkali metal hydroxides such as sodium hydroxide and potassium hydroxide.

Examples of the molecular weight modifier include compounds having a monovalent phenolic hydroxyl group; and phenyl chloroformate. Examples of the compounds having a monovalent phenolic hydroxyl group include m-methylphenol, p-methylphenol, m-propylphenol, p-propylphenol, p-tert-butylphenol and p-long chain alkyl-substituted phenol. The molecular weight modifier is preferably used in an amount of 0.1 to 1 mol with respect to 100 mol of the aromatic dihydroxy compound.

Examples of the polymerization catalyst include tertiary amines such as trimethylamine, triethylamine, tributylamine, tripropylamine, trihexylamine and pyridine; and quaternary ammonium salts such as trimethylbenzylammonium chloride, tetrabutylammonium chloride, tetramethylammonium chloride, triethylbenzylammonium chloride and trioctylmethylammonium chloride.

When the thermoplastic resin of the eighth composition group contains the polycarbonate resin (G), the amount thereof is not particularly restricted. However, from the standpoint of the fluidity, in a total of 100 parts by mass of the styrene-based resin (I) and the polycarbonate resin (G), the thermoplastic resin contains preferably 15 parts by mass or more of the styrene-based resin (I) and 85 parts by mass or less of the polycarbonate resin (G), more preferably 20 parts by mass or more of the styrene-based resin (I) and 80 parts by mass or less of the polycarbonate resin (G), still more preferably 30 parts by mass or more of the styrene-based resin (I) and 70 parts by mass or less of the polycarbonate resin (G). Meanwhile, from the standpoints of the impact resistance and the heat resistance, the thermoplastic resin contains preferably 60 parts by mass or less of the styrene-based resin (I) and 40 part by mass or more of the polycarbonate resin (G), more preferably 50 parts by mass or less of the styrene-based resin (I) and 50 parts by mass or more of the polycarbonate resin (G), still more preferably 45 parts by mass or less of the styrene-based resin (I) and 55 part by mass or more of the polycarbonate resin (G).

The melt volume rate of the polycarbonate resin (G) of the eighth composition group is not particularly restricted, and any polycarbonate resin can be used. However, the melt volume rate measured in accordance with ISO 1133 at 300° C. under a load of 1.2 kgf is preferably in a range of 8 to 13 $cm^3/10$ min. By using a polycarbonate resin having the melt volume rate of not lower than 8 $cm^3/10$ min, the fluidity in injection molding can be further improved. Meanwhile, by using a polycarbonate resin having the melt volume rate of 13 $cm^3/10$ min or lower, the impact resistance and the heat resistance can be further improved. The melt volume rate is more preferably 12 $cm^3/10$ min or lower, still more preferably 11 $cm^3/10$ min or lower.

Preferred examples common to the first to eighth composition group will now be described.

In the thermoplastic resin composition, as required, other additive(s), examples of which include inorganic fillers such as glass fibers, glass powders, glass beads, glass flakes, alumina, alumina fibers, carbon fibers, graphite fibers, stainless-steel fibers, whiskers, potassium titanate fibers, wollastonite, asbestos, hard clays, calcinated clays, talc, kaolin, mica, calcium carbonate, magnesium carbonate, aluminum oxide and minerals; antioxidants such as hindered phenol-based, sulfur-containing compound-based and phosphorus-containing organic compound-based antioxidants; heat stabilizers such as phenol-based and acrylate-based heat stabilizers; ultraviolet absorbers such as benzotriazole-based, benzophenone-based and salicylate-based ultra-violet absorbers; hindered amine-based light stabilizers; lubricants and plasticizers such as higher fatty acids, acid esters, acid amides and higher alcohols; mold-release agents such as montanoic acid and salts, esters and half-esters thereof, stearyl alcohols, stearamides and ethylene wax; various flame retardants; flame retardant auxiliaries; coloration inhibitors such as phosphites and hypophosphites; neutralizers such as phosphoric acid, sodium phosphate, maleic anhydride and succinic anhydride; nucleating agents; antistatic agents such as amine-based, sulfonic acid-based and polyether-based antistatic agents; and coloring agents such as carbon blacks, pigments and dyes, can also be incorporated in such a range that does not adversely affect the compositions.

The method of incorporating these additives is not particularly restricted, and various methods can be employed.

Further, in common to all examples, at least one of other thermoplastic resins (e.g., polyamide resin, polyphenylene sulfide resin, polyether ether ketone resin, polyester resin other than the polylactic acid-based resin, polysulfone resin, polyether sulfone resin, polyarylate resin, polyphenylene oxide resin, polyacetal resin, polyimide resin, polyether imide resin, aromatic or aliphatic polyketone resin, fluorocarbon resin, polyvinyl chloride-based resin, polyvinylidene chloride resin, vinyl ester-based resin, cellulose acetate resin and polyvinyl alcohol resin), thermosetting resins (e.g., phenol resin, melamine resin, polyester resin, silicone resin and epoxy resin) and the like can also be incorporated in such a range that does not adversely affect the objects of the composition.

In the thermoplastic resin compositions of the third to eighth composition groups, other thermoplastic resins (II) characterized by the descriptions of other composition groups can be used in combination.

By incorporating these resins, a molded article having excellent properties can be obtained.

The above-described various additives that can be incorporated in the thermoplastic resin composition can be added at any stage during the production of the thermoplastic resin composition. For example, a method in which the additives are added simultaneously with blending of the resin components, or a method in which the additives are added after melt-kneading a resin of at least two components in advance can be employed.

The method of producing the thermoplastic resin composition is not particularly restricted. The thermoplastic resin composition may be a composition obtained by mixing the components constituting the thermoplastic resin composition using, for example, a mixer such as a V-blender, a super mixer, a super floater or a Henschel mixer. However, normally, the thermoplastic resin composition is often a mixture obtained by uniformly melt-mixing a product of the above-described mixing. Such a mixture can be obtained by, for example, melt-kneading the above-described mixed product using a kneading means at a temperature of preferably 210 to 320° C., more preferably 230 to 300° C. or so, and subsequently pelletizing the resultant. Particularly, it is more preferred that the thermoplastic resin compositions of the second, third, fourth and seventh composition groups be each melt-kneaded at 210 to 260° C.; the thermoplastic resin composition of the fifth composition group be melt-kneaded at 250 to 285° C.; the thermoplastic resin composition of the sixth composition group be melt-kneaded at 220 to 240° C.; and the thermoplastic resin composition of the eighth composition group be melt-kneaded at 280 to 300° C. or so.

Specific examples of the melt-kneading and pelletizing means include a method in which a resin composition is melt-extruded using a melt-mixing machine such as a kneader or an uniaxial or biaxial extruder, and subsequently pelletized using a pelletizer.

Examples of the method of producing the thermoplastic resin of the seventh composition group comprising the styrene-based resin (I) and the polylactic acid-based resin (F) include a method in which resin components, phosphoric acid and/or monosodium phosphate (U) and, as required, a crystal nucleating agent(s), a plasticizer(s), a filler(s) and other additive(s) are mixed in advance and the resulting mixture is then uniformly melt-kneaded at a temperature of not lower than the melting points of the resin components using an uniaxial or biaxial extruder; and a method in which these components are mixed and a solvent is removed thereafter. In cases where the thermoplastic resin composition is produced by mixing the above-described components, alkaline degradation of the polylactic acid-based resin (F) may occur depending on the components mixed. Therefore, to inhibit alkaline degradation of the polylactic acid-based resin (F), it is preferred to prepare a pellet in advance by kneading the graft copolymer (A), vinyl-based copolymer (B-4) and phosphoric acid and/or monosodium phosphate (U).

Further, when the thermoplastic resin composition is produced to be molded into an extrusion-molded article such as a sheet, it is preferred that the thermoplastic resin composition be produced by first melt-kneading the components other than the polylactic acid-based resin (F) and then further melt-kneading the resultant with an addition of the polylactic acid-based resin (F).

This production method will now be described by way of a concrete example. In this production method, the resin components other than the polylactic acid-based resin (F) and phosphoric acid (or monosodium phosphate) (U) as well as the above-described crystal nucleating agent(s), plasticizer(s), filler(s) and other additive(s) are fed through a top feed port (main material-feeding side) of a biaxial extruder. The polylactic acid-based resin (F) is fed through a side feed port (auxiliary material-feeding side) arranged near the center of the full length of the barrel of the biaxial extruder, and the resulting mixture is further melt-kneaded to obtain the thermoplastic resin composition. An importance may be given to the surface appearance in molded articles such as a sheet, and this method is capable of reducing the spot generation that impairs the surface appearance.

The thermoplastic resin composition obtained in the above-described manner can be molded by an arbitrary method such as injection molding, extrusion molding, blow molding, vacuum molding, compression molding or gas-assisted molding. The molding method is not particularly restricted. However, the thermoplastic resin composition is preferably molded by injection molding.

The injection molding can be performed in a normal molding temperature of preferably 210 to 320° C. Particularly, it is more preferred that the thermoplastic resin compositions of the second, third, fourth, sixth and seventh composition groups be injection-molded at 210 to 260° C.; the thermoplastic resin composition of the fifth composition group be injection-molded at 240 to 270° C.; and the thermoplastic resin composition of the eighth composition group be injection-molded at 240 to 300° C.

The mold temperature in the injection molding is in a range normally used for molding, which is preferably 30 to 80° C.

The thermoplastic resin composition can be molded by an arbitrary method such as injection molding, extrusion molding, inflation molding or blow molding, to be widely used as a molded article in a variety of shapes. Examples of the molded article include films, sheets, fibers, cloths, nonwoven fabrics, injection-molded articles, extrusion-molded articles, vacuum compression-molded articles, blow-molded articles and composites with other materials, which are useful in applications such as automobile materials, materials of electric and electronic devices, agricultural materials, gardening materials, fishing materials, civil engineering and construction materials, stationeries, medical supplies, toilet seats and miscellaneous goods.

EXAMPLES

Our compositions and methods will now be described in more detail by way of examples thereof. However, this disclosure is not restricted thereto.

(1) Measurement of Weight-Average Particle Sizes of Natural Rubber and Synthetic Rubber A natural rubber latex and a synthetic rubber latex were diluted and dispersed in an aqueous medium to measure their particle size distributions using a laser scattering diffraction particle size distribution analyzer, "LS 13 320" (Beckman Coulter, Inc.). From the thus obtained particle size distributions, the weight-average particle sizes of the subject natural rubber and synthetic rubber were determined. For the natural rubber, the ratio of particles with a size of 1.0 m or larger with respect to all of the particles of the natural rubber was calculated from the particle size distribution.

(2) Measurement of Graft Ratio

After adding 80 ml of acetone to about 1 g of a graft copolymer (A) sample (m: sample mass), the resultant was refluxed for 3 hours in a 70° C. hot-water bath. This solution was centrifuged at 8,000 r.p.m. (10,000 G) for 40 minutes, and insoluble matter was subsequently removed by filtration. The thus obtained acetone-insoluble component was dried under reduced pressure at 80° C. for 5 hours, and the mass (n) of the dried component was measured to calculate the graft ratio using Equation 2. X represents the content of the rubbery polymer in the graft copolymer (A).

$$\text{Graft ratio (\%)}=\{[(n)-(m)\times X]/[(m)\times X]\}\times 100 \quad (2)$$

An acetone-soluble component was, after removal of acetone therefrom, used in the measurement of weight-average molecular weight described in (5) below.

(3) Calculation of Internal Graft Ratio

The ratio of the amount of vinyl-based copolymer contained in the rubbery polymer (R) (internal graft amount), (Y), with respect to the total amount of the rubbery polymer (R) and the vinyl-based copolymer contained therein, [(Y)+(R)], was calculated as the internal graft ratio. Specifically, in a photograph of a sample adjusted by osmic acid staining which was taken under an electron microscope (TEM) at a magnification of ×20,000, 5 particles of the rubbery polymer (R) with a size of 1.0 μm or larger were randomly selected, and the ratio between the cross-sectional area of each rubbery polymer (R) particle and the area of the vinyl-based copolymer (Y) existing inside the cross-sectional area was determined and an average thereof was calculated. For the calculation of the area ratio, the TEM image was color-coded in black and white by automatic color coding performed by an image analysis software "WinROOF" manufactured by Mitani Corporation. With a value of 1.4 times of the "threshold value" at which 80% of the particle cross-sectional area is coded in white, the proportion of the white area, and the proportion of the black area being each defined as the critical value, the internal graft amount (Y) and the rubbery polymer amount (R), respectively, the internal graft ratio was calculated using Equation 3:

$$\text{Internal graft ratio (\%)}=(Y)/[(Y)+(R)]\times 100 \quad (3).$$

(4) Mode of Graft Polymerization

The mode of latex in the graft polymerization of the graft copolymer (A) was visually observed and evaluated based on the following criteria:

Good: No aggregate was observed in the latex.

Poor: Generation of a large amount of aggregates was observed in the latex.

(5) Weight-Average Molecular Weight [Mw]

For each of the acetone-soluble component of the graft copolymer (A), the vinyl-based copolymer (B) and the epoxy group-containing acryl-styrene-based copolymer (S) of the fifth composition group, the weight-average molecular weight [Mw] was measured using a gel permeation chromatography (GPC) apparatus manufactured by Water Corporation. As a detector, a differential refractometer WATER 2414 was used. As columns, two MIXED-B columns manufactured by Polymer Laboratories, Ltd. were used, and tetrahydrofuran was used as an eluent. The measurement was carried out at a flow rate of 1 ml/min and a column temperature of 40° C. From the measurement results, the weight-average molecular weight [Mw] was calculated in terms of polystyrene. The weight-average molecular weight [Mw] of the acrylic resin (V) of the seventh composition group was measured using the same apparatus and conditions as in the above-described case of the vinyl-based copolymer (B), except that weight-average molecular weight [Mw] was calculated in terms of polymethacrylate (PMMA). Further, the weight-average molecular weight [Mw] of the polylactic acid-based resin (F) of the seventh composition group was also measured using the same apparatus and conditions as in the above-described case of the vinyl-based copolymer (B), except that hexafluoroisopropanol was used as the eluent and the weight-average molecular weight [Mw] was calculated in terms of polymethyl methacrylate (PMMA).

(6) Charpy Impact Strength

The resin compositions described below as the second to eighth composition groups were each dried under the conditions shown in Table 1 and molded using a molding machine, SE-50DU manufactured by Sumitomo Heavy Industries, Ltd., under the conditions shown in Table 1, thereby obtaining dumbbell-form test molded articles. For each of the thus obtained molded articles, Charpy impact strength was measured in accordance with ISO 179.

TABLE 1

Drying Conditions and Molding Temperatures of Resin Compositions

| Number | (I) | Other thermoplastic resin (II) | Drying temperature (° C.) | Drying time (hour) | Molding temperature (° C.) |
|---|---|---|---|---|---|
| Examples 201 to 207 Comparative Examples 201 to 207 | Styrene-based resin | — | 80 | 3 | 230 |
| Examples 301 to 312 Comparative Examples 301 to 307 | | ethylene-carbon monoxide-(meth)acrylate copolymer | 80 | 3 | 230 |
| Examples 401 to 415 Comparative Examples 401 to 407 | | — | 80 | 3 | 230 |
| Examples 501 to 513 Comparative Examples 501 to 508 | | polyethylene terephalate resin | 105 | 5 | 260 |
| Examples 601 to 610 Comparative Examples 601 to 608 | | polyamide elastomer | 90 | 5 | 230 |
| Examples 701 to 709 Comparative Examples 701 to 708 | | polyactic acid-based resin | 80 | 3 | 220 |
| Examples 801 to 807 Comparative Examples 801 to 807 | | polycarbonate resin | 105 | 5 | 250 |

(7) Melt Flow Rate (MFR)

A pellet of the subject resin composition dried in an 80° C. hot-air dryer was measured in accordance with ISO 1133 (1997). The measurement was carried out at 260° C. with a load of 49N for Examples 501 to 513 and Comparative Examples 501 to 508; at 240° C. with a load of 98N for Examples 801 to 807 and Comparative Examples 801 to 807; and at 220° C. with a load of 98N for other Examples and Comparative Examples.

(8) Color Tone (YI Value)

The resin compositions described below as the second to eighth composition groups were each dried under the conditions shown in Table 1 and molded using a molding machine, SE-50DU manufactured by Sumitomo Heavy Industries, Ltd., under the conditions shown in Table 1, thereby obtaining plate-form test molded articles (length: 50 mm, width: 30 mm, thickness: 3 mm). The thus obtained molded articles were each evaluated in accordance with the yellowness measurement method prescribed in JIS K7105 (1981), 6.3.

(9) Surface Gloss and Outer Appearance

The resin composition of the second composition group was dried under the conditions shown in Table 1 and molded using a molding machine, SE-50DU manufactured by Sumitomo Heavy Industries, Ltd., under the condition shown in Table 1, thereby obtaining a plate-form test molded article (length: 50 mm, width: 30 mm, thickness: 3 mm) as a molded article. The thus obtained molded article was measured in accordance with the method prescribed in JIS Z8741 (1997).

The resin compositions of the third to eighth composition groups were each dried under the conditions shown in Table 1 and molded using a molding machine, SE-50DU manufactured by Sumitomo Heavy Industries, Ltd., under the conditions shown in Table 1, thereby obtaining plate-form test molded articles (length: 50 mm, width: 30 mm, thickness: 3 mm). The surfaces of the thus obtained molded articles were visually observed. An evaluation of "good" was given when no defect such as gel formation, layer delamination or occurrence of silver streak, and an evaluation of "poor" was given to other conditions.

(10) Chemical Resistance

The thermoplastic resin compositions of the third and fifth composition groups were each dried under the conditions shown in Table 1 and molded using a molding machine, SE-50DU manufactured by Sumitomo Heavy Industries, Ltd., under the conditions shown in Table 1, thereby preparing plate test pieces (length: 126 mm, width: 12.6 mm, thickness: 1.5 mm). The FIGURE the thus obtained plate test pieces were each fixed on a ¼ elliptical jig, which is a plate test piece crack generation apparatus, and a chemical solution was coated on the entire surface of the plate test piece I, which was then left to stand at a room temperature 23° C. and a humidity of 50% for 72 hours. The presence or absence of crack generation on each plate test piece was observed, and the distance X from the position of crack generation 101 was determined to calculate the critical strain (ϵ) using Equation (4). A critical strain (ϵ) of not less than 0.5% was evaluated as "satisfactory." As the chemical solution, a undiluted solution of a bathroom detergent, "BATH MAGICLEAN" ("MAGICLEAN": registered trademark) manufactured by Kao Corporation, was used.

$$\epsilon\ (\%)=bt/2a^2\{1-X^2(a^2-b^2)/a^4\}^{-3/2}\times 100 \quad (4)$$

a: Major axis of jig (=127 mm)

b: Minor axis of jig (=38 mm)

t: Test piece thickness (=1.5 mm)

X: Distance from the position of crack generation (mm)

(11) Flame Retardancy [V-2]

The thermoplastic resin composition described below as the fourth composition group was dried under the conditions shown in Table 1 and injection-molded using a molding machine, PS60E manufactured by Nissei Plastic Industrial Co., Ltd., thereby obtaining a 0.75-mm thick and 3-mm thick test pieces for evaluation of flame retardancy. For the thus obtained test pieces, the flame retardancy was evaluated in accordance with the evaluation criteria prescribed in UL94. Each combustion test piece was held vertically and 20-mm long blue flame was brought into contact with the center of the lower end of the combustion test piece for 10 seconds. The flame was removed thereafter and the combustion time was measured. After extinction of the first flame, flame was again brought into contact with the test piece for 10 seconds, and the combustion time and the glow extinction time were measured. The evaluation criteria were as follows:

[V-2]:

The test piece does not burn for 30 seconds or longer after each of the first and second flame contacts, and the glow extinction time after the second flame contact is 60 seconds or shorter. A gauze placed 30 cm below the test piece may be ignited. A total of 5 measurements (n=5) are carried out. Further, the total flaming combustion time of 5 combustion test pieces is 250 seconds or shorter.

[V-2NG]:

The test piece burns for longer than 30 seconds after each of the first and second flame contacts, or the glow extinction time after the second flame contact is 60 seconds or longer. A total of 5 measurements (n=5) are carried out. Further, the flame retardancy is also evaluated as "NG" when the total flaming combustion time of 5 combustion test pieces is longer than 250 seconds.

(12) Surface Specific Resistance

The thermoplastic resin composition of the sixth composition group was dried under the conditions shown in Table 1 and injection-molded using a molding machine, PS60E manufactured by Nissei Plastic Industrial Co., Ltd., thereby obtaining a 40 mm×50 mm×3 mm (thickness) plate molded article. This molded article was left to stand for 24 hours at a temperature of 23° C. and a humidity of 50% RH and subsequently measured in accordance with ASTM D257. A value was read after 1-minute application of voltage at an applied voltage of 500 V.

(13) Electrostatic Diffusivity Performance (Static Voltage and Static Voltage Decay Half-Life)

The plate molded article obtained in the above (12) was measured using a static honestmeter (manufactured by Shishido Electrostatic, Ltd.). With the distance between the molded article and a charging electrode being set at 15 mm and the distance between the molded article and a detection electrode being set at 10 mm, a voltage of 8 kV was applied for 1 minute and the static voltage was measured. For the static voltage decay half-life, the application of voltage was stopped and the time required for the static voltage to be reduced by half was measured. A lower static voltage and a shorter static voltage decay half-life are considered to represent superior electrostatic diffusivity performance.

(14) Charpy Impact Strength after Heat Holding

The thermoplastic resin composition described below as the seventh composition group was dried, and the thus dried thermoplastic resin composition was retained for 10 minutes in a cylinder of a molding machine, SE-50DU manufactured by Sumitomo Heavy Industries, Ltd., at a cylinder temperature of 220° C. and then injection-molded to obtain a test piece. The subsequent evaluation was carried out in accordance with ISO 179.

(15) Measurement of MFR after Heat Holding

The measurement was carried out for the thermoplastic resin composition described below as the seventh composition group, which was subjected to the MFR measurement conditions of the above (7) and further retained in the cylinder for 10 minutes.

(16) Evaluation of Thermal Stability

For the thermoplastic resin composition described below as the seventh composition group, the durability in heat holding was evaluated based on the rates of change in the Charpy impact strength and the MFR, which were calculated using the following equations where the respective initial values and post-heat holding values are defined as (I) and (H), respectively. That is, a lower rate of change means superior thermal stability.

$$\text{Rate of change in Charpy impact strength (\%)}=((I)-(H))/(I)\times 100$$

$$\text{Rate of change in MFR (\%)}=((H)-(I))/(I)\times 100$$

(17) Odor

For the thermoplastic resin composition described below as the seventh composition group, the presence or absence of an irritating odor was confirmed during melt-compounding and injection molding of the resulting pellet.

(18) Calculation of Biomass Level

For the thermoplastic resin composition described below as the seventh composition group, taking the total amount of the graft copolymer (A), the vinyl-based copolymer (B-4) and the polylactic acid-based resin (F) as 100% by mass, the content of natural rubber component and that of polylactic acid component were determined in terms of % by mass.

(19) Thermal Deformation Temperature

The thermoplastic resin composition described below as the eighth composition group was evaluated in accordance with ISO 75 at a load of 1.8 MPa.

The weight-average particle size and the ratio of the rubbery polymer (R) used in the production of the graft copolymer (A) are shown in Table 2.

TABLE 2

| Rubber Polymers used in Examples | | | | | |
|---|---|---|---|---|---|
| | Rubbery polymer | | | | |
| | Natural rubber | | | Synthetic rubber | |
| | Particle size (μm) | Ratio of particles of 1.0 μm or larger (% by mass) | Ratio in rubber (% by mass) | Particle size (μm) | Ratio in rubber (% by mass) |
| R-(1) | — | — | 0 | 0.3 | 100 |
| R-(2) | 0.6 | 24 | 25 | 0.3 | 75 |
| R-(3) | 0.6 | 24 | 50 | 0.3 | 50 |
| R-(4) | 0.6 | 24 | 25 | 0.2 | 75 |
| R-(5) | 0.6 | 24 | 80 | 0.3 | 20 |
| R-(6) | 0.9 | 40.5 | 25 | 0.3 | 75 |
| R-(7) | 1.5 | 53 | 25 | 0.3 | 75 |
| R-(8) | 0.6 | 24 | 25 | 0.08 | 75 |
| R-(9) | 0.6 | 24 | 100 | — | 0 |

The graft copolymers shown in the following Reference Examples relate to the thermoplastic resin composition of the first composition group.

Reference Example 1: Graft Copolymer [A-(1)]

In the presence of 50 parts by mass (in terms of solid content) of a polybutadiene latex [R-(1)] having a weight-average particle size of 0.3 μm, 130 parts by mass of pure water, 0.4 parts by mass of sodium formaldehyde sulfoxylate, 0.1 parts by mass of sodium ethylenediamine tetraacetate, 0.01 parts by mass of ferrous sulfate and 0.1 parts by mass of sodium pyrophosphate were supplied to a reaction vessel, and the atmosphere inside the reaction vessel was replaced with nitrogen. The temperature inside the reaction vessel was then adjusted to 60° C. and, under stirring, a monomer mixture of 6.7 parts by mass of styrene, 2.5 parts by mass of acrylonitrile and 0.046 parts by mass of t-dodecyl mercaptan (the amount of this monomer mixture corresponds to 18.4% by mass of all monomer mixtures) was initially added over a period of 0.5 hour. Subsequently, addition of an initiator mixture composed of 0.32 parts by mass of cumene hydroperoxide, 1.5 parts by mass of sodium laurate, which is an emulsifier, and 25 parts by mass of pure water was started to initiate polymerization. The initiator mixture was continuously added dropwise over a total period of 5 hours. Starting simultaneously with the start of the dropwise addition of the initiator mixture, a mixture of 29.8 parts by mass of styrene, 11 parts by mass of acrylonitrile and 0.15 parts by mass of t-dodecyl mercaptan was also continuously added dropwise over a period of 3 hours. For 2 hours after the dropwise addition of this monomer mixture, only the initiator mixture was continuously added dropwise, and the polymerization was terminated thereafter. The thus polymerized latex was coagulated with 1.5%-by-mass dilute sulfuric acid and then neutralized with sodium hydroxide, followed by washing, centrifugation and drying, thereby obtaining a powder-form graft copolymer [A-(1)]. This graft copolymer [A-(1)] had a graft ratio of 40% and an internal graft ratio of 42%, and the acetone-soluble component had a weight-average molecular weight [Mw] of 83,000.

Reference Example 2: Graft Copolymer [A-(2)]

In the presence of 37.5 parts by mass (in terms of solid content) of a polybutadiene latex having a weight-average particle size of 0.3 μm and 12.5 parts by mass (in terms of solid content) of a natural rubber latex containing 1.0 μm or larger particles at a ratio of 24% by mass and having a weight-average particle size of 0.6 μm [R-(2)], 130 parts by mass of pure water, 0.4 parts by mass of sodium formaldehyde sulfoxylate, 0.1 parts by mass of sodium ethylenediamine tetraacetate, 0.01 parts by mass of ferrous sulfate and 0.1 parts by mass of sodium pyrophosphate were supplied to a reaction vessel, and the atmosphere inside the reaction vessel was replaced with nitrogen. The temperature inside the reaction vessel was then adjusted to 60° C. and, under stirring, a monomer mixture of 5.84 parts by mass of styrene, 2.16 parts by mass of acrylonitrile and 0.03 parts by mass of t-dodecyl mercaptan (the amount of this monomer mixture corresponds to 16% by mass of all monomer mixtures) was initially added over a period of 0.5 hour. Subsequently, addition of an initiator mixture composed of 0.25 parts by mass of cumene hydroperoxide, 1.5 parts by mass of sodium laurate, which is an emulsifier, and 25 parts by mass of pure water was started to initiate polymerization. The initiator mixture was continuously added dropwise over a period of 6 hours. Starting simultaneously with the start of the dropwise addition of the initiator mixture, a monomer mixture of 30.66 parts by mass of styrene, 11.34 parts by mass of acrylonitrile and 0.16 parts by mass of t-dodecyl mercaptan was also continuously added dropwise over a period of 4 hours. For 2 hours after the dropwise addition of this monomer mixture, only the initiator mixture was continuously added dropwise, and the polymerization was terminated thereafter. The thus polymerized latex was coagulated with 1.5 parts-by-mass sulfuric acid and then neutralized with sodium hydroxide, followed by washing, centrifugation and drying, thereby obtaining a powder-form graft copolymer [A-(2)]. This graft copolymer [A-(2)] had a graft ratio of 39% and an internal graft ratio of 25%, and the acetone-soluble component had a weight-average molecular weight [Mw] of 83,000.

Reference Example 3: Graft Copolymer [A-(3)]

A powder-form graft copolymer [A-(3)] was obtained in the same manner as in Reference Example 2, except that the polybutadiene latex having a weight-average particle size of 0.3 μm was used in an amount of 37.5 parts by mass (in terms of solid content); that the natural rubber latex containing 1.0 μm or larger particles at a ratio of 24% by mass and having a weight-average particle size of 0.6 μm [R-(2)] was used in an amount of 12.5 parts by mass (in terms of solid content); that the initially added monomer mixture was changed to a monomer mixture of 18.25 parts by mass of styrene, 6.75 parts by mass of acrylonitrile and 0.1 parts by mass of t-dodecyl mercaptan (the amount of this monomer mixture corresponded to 50% by mass of all monomer mixtures); and that the continuously added monomer mixture was changed to a monomer mixture of 18.25 parts by mass of styrene, 6.75 parts by mass of acrylonitrile and 0.1 parts by mass of t-dodecyl mercaptan. This graft copolymer [A-(3)] had a graft ratio of 45% and an internal graft ratio of 33%, and the acetone-soluble component had a weight-average molecular weight [Mw] of 83,000.

Reference Example 4: Graft Copolymer [A-(4)]

A powder-form graft copolymer [A-(4)] was obtained in the same manner as in Reference Example 2, except that the polybutadiene latex having a weight-average particle size of 0.3 μm in an amount of 25 parts by mass (in terms of solid content) and a natural rubber latex containing 1.0 μm or larger particles at a ratio of 24% by mass and having a weight-average particle size of 0.6 μm [R-(3)] in an amount of 25 parts by mass (in terms of solid content) was used. This graft copolymer [A-(4)] had a graft ratio of 35% and an internal graft ratio of 24%, and the acetone-soluble component had a molecular weight [Mw] of 83,000.

Reference Example 5: Graft Copolymer [A-(5)]

A powder-form graft copolymer [A-(5)] was obtained in the same manner as in Reference Example 2, except that a polybutadiene latex, which is a synthetic rubber having a weight-average particle size of 0.2 μm in an amount of 37.5 parts by mass (in terms of solid content) and a natural rubber latex containing 1.0 μm or larger particles at a ratio of 24% by mass and having a weight-average particle size of 0.6 μm [R-(4)] in an amount of 12.5 parts by mass (in terms of solid content) was used. This graft copolymer [A-(5)] had a graft ratio of 42% and an internal graft ratio of 23%, and the acetone-soluble component had a molecular weight [Mw] of 83,000.

Reference Example 6: Graft Copolymer [A-(6)]

A powder-form graft copolymer [A-(6)] was obtained in the same manner as in Reference Example 3, except that a polybutadiene latex, which is a synthetic rubber having a weight-average particle size of 0.2 μm in an amount of 37.5 parts by mass (in terms of solid content) and a natural rubber latex containing 1.0 μm or larger particles at a ratio of 24% by mass and having a weight-average particle size of 0.6 μm [R-(4)] in an amount of 12.5 parts by mass (in terms of solid content) was used. This graft copolymer [A-(6)] had a graft ratio of 46% and an internal graft ratio of 32%, and the acetone-soluble component had a molecular weight [Mw] of 83,000.

Reference Example 7: Graft Copolymer [A-(7)]

A powder-form graft copolymer [A-(7)] was obtained in the same manner as in Reference Example 2, except that the polybutadiene latex having a weight-average particle size of 0.3 μm in an amount of 10 parts by mass (in terms of solid content) and a natural rubber latex containing 1.0 μm or larger particles at a ratio of 24% by mass and having a weight-average particle size of 0.6 μm [R-(5)] in an amount of 40 parts by mass (in terms of solid content) was used. This graft copolymer [A-(7)] had a graft ratio of 38% and an internal graft ratio of 23%, and the acetone-soluble component had a molecular weight [Mw] of 83,000.

Reference Example 8: Graft Copolymer [A-(8)]

A powder-form graft copolymer [A-(8)] was obtained in the same manner as in Reference Example 2, except that the polybutadiene latex having a weight-average particle size of 0.3 μm in an amount of 37.5 parts by mass (in terms of solid content) and a natural rubber latex containing 1.0 μm or larger particles at a ratio of 40.5% by mass and having a weight-average particle size of 0.9 μm [R-(6)] in an amount of 12.5 parts by mass (in terms of solid content) was used. This graft copolymer [A-(8)] had a graft ratio of 36% and an internal graft ratio of 21%, and the acetone-soluble component had a molecular weight [Mw] of 83,000.

Reference Example 9: Graft Copolymer [A-(9)]

A powder-form graft copolymer [A-(9)] was obtained in the same manner as in Reference Example 2, except that the polybutadiene latex having a weight-average particle size of 0.3 μm in an amount of 37.5 parts by mass (in terms of solid content) and a natural rubber latex containing 1.0 μm or larger particles at a ratio of 53% by mass and having a weight-average particle size of 1.5 μm [R-(7)] in an amount of 12.5 parts by mass (in terms of solid content) was used. This graft copolymer [A-(9)] had a graft ratio of 34% and an internal graft ratio of 16%, and the acetone-soluble component had a molecular weight [Mw] of 83,000.

Reference Example 10: Graft Copolymer (A-10)

A powder-form graft copolymer [A-(10)] was obtained in the same manner as in Reference Example 2, except that a polybutadiene latex having a weight-average particle size of 0.08 μm in an amount of 37.5 parts by mass (in terms of solid content) and a natural rubber latex containing 1.0 μm or larger particles at a ratio of 24% by mass and having a weight-average particle size of 0.6 μm [R-(8)] in an amount of 12.5 parts by mass (in terms of solid content) was used. This graft copolymer [A-(10)] had a graft ratio of 37% and an internal graft ratio of 24%, and the acetone-soluble component had a molecular weight [Mw] of 83,000.

Reference Example 11: Graft Copolymer (A-11)

To a reaction vessel, a 37.5 parts by mass (in terms of solid content) of a polybutadiene latex having a weight-average particle size of 0.3 μm, 12.5 parts by mass (in terms of solid content) of a natural rubber latex containing 1.0 μm or larger particles at a ratio of 24% by mass and having a weight-average particle size of 0.6 μm (R-2), 130 parts by mass of pure water, 0.4 parts by mass of sodium formaldehyde sulfoxylate, 0.1 parts by mass of sodium ethylenediamine tetraacetate, 0.01 parts by mass of ferrous sulfate and 0.1 parts by mass of sodium pyrophosphate were supplied, and the atmosphere inside the reaction vessel was replaced with nitrogen. The temperature inside the reaction vessel was then adjusted to 60° C., and addition of an initiator mixture composed of 0.25 parts by mass of cumene hydroperoxide, 1.5 parts by mass of sodium laurate, which is an emulsifier, and 25 parts by mass of pure water was started to initiate polymerization. The initiator mixture was continuously added dropwise over a period of 6 hours. Starting simultaneously with the start of the dropwise addition of the initiator mixture, a mixture of 36.5 parts by mass of styrene, 13.5 parts by mass of acrylonitrile and 0.2 parts by mass of t-dodecyl mercaptan was also continuously added dropwise over a period of 4 hours. For 2 hours after the dropwise addition of this monomer mixture, only the initiator mixture was continuously added dropwise, and the polymerization was terminated thereafter. The thus polymerized latex was coagulated with 1.5%-by-mass sulfuric acid and then neutralized with sodium hydroxide, followed by washing, centrifugation and drying, thereby obtaining a powder-form graft copolymer (A-11). This graft copolymer (A-11) had a graft ratio of 38% and an internal graft ratio of 10%, and the acetone-soluble component had a molecular weight [Mw] of 83,000.

Reference Example 12: Graft Copolymer (A-12)

In the presence of 50% by mass (in terms of solid content) of a natural rubber latex containing 1.0 μm or larger particles at a ratio of 24% by mass and having a weight-average particle size of 0.6 μm [R-(9)], 130 parts by mass of pure water, 0.4 parts by mass of sodium formaldehyde sulfoxylate, 0.1 parts by mass of sodium ethylenediamine tetraacetate, 0.01 parts by mass of ferrous sulfate, 0.1 parts by mass of sodium pyrophosphate and 0.25 parts by mass of potassium hydroxide were supplied to a reaction vessel, and the atmosphere inside the reaction vessel was replaced with nitrogen. The temperature inside the reaction vessel was adjusted to 60° C. and, under stirring, a monomer mixture of 18.25 parts by mass of styrene, 6.75 parts by mass of acrylonitrile and 0.1 parts by mass of t-dodecyl mercaptan (the amount of this monomer mixture corresponds to 50 parts by mass of all monomer mixtures) was initially added over a period of 1 hour. Subsequently, addition of an initiator mixture composed of 0.25 parts by mass of cumene hydroperoxide, 1.5 parts by mass of sodium laurate, which is an emulsifier, and 25 parts by mass of pure water was started to initiate polymerization. The initiator mixture was continuously added dropwise over a period of 6 hours. Starting simultaneously with the start of the dropwise addition of the initiator mixture, a monomer mixture of 18.25 parts by mass of styrene, 6.75 parts by mass of acrylonitrile and 0.1 parts by mass of t-dodecyl mercaptan was also continuously added dropwise over a period of 4 hours. For 2 hours after the dropwise addition of this monomer mixture, only the initiator mixture was continuously added dropwise, and the polymerization was terminated thereafter. The thus polymerized latex was coagulated with 1.5%-by-mass sulfuric acid and then neutralized with sodium hydroxide, followed by washing, centrifugation and drying, thereby obtaining a powder-form graft copolymer [A-(12)]. This graft copolymer [A-(12)] had a graft ratio of 43% and an internal graft ratio of 27%, and the acetone-soluble component had a molecular weight [Mw] of 83,000.

Reference Example 13: Graft Copolymer [A-(13)]

A vinyl monomer was prepared by mixing 45 parts by mass of styrene, 15 parts by mass of acrylonitrile and 0.25 parts by mass of t-dodecyl mercaptan. In addition, a solution in which 0.25 parts by mass of sodium pyrophosphate, 0.35 parts by mass of dextrose and 0.005 parts by mass of ferrous sulfate were dissolved in 10 parts by mass of pure water was prepared (this solution is hereinafter simply referred to as "RED aqueous solution-1"). Moreover, an aqueous solution in which 1 part by mass of potassium disproportionated rosinate and 0.3 parts by mass of diisopropylbenzene hydroperoxide were dissolved in 10 parts by mass of pure water was also prepared (this aqueous solution is hereinafter simply referred to as "OXI aqueous solution-1"). Then, 220 parts by mass of pure water, 10 parts by mass (in terms of solid content) of a natural rubber latex containing 1.0 μm or larger particles at a ratio of 24% by mass and having a weight-average particle size of 0.6 μm, and 30 parts by mass (in terms of solid content) of a polybutadiene latex [R-(2)] having a weight-average particle size of 0.3 μm were supplied to a reaction vessel. Further, 0.25 parts by mass of potassium disproportionated rosinate and 0.75 parts by mass of sodium salt of β-naphthalenesulfonic acid-formalin condensate were also supplied to the reaction vessel. The atmosphere inside the reaction vessel was replaced with nitrogen and nitrogen was allowed to flow therein continuously. The reaction vessel was heated to 40° C. while stirring the supplied components. Once the temperature of the reaction vessel reached 40° C., 85%-by-mass equivalent of the RED aqueous solution-1 was added to the reaction vessel. Immediately thereafter, both the vinyl monomer and 85%-by-mass equivalent of the OXI aqueous solution-1 were continuously added over a period of 5 hours to advance the reaction. From the start of polymerization, the reaction vessel was heated to an inner temperature of 60° C. and maintained at this temperature thereafter. Five hours after the start of polymerization, the remaining 15%-by-mass equivalent of the RED aqueous solution-1 and the remaining 15%-by-mass equivalent of the OXI aqueous solution-1 were added to the reaction vessel, which was subsequently maintained at the same temperature for 1 hour. Thereafter, the reaction vessel was cooled to terminate the polymerization. After the termination of the polymerization, the resulting reaction product was coagulated with 0.5 parts-by-mass aqueous magnesium sulfate solution, followed by washing, centrifugation and drying, thereby obtaining a powder-form graft copolymer [A-(13)]. This graft copolymer [A-(13)] had a graft ratio of 35% and an internal graft ratio of 8%, and the acetone-soluble component had a molecular weight [Mw] of 83,000.

The materials and properties of each graft copolymer (A) described in Reference Examples 1 to 13 are shown in Table 3.

TABLE 3

Graft Copolymer (A) used in Examples

| | | | | | | Graft Copolymer (A) | | |
|---|---|---|---|---|---|---|---|---|
| | Graft Copolymer | Rubbery Polymer | | Copolymerized monomer | | Graft | Internal graft ratio of particles | |
| Reference Example | (A) No. | Type | % by mass | Styrene % by mass | Acrylonitrile % by mass | Ratio (%) | of 0.1 μm or larger (%) | Polymerization mode |
| 1 | A-(1) | R-(1) | 50 | 36.5 | 13.5 | 40 | 42 | good |
| 2 | A-(2) | R-(2) | 50 | 36.5 | 13.5 | 39 | 25 | good |
| 3 | A-(3) | R-(2) | 50 | 36.5 | 13.5 | 45 | 33 | good |
| 4 | A-(4) | R-(3) | 50 | 36.5 | 13.5 | 35 | 24 | good |
| 5 | A-(5) | R-(4) | 50 | 36.5 | 13.5 | 42 | 23 | good |
| 6 | A-(6) | R-(4) | 50 | 36.5 | 13.5 | 46 | 32 | good |
| 7 | A-(7) | R-(5) | 50 | 36.5 | 13.5 | 38 | 23 | good |
| 8 | A-(8) | R-(6) | 50 | 36.5 | 13.5 | 36 | 21 | good |
| 9 | A-(9) | R-(7) | 50 | 36.5 | 13.5 | 34 | 16 | good |
| 10 | A-(10) | R-(8) | 50 | 36.5 | 13.5 | 37 | 24 | good |
| 11 | A-(11) | R-(2) | 50 | 36.5 | 13.5 | 38 | 10 | good |
| 12 | A-(12) | R-(9) | 50 | 36.5 | 13.5 | 43 | 27 | good |
| 13 | A-(13) | R-(2) | 40 | 45 | 15 | 35 | 8 | poor |

Reference Example 14: Vinyl-Based (Co)Polymer [B-(1)]

First, as a medium for suspension polymerization, a methyl methacrylate-acrylamide copolymer was produced. The concrete production method is described below.

To a reaction vessel, 80 parts by mass of acrylamide, 20 parts by mass of methyl methacrylate, 0.3 parts by mass of potassium persulfate and 1,800 parts by mass of ion-exchanged water were supplied, and the gas phase in the reaction vessel was replaced with nitrogen gas and maintained at 70° C. with thorough stirring. Reaction was continued until the monomers were completely converted into a polymer, thereby obtaining a binary copolymer of acrylamide and methyl methacrylate as an aqueous solution. The thus obtained reaction solution was a slightly cloudy, viscous aqueous solution. To this aqueous solution, 35 parts by mass of sodium hydroxide and ion-exchanged water were added to maintain the alkalinity of the solution as a 0.6% aqueous solution of acrylamide-methyl methacrylate binary copolymer. The aqueous solution was stirred at 70° C. for 2 hours and subsequently cooled to room temperature, thereby obtaining a transparent aqueous solution as a medium for suspension polymerization.

In a 20-L autoclave, 6 parts by mass of the thus obtained aqueous solution of the methyl methacrylate-acrylamide binary copolymer was supplied and stirred at 400 rpm, and the atmosphere in the system was replaced with nitrogen gas. After increasing the temperature to 70° C., a monomer mixture composed of 28.9 parts by mass of acrylonitrile, 11.1 parts by mass of styrene, 0.32 parts by mass of azobis-isobutyronitrile and 0.32 parts by mass of t-dodecyl mercaptan was added over a period of 30 minutes while stirring the reaction system, thereby initiating polymerization reaction. One hour after the addition of the monomer mixture, 15 parts by mass of styrene was added thereto using a feed pump. Thereafter, styrene was added to the reaction vessel three times at 30-minute intervals, each time in an amount of 15 parts by mass. After all of the monomers were added, the reaction system was heated to 100° C. over a period of 60 minutes. Thereafter, the temperature was maintained at 100° C. for 30 minutes, and the reaction system was subjected to cooling, polymer separation, washing and drying, thereby obtaining a vinyl-based (co)polymer [B-(1)] in the form of beads. The thus obtained vinyl-based (co) polymer [B-(1)] had a weight-average molecular weight [Mw] of 12,000.

Reference Example 15: Vinyl-Based (Co)Polymer [B-(2)]

A vinyl-based (co)polymer [B-(2)] was obtained in the form of beads in the same manner as in Reference Example 14, except that the initially added monomer mixture was composed of 24 parts by mass of acrylonitrile, 76 parts by mass of styrene and 0.3 parts by mass of t-dodecyl mercaptan; and that no further addition of a monomer mixture was made. The thus obtained vinyl-based (co)polymer [B-(2)] had a weight-average molecular weight [Mw] of 12,000.

The monomer ratios of the vinyl-based (co)polymers (B) described in Reference Examples 14 and 15 are shown in Table 4.

TABLE 4

Monomer Ratio of Vinyl-based (co)polymer (B)

| | | Copolymerized monomer | |
|---|---|---|---|
| Reference Example | Copolymer No. | Styrene % by mass | Acrylonitrile % by mass |
| 14 | B-(1) | 73 | 27 |
| 15 | B-(2) | 77 | 23 |

Examples 201 to 207, Comparative Examples 201 to 207

Introduced below is the thermoplastic resin composition of the second composition group. In accordance with the respective blending ratios shown in Tables 5 to 8, the graft copolymers (A) prepared in Reference Examples 1 to 13 were each blended with the vinyl-based polymer (B) prepared in Reference Example 14. As additives, 0.3 parts by mass of t-butylhydroxytoluene and 0.3 parts by mass of tri(nonylphenyl)phosphite were further added, and the resultant was mixed at 23° C. using a Henschel mixer. The resulting mixture was extruded into a gut form at an extrusion temperature of 230° C. using a 40-mmϕ extruder and then made into a pellet. The thus obtained pellet was injection-molded at a molding temperature of 230° C. and a mold temperature of 40° C., thereby preparing a test piece for evaluations. Physical properties were measured for the thus obtained test piece. The measurement results of Examples are shown in Tables 5 and 6, and those of Comparative Examples are shown in Tables 7 and 8.

TABLE 5

Evaluation Results of Physical Properties of Natural Rubber-containing Thermoplastic Resin Compositions

| | | | Example 201 | Example 202 | Example 203 | Example 204 |
|---|---|---|---|---|---|---|
| Styrene-based resin (I) | Graft copolymer (A) | Type | A-(2) | A-(3) | A-(4) | A-(5) |
| | | parts by mass | 32.4 | 32.4 | 32.4 | 32.4 |
| | Vinyl-based (co)polymer (B) | Type | B-(1) | B-(1) | B-(1) | B-(1) |
| | | parts by mass | 67.6 | 67.6 | 67.6 | 67.6 |
| Content of rubbery polymer with respect to styrene-based resin (I) | | parts by mass | 16.2 | 16.2 | 16.2 | 16.2 |
| Evaluation item | Charpy impact strength | $kJ/m^2$ | 24 | 28 | 22 | 33 |
| | MFR | g/10 min | 20 | 19 | 28 | 28 |
| | Color tone (YI) | — | 25 | 23 | 30 | 24 |
| | Surface gloss | % | 80 | 80 | 78 | 85 |
| | Polymerization mode of graft copolymer (A) | — | good | good | good | good |

TABLE 6

Evaluation Results of Physical Properties of Natural Rubber-containing Thermoplastic Resin Compositions

| | | | Example 205 | Example 206 | Example 207 |
|---|---|---|---|---|---|
| Styrene-based resin (I) | Graft copolymer (A) | Type | A-(6) | A-(2) | A-(8) |
| | | parts by mass | 32.4 | 70 | 32.4 |
| | Vinyl-based (co)polymer (B) | Type | B-(1) | B-(1) | B-(1) |
| | | parts by mass | 67.6 | 30 | 67.6 |
| Content of rubbery polymer with respect to styrene-based resin (I) | | parts by mass | 16.2 | 35 | 16.2 |
| Evaluation item | Charpy impact strength | $kJ/m^2$ | 39 | 38 | 28 |
| | MFR | g/10 min | 17 | 12 | 20 |
| | Color tone (YI) | — | 24 | 30 | 29 |
| | Surface gloss | % | 84 | 81 | 77 |
| | Polymerization mode of graft copolymer (A) | — | good | good | good |

TABLE 7

Evaluation of Physical Properties of Natural Rubber-containing Thermoplastic Resin Compositions

| | | | Comparative Example 201 | Comparative Example 202 | Comparative Example 203 | Comparative Example 204 |
|---|---|---|---|---|---|---|
| Styrene-based resin (I) | Graft copolymer (A) | Type | A-(1) | A-(7) | A-(9) | A-(10) |
| | | parts by mass | 32.4 | 32.4 | 32.4 | 32.4 |
| | Vinyl-based (co)polymer (B) | Type | B-(1) | B-(1) | B-(1) | B-(1) |
| | | parts by mass | 67.6 | 67.6 | 67.6 | 67.6 |
| Content of rubbery polymer with respect to styrene-based resin (I) | | parts by mass | 16.2 | 16.2 | 16.2 | 16.2 |
| Evaluation item | Charpy impact strength | $kJ/m^2$ | 19 | 15 | 13 | 16 |
| | MFR | g/10 min | 11 | 35 | 38 | 37 |

TABLE 7-continued

| Evaluation of Physical Properties of Natural Rubber-containing Thermoplastic Resin Compositions | | Comparative Example 201 | Comparative Example 202 | Comparative Example 203 | Comparative Example 204 |
|---|---|---|---|---|---|
| Color tone (YI) | — | 13 | 35 | 38 | 38 |
| Surface gloss | % | 96 | 75 | 69 | 83 |
| Polymerization mode of graft copolymer (A) | — | Good | good | good | good |

TABLE 8

Evaluation of Physical Properties of Natural Rubber-containing Thermoplastic Resin Compositions

| | | | Comparative Example 205 | Comparative Example 206 | Comparative Example 207 |
|---|---|---|---|---|---|
| Styrene-based resin (I) | Graft copolymer (A) | Type | A-(11) | A-(12) | A-(13) |
| | | parts by mass | 32.4 | 32.4 | 45.0 |
| | Vinyl-based (co)polymer (B) | Type | B-(1) | B-(1) | B-(1) |
| | | parts by mass | 67.6 | 67.6 | 55.0 |
| Content of rubbery polymer with respect to styrene-based resin (I) | | parts by mass | 16.2 | 16.2 | 18.0 |
| Evaluation item | Charpy impact strength | $kJ/m^2$ | 15 | 8 | 13 |
| | MFR | g/10 min | 30 | 21 | 32 |
| | Color tone (YI) | — | 30 | 40 | 42 |
| | Surface gloss | % | 80 | 63 | 78 |
| | Polymerization mode of graft copolymer (A) | — | good | good | good |

The thermoplastic resin compositions of Examples 201 to 207 all had an excellent balance of impact resistance, fluidity, color tone and surface gloss. Further, particularly because the particle size of the rubbery polymer (R) was controlled, these thermoplastic resin compositions had excellent impact resistance.

On the other hand, the resin composition obtained in Comparative Example 201, which did not contain any natural rubber that is a naturally-occurring material, showed poor impact resistance. The resin compositions obtained in Comparative Examples 202 to 204 were poor in terms of impact resistance, color tone and surface gloss. The resin composition obtained in Comparative Example 205 also had poor impact resistance. The resin composition obtained in Comparative Example 206 was poor in terms of impact resistance, color tone and surface gloss. The resin composition obtained in Comparative Example 207 had poor impact resistance and color tone. Furthermore, the graft copolymer [A-(13)] used in Comparative Example 207 was observed to generate a large amount of aggregates in the latex during the graft polymerization.

Reference Example 16: Ethylene-Carbon Monoxide-(Meth)acrylate Copolymer (C)

"ELVALOY" (registered trademark) HP-4051 manufactured by Mitsui-Dupont Polychemical K.K. was prepared.

Examples 301 to 312, Comparative Examples 301 to 307

Introduced below is the thermoplastic resin composition of the third composition group. In accordance with the respective blending ratios shown in Tables 9 to 12, the graft copolymers (A) prepared in Reference Examples 1 to 13 were each blended with the vinyl-based polymer (B) prepared in Reference Example 14 or 15 and the ethylene-carbon monoxide-(meth)acrylate copolymer (C) shown in Reference Example 16. As additives, 0.3 parts by mass of t-butylhydroxytoluene and 0.3 parts by mass of tri(nonylphenyl)phosphite were further added, and the resultant was mixed at 23° C. using a Henschel mixer. The resulting mixture was extruded into a gut form at an extrusion temperature of 230° C. using a 40-mmϕ extruder and then made into a pellet. The thus obtained pellet was injection-molded at a molding temperature of 230° C. and a mold temperature of 40° C., thereby preparing a test piece for evaluations. Physical properties were measured for the thus obtained test piece. The measurement results of Examples are shown in Tables 9 and 10, and those of Comparative Examples are shown in Tables 11 and 12.

TABLE 9

Evaluation Results of Physical Properties of Natural Rubber-containing Thermoplastic Resin Compositions

| | | | Example 301 | Example 302 | Example 303 | Example 304 | Example 305 | Example 306 |
|---|---|---|---|---|---|---|---|---|
| Styrene-based resin (I) | Graft copolymer (A) | Type | A-(2) | A-(3) | A-(4) | A-(5) | A-(6) | A-(2) |
| | | parts by mass | 32.4 | 32.4 | 32.4 | 32.4 | 32.4 | 70 |
| | Vinyl-based (co)polymer (B) | Type | B-(1) | B-(1) | B-(1) | B-(1) | B-(1) | B-(1) |
| | | parts by mass | 67.6 | 67.6 | 67.6 | 67.6 | 67.6 | 30 |
| Other thermoplastic resin (II) | Ethylene-carbon monoxide-(meth)acrylate copolymer (C) | parts by mass | 3 | 3 | 3 | 3 | 3 | 3 |
| Content of rubbery polymer in styrene-based resin (I) | | parts by mass | 16.2 | 16.2 | 16.2 | 16.2 | 16.2 | 35 |
| Evaluation item | Charpy impact strength | $kJ/m^2$ | 30 | 34 | 28 | 39 | 45 | 44 |
| | MFR | g/10 min | 21 | 20 | 29 | 29 | 18 | 13 |
| | Color tone (YI) | — | 24 | 22 | 29 | 23 | 23 | 29 |
| | Outer appearance | % | good | good | good | good | good | good |
| | Polymerization mode of graft copolymer (A) | — | good | good | good | good | good | good |
| | Chemical resistance | — | satisfactory | satisfactory | satisfactory | satisfactory | satisfactory | satisfactory |

TABLE 10

Evaluation Results of Physical Properties of Natural Rubber-containing Thermoplastic Resin Compositions

| | | | Example 307 | Example 308 | Example 309 | Example 310 | Example 311 | Example 312 |
|---|---|---|---|---|---|---|---|---|
| Styrene-based resin (I) | Graft copolymer (A) | Type | A-(8) | A-(4) | A-(4) | A-(4) | A-(4) | A-(4) |
| | | parts by mass | 32.4 | 32.4 | 32.4 | 32.4 | 32.4 | 32.4 |
| | Vinyl-based (co)polymer (B) | Type | B-(1) | B-(1) | B-(1) | B-(1) | B-(1) | B-(1) |
| | | parts by mass | 67.6 | 67.6 | 67.6 | 67.6 | 67.6 | 67.6 |
| Other thermoplastic resin (II) | Ethylene-carbon monoxide-(meth)acrylate copolymer (C) | parts by mass | 3 | 0.8 | 1 | 5 | 3 | 7 |
| Content of rubbery polymer in styrene-based resin (I) | | parts by mass | 16.2 | 16.2 | 16.2 | 16.2 | 16.2 | 16.2 |
| Evaluation item | Charpy impact strength | $kJ/m^2$ | 34 | 24 | 24 | 32 | 26 | 34 |
| | MFR | g/10 min | 21 | 28 | 28 | 30 | 34 | 32 |
| | Color tone (YI) | — | 28 | 30 | 30 | 28 | 26 | 27 |
| | Outer appearance | % | good | good | good | good | good | poor |
| | Polymerization mode of graft copolymer (A) | — | good | good | good | good | good | good |
| | Chemical resistance | — | satisfactory | satisfactory | satisfactory | satisfactory | satisfactory | satisfactory |

TABLE 11

Evaluation Results of Physical Properties of Natural Rubber-containing Thermoplastic Resin Compositions

| | | | Comparative Example 301 | Comparative Example 302 | Comparative Example 303 | Comparative Example 304 |
|---|---|---|---|---|---|---|
| Styrene-based resin (I) | Graft copolymer (A) | Type | A-(1) | A-(7) | A-(9) | A-(10) |
| | | parts by mass | 32.4 | 32.4 | 32.4 | 32.4 |
| | Vinyl-based (co)polymer (B) | Type | B-(1) | B-(1) | B-(1) | B-(1) |
| | | parts by mass | 67.6 | 67.6 | 67.6 | 67.6 |
| Other thermoplastic resin (II) | Ethylene-carbon monoxide-(meth)acrylate copolymer (C) | parts by mass | 1 | 1 | 1 | 1 |
| Content of rubbery polymer in styrene-based resin (I) | | parts by mass | 16.2 | 16.2 | 16.2 | 16.2 |

TABLE 11-continued

Evaluation Results of Physical Properties of Natural Rubber-containing Thermoplastic Resin Compositions

| | | | Comparative Example 301 | Comparative Example 302 | Comparative Example 303 | Comparative Example 304 |
|---|---|---|---|---|---|---|
| Evaluation item | Charpy impact strength | kJ/m$^2$ | 21 | 17 | 15 | 18 |
| | MFR | g/10 min | 11 | 35 | 38 | 37 |
| | Color tone (YI) | — | 13 | 35 | 38 | 38 |
| | Outer appearance | % | good | good | good | good |
| | Polymerization mode of graft copolymer (A) | — | good | good | good | good |
| | Chemical resistance | — | satisfactory | satisfactory | satisfactory | satisfactory |

TABLE 12

Evaluation Results of Physical Properties of Natural Rubber-containing Thermoplastic Resin Compositions

| | | | Comparative Example 305 | Comparative Example 306 | Comparative Example 307 |
|---|---|---|---|---|---|
| Styrene-based resin (I) | Graft copolymer (A) | Type | A-(11) | A-(12) | A-(13) |
| | | parts by mass | 32.4 | 32.4 | 45 |
| | Vinyl-based (co)polymer (B) | Type | B-(1) | B-(1) | B-(1) |
| | | parts by mass | 67.6 | 67.6 | 55 |
| Other thermoplastic resin (II) | Ethylene-carbon monoxide-(meth)acrylate copolymer (C) | parts by mass | 1 | 1 | 1 |
| Content of rubbery polymer in styrene-based resin (I) | | parts by mass | 16.2 | 16.2 | 18 |
| Evaluation item | Charpy impact strength | kJ/m$^2$ | 17 | 10 | 15 |
| | MFR | g/10 min | 30 | 21 | 32 |
| | Color tone (YI) | — | 30 | 40 | 42 |
| | Outer appearance | % | good | good | good |
| | Polymerization mode of graft copolymer (A) | — | good | good | poor |
| | Chemical resistance | — | satisfactory | satisfactory | satisfactory |

The thermoplastic resin compositions of Examples 301 to 311 all had an excellent balance of impact resistance, fluidity, color tone, outer appearance and chemical resistance. Further, particularly because the particle size of the rubbery polymer (R) was controlled, these thermoplastic resin compositions had excellent impact resistance. Moreover, in Example 312 where the blending ratio of the ethylene-carbon monoxide-(meth)acrylate copolymer (C) was increased, although the thermoplastic resin composition had poor outer appearance due to layer delamination, it showed excellent impact resistance, fluidity, color tone and chemical resistance.

On the other hand, the resin composition obtained in Comparative Example 301, which did not contain any natural rubber that is a naturally-occurring material, showed poor impact resistance. The resin compositions obtained in Comparative Examples 302 to 304 were poor in terms of impact resistance and color tone. The resin composition obtained in Comparative Example 305 also had poor impact resistance. The resin compositions obtained in Comparative Examples 306 and 307 were poor in terms of impact resistance and color tone. Furthermore, the graft copolymer [A-(13)] used in Comparative Example 307 was observed to generate a large amount of aggregates in the latex during the graft polymerization.

Reference Example 17: Phosphate-Based Flame Retardant (J)

Phosphate-Based Flame Retardant [J-(1)]

Resorcinol-bis(dixylyl phosphate) (trade name: PX200, manufactured by Daihachi Chemical Industry Co., Ltd., phosphorus content: 9.0%) was prepared.

Phosphate-based Flame Retardant [J-(2)]

Resorcinol-bis(diphenyl phosphate) (trade name: CR733S, manufactured by Daihachi Chemical Industry Co., Ltd., phosphorus content: 10.5%) was prepared.

Reference Example 18: Aromatic Carbonate Oligomer (K)

A solution A was prepared by dissolving 5.472 kg (24 mol) of bisphenol A, 6.0 g of hydrosulfide and 1.028 kg of p-tert-butyl phenol in 42.1 L of 8-wt % aqueous sodium hydroxide solution. Further, while stirring 24.0 L of dichloromethane and maintaining its temperature at 15° C., 3.0 kg of phosgene was allowed to pass therethrough over a period of 50 minutes, thereby preparing a solution B. Next, while stirring the solution A, the solution B was added thereto to allow reaction to proceed. After the reaction, 12.0 mL of triethylamine was added and the resulting mixture was stirred at 20 to 25° C. for about 1 hour to allow polymerization to take place. After completion of the polymerization, the reaction solution was separated into an aqueous phase and an organic phase, and the organic phase was neutralized with phosphoric acid, followed repetitive washing with water until the electrical conductivity of the washing liquid (water) became 10 μS/cm or less. The thus obtained polymer solution was added dropwise to warm water maintained at 45° C. and the solvent was subsequently removed by evaporation, thereby obtaining a white powder-form precipitate. This precipitate was recovered by filtration and dried at 110° C. for 24 hours to obtain an aromatic carbonate oligomer (K).

The thus obtained aromatic carbonate oligomer (K) had a limiting viscosity [η] of 0.19 dl/g at 20° C. It is known that the limiting viscosity [η] and the viscosity-average molecular weight [Mv] have a relationship represented by Schnell's viscosity formula: $[\eta]=1.23\times10^{-4}\times(Mv)^{0.83}$. As a result of conversion from the value of the limiting viscosity [η], [Mv] was determined to be 6,950. Further, as a result of analyzing the infrared absorption spectrum, absorption by carbonyl group was found at about 1,770 $cm^{-1}$ and absorption by ether bond was found at about 1,240 $cm^{-1}$; therefore, the aromatic carbonate oligomer (K) was confirmed to have a carbonate bond.

Reference Example 19: Aromatic Polycarbonate (L)

"TARFLON" (registered trademark) A1900 (bisphenol A polycarbonate resin manufactured by Idemitsu Petrochemical Co., Ltd; viscosity-average molecular weight [Mv]: 19,000, modified with a p-tert-butylphenoxy group at a terminal) was prepared.

Reference Example 20: Phosphorus-Containing Organic Compound-Based Antioxidant (M)

Distearyl pentaerythritol diphosphite (trade name: "ADK STAB" (registered trademark) PEP-8, manufactured by ADEKA Corporation) was prepared.

Reference Example 21: Silicone Compound (N)

Silicone powder (trade name: DC4-7081, manufactured by Dow Corning Toray Co., Ltd.) was prepared.

Examples 401 to 415, Comparative Examples 401 to 407

Introduced below is the thermoplastic resin composition of the fourth composition group. In accordance with the respective blending ratios shown in Tables 13 to 15, the graft copolymers (A) prepared in Reference Examples 1 to 13 were each blended with the vinyl-based (co)polymer (B) prepared in Reference Example 14 or 15, the phosphate-based flame retardant (J) shown in Reference Example 17, the aromatic carbonate oligomer (K) prepared in Reference Example 18, the phosphorus-containing organic compound-based antioxidant (M) shown in Reference Example 20 and the silicone compound (N) shown in Reference Example 21. After mixing these materials at 23° C. using a Henschel mixer, the resulting mixture was extruded into a gut form at an extrusion temperature of 230° C. using a 40-mmϕ extruder and then made into a pellet. The thus obtained pellet was injection-molded at a molding temperature of 230° C. and a mold temperature of 40° C., thereby preparing a test piece for evaluations. Physical properties were measured for the thus obtained test piece. The measurement results of Examples are shown in Tables 13 and 14, and those of Comparative Examples are shown in Table 15.

TABLE 13

Evaluation Results of Physical Properties of Natural Rubber-containing Thermoplastic Resin Compositions

| | | | Example 401 | Example 402 | Example 403 | Example 404 | Example 405 | Example 406 | Example 407 | Example 408 |
|---|---|---|---|---|---|---|---|---|---|---|
| Styrene-based resin (I) | Graft copolymer (A) | Type | A-(2) | A-(3) | A-(4) | A-(5) | A-(6) | A-(8) | A-(4) | A-(4) |
| | | parts by mass | 25 | 25 | 25 | 25 | 25 | 25 | 25 | 25 |
| | Vinyl-based (co)polymer (B) | Type | B-(1) | B-(1) | B-(1) | B-(1) | B-(1) | B-(1) | B-(2) | B-(1) |
| | | parts by mass | 75 | 75 | 75 | 75 | 75 | 75 | 75 | 75 |
| Other component | Phosphate-based flame retardant [J-(1)] | parts by mass | 8 | 8 | 8 | 8 | 8 | 8 | 8 | 8 |
| | Phosphate-based flame retardant [J-(2)] | parts by mass | 2 | 2 | 2 | 2 | 2 | 2 | 2 | 2 |
| | Aromatic polycarbonate oligomer (K) | parts by mass | 1 | 1 | 1 | 1 | 1 | 1 | 1 | 1 |
| | Aromatic polycarbonate (L) | parts by mass | | | | | | | | |
| | Phosphorus-containing organic compound-based antioxidant (M) | parts by mass | | | | | | | | 0.5 |
| | Silicone compound (N) | parts by mass | | | | | | | | |
| Content of rubbery polymer with respect to styrene-based resin (I) | | parts by mass | 12.5 | 12.5 | 12.5 | 12.5 | 12.5 | 12.5 | 12.5 | 12.5 |
| Evaluation item | Charpy impact strength | $kJ/m^2$ | 11 | 13 | 10 | 16 | 18 | 13 | 9 | 13 |
| | MFR | g/10 min | 30 | 29 | 38 | 38 | 27 | 30 | 40 | 38 |
| | Color tone (YI) | — | 23 | 21 | 28 | 22 | 22 | 27 | 26 | 28 |
| | Outer appearance | % | good | good | good | good | good | good | good | good |
| | Polymerization mode of graft copolymer (A) | — | good | good | good | good | good | good | good | good |
| | Flame retardancy (0.75-mm thick) | | V-2 | V-2 | V-2 | V-2 | V-2 | V-2 | V-2 | V-2 |

TABLE 13-continued

Evaluation Results of Physical Properties of Natural Rubber-containing Thermoplastic Resin Compositions

| | Example 401 | Example 402 | Example 403 | Example 404 | Example 405 | Example 406 | Example 407 | Example 408 |
|---|---|---|---|---|---|---|---|---|
| Flame retardancy (3-mm thick) | V-2 | V-2 | V-2 | V-2 | V-2 | V-2 | V-2 | V-2 |

TABLE 14

Evaluation Results of Physical Properties of Natural Rubber-containing Thermoplastic Resin Compositions

| | | | Example 409 | Example 410 | Example 411 | Example 412 | Example 413 | Example 414 | Example 415 |
|---|---|---|---|---|---|---|---|---|---|
| Styrene-based resin (I) | Graft copolymer (A) | Type | A-(4) | A-(4) | A-(4) | A-(4) | A-(4) | A-(4) | A-(4) |
| | | parts by mass | 25 | 25 | 25 | 25 | 25 | 25 | 25 |
| | Vinyl-based (co)polymer (B) | Type | B-(1) | B-(1) | B-(1) | B-(1) | B-(1) | B-(1) | B-(1) |
| | | parts by mass | 75 | 75 | 75 | 75 | 75 | 75 | 75 |
| Other component | Phosphate-based flame retardant [J-(1)] | parts by mass | 8 | 8 | 8 | 10 | 8 | 5 | 8 |
| | Phosphate-based flame retardant [J-(2)] | parts by mass | 2 | 2 | 2 | | 2 | | 2 |
| | Aromatic polycarbonate oligomer (K) | parts by mass | 1 | 1 | 2 | 1 | | 1 | |
| | Aromatic polycarbonate (L) | parts by mass | | | | | | | 1 |
| | Phosphorus-containing organic compound-based antioxidant (M) | parts by mass | | 0.5 | 0.5 | 0.5 | 0.5 | 0.5 | 0.5 |
| | Silicone compound (N) | parts by mass | 0.5 | 0.5 | 0.5 | 0.5 | 0.5 | 0.5 | 0.5 |
| Content of rubbery polymer with respect to styrene-based resin (I) | | parts by mass | 12.5 | 12.5 | 12.5 | 12.5 | 12.5 | 12.5 | 12.5 |
| Evaluation item | Charpy impact strength | $kJ/m^2$ | 10 | 10 | 9 | 10 | 11 | 13 | 11 |
| | MFR | g/10 min | 36 | 36 | 38 | 38 | 35 | 32 | 29 |
| | Color tone (YI) | — | 28 | 28 | 30 | 31 | 32 | 25 | 30 |
| | Outer appearance | % | good | good | good | good | good | good | good |
| | Polymerization mode of graft copolymer (A) | — | good | good | good | good | good | good | good |
| | Flame retardancy (0.75-mm thick) | | V-2 | V-2 | V-2 | V-2 | V-2 NG | V-2 NG | V-2 NG |
| | Flame retardancy (3-mm thick) | | V-2 | V-2 | V-2 | V-2 | V-2 NG | V-2 NG | V-2 NG |

TABLE 15

Evaluation Results of Physical Properties of Natural Rubber-containing Thermoplastic Resin Compositions

| | | | Comparative Example 401 | Comparative Example 402 | Comparative Example 403 | Comparative Example 404 | Comparative Example 405 | Comparative Example 406 | Comparative Example 407 |
|---|---|---|---|---|---|---|---|---|---|
| Styrene-based resin (I) | Graft copolymer (A) | Type | A-(1) | A-(7) | A-(9) | A-(10) | A-(11) | A-(12) | A-(13) |
| | | parts by mass | 25 | 25 | 25 | 25 | 25 | 25 | 45 |
| | Vinyl-based (co)polymer (B) | Type | B-(1) | B-(1) | B-(1) | B-(1) | B-(1) | B-(1) | B-(1) |
| | | parts by mass | 75 | 75 | 75 | 75 | 75 | 75 | 55 |
| Other component | Phosphate-based flame retardant [J-(1)] | parts by mass | 8 | 8 | 8 | 8 | 8 | 8 | 8 |
| | Phosphate-based flame retardant [J-(2)] | parts by mass | 2 | 2 | 2 | 2 | 2 | 2 | 2 |
| | Aromatic polycarbonate oligomer (K) | parts by mass | 1 | 1 | 1 | 1 | 1 | 1 | 1 |
| | Aromatic polycarbonate (L) | parts by mass | | | | | | | |

TABLE 15-continued

Evaluation Results of Physical Properties of Natural Rubber-containing Thermoplastic Resin Compositions

| | | | Comparative Example 401 | Comparative Example 402 | Comparative Example 403 | Comparative Example 404 | Comparative Example 405 | Comparative Example 406 | Comparative Example 407 |
|---|---|---|---|---|---|---|---|---|---|
| | Phosphorus-containing organic compound-based antioxidant (M) | parts by mass | | | | | | | |
| | Silicone compound (N) | parts by mass | | | | | | | |
| Content of rubbery polymer with respect to styrene-based resin (I) | | parts by mass | 12.5 | 12.5 | 12.5 | 12.5 | 12.5 | 12.5 | 18 |
| Evaluation item | Charpy impact Strength | $kJ/m^2$ | 9 | 7 | 6 | 8 | 8 | 4 | 6 |
| | MFR | g/10 min | 21 | 45 | 48 | 48 | 40 | 50 | 52 |
| | Color tone (YI) | — | 11 | 33 | 36 | 36 | 28 | 38 | 40 |
| | Outer appearance | % | good | good | good | good | good | good | good |
| | Polymerization mode of graft copolymer (A) | — | good | good | good | good | good | good | poor |
| | Flame retardancy (0.75-mm thick) | — | V-2 | V-2 | V-2 | V-2 | V-2 | V-2 | V-2 |
| | Flame retardancy (3-mm thick) | — | V-2 | V-2 | V-2 | V-2 | V-2 | V-2 | V-2 |

The thermoplastic resin compositions of Examples 401 and 412 had excellent impact resistance, fluidity, color tone and outer appearance and also had excellent flame retardancy. Further, particularly because the particle size of the rubbery polymer (R) was controlled, these thermoplastic resin compositions had excellent impact resistance.

The thermoplastic resin composition of Example 413, in which the aromatic carbonate oligomer (K) was not blended, had poor flame retardancy. However, it showed excellent impact resistance, fluidity, color tone and outer appearance. The thermoplastic resin composition of Example 414 contained only a small amount of the phosphate-based flame retardant [J-(1)] and thus had poor flame retardancy. However, it had excellent impact resistance, fluidity, color tone and outer appearance. The thermoplastic resin composition of Example 415 contained the aromatic polycarbonate (L) in place of the aromatic carbonate oligomer (K) and thus had poor flame retardancy. However, it also had excellent impact resistance, fluidity, color tone and outer appearance.

On the other hand, the resin composition obtained in Comparative Example 401, which did not contain any natural rubber that is a naturally-occurring material, showed poor impact resistance. The resin compositions obtained in Comparative Examples 402 to 404 were poor in terms of impact resistance and color tone. The resin composition obtained in Comparative Example 405 also had poor impact resistance. The resin compositions obtained in Comparative Examples 406 and 407 were poor in terms of impact resistance and color tone. Furthermore, the graft copolymer [A-(13)] used in Comparative Example 407 was observed to generate a large amount of aggregates in the latex during the graft polymerization.

Reference Example 22: Polyethylene Terephthalate Resin (D)

Polyethylene Terephthalate Resin [D-(1)]

A recycled pellet of a polyethylene terephthalate resin (manufactured by Kyoei Sangyo Co., Ltd.) was prepared.

Polyethylene Terephthalate Resin [D-(2)]

As a virgin pellet of a polyethylene terephthalate resin, TSB900 (manufactured by Toray Industries, Inc.) having an intrinsic viscosity, which was measured at 25° C. using an o-chlorophenol solvent, of 0.90 was prepared.

Reference Example 23: Epoxy Group-Containing Acryl-Styrene-Based Copolymer

Epoxy Group-Containing Acryl-Styrene-Based Copolymer [S-(1)]

An epoxy group-containing acryl-styrene-based copolymer (trade name: “ARUFON” (registered trademark) UG-4035, manufactured by Toagosei Co., Ltd.) [(S)-1], which contained glycidyl methacrylate, methyl (meth)acrylate and styrene as monomer units and had a weight-average molecular weight of 11,000 and an epoxy value of 1.8 meq/g, was prepared.

Epoxy Group-Containing Acryl-Styrene-Based Copolymer [S-(2)]

For production of an epoxy group-containing acryl-styrene-based copolymer [S-(2)] obtained by suspension polymerization of a monomer mixture containing 73 parts by mass of styrene, 23 parts by mass of acrylonitrile and 1 part by mass of glycidyl methacrylate, an epoxy group-containing acryl-styrene-based copolymer [S-(2)] having a weight-average molecular weight of 120,000 and an epoxy value of 0.007 meq/g was obtained in the same manner as in Reference Example 14 except that the initially added monomer mixture was changed to a monomer mixture of 13 parts by mass of styrene, 23 parts by mass of acrylonitrile, 1 part by mass of glycidyl methacrylate, 0.32 parts by mass of azobisisobutyronitrile and 0.32 parts by mass of t-dodecyl mercaptan, including the method of adding the remaining 60 parts by mass of styrene.

Examples 501 to 513, Comparative Examples 501 to 508

Introduced below is the thermoplastic resin composition of the fifth composition group. In accordance with the respective blending ratios shown in Tables 16 to 18, the graft copolymers (A) prepared in Reference Examples 1 to 13 were each blended with the vinyl-based (co)polymer (B) prepared in Reference Example 14 or 15, the polyethylene terephthalate resin (D) shown in Reference Example 22 and the epoxy group-containing acryl-styrene-based copolymer (S) shown in Reference Example 23. Using a vent-equipped 30-mm biaxial extruder, the resulting mixture was melt-kneaded and extruded at a cylinder preset temperature of 260° C. to produce a pellet-form thermoplastic resin composition. The thus obtained thermoplastic resin composition was pre-dried for 5 hours in a 105° C. hot-air dryer and then molded into the shape of multi-purpose test piece A prescribed by ISO 3167 (2002) (total length: 150 mm, test section width: 10 mm, thickness: 4 mm) using an electric injection molding machine, SE50 manufactured by Sumitomo Heavy Industries, Ltd., at a cylinder temperature of 260° C. and a mold temperature of 60° C. For the thus obtained test piece, the Charpy impact strength was measured. Further, the thermoplastic resin composition was also molded into a square shape plate molded article (thickness: 3 mm), for which color tone and outer appearance were evaluated. For the thus obtained test piece, physical properties were measured. The measurement results of Examples are shown in Tables 16 and 17, and those of Comparative Examples are shown in Table 18.

TABLE 16

Evaluation Results of Physical Properties of Natural Rubber-containing Thermoplastic Resin Compositions

| | | | Example 501 | Example 502 | Example 503 | Example 504 | Example 505 | Example 506 | Example 507 |
|---|---|---|---|---|---|---|---|---|---|
| Styrene-based resin (I) | Graft copolymer (A) | Type | A-(2) | A-(3) | A-(4) | A-(5) | A-(6) | A-(8) | A-(4) |
| | | parts by mass | 20 | 20 | 20 | 20 | 20 | 20 | 20 |
| | Vinyl-based (co)polymer (B) | Type | B-(1) | B-(1) | B-(1) | B-(1) | B-(1) | B-(1) | B-(2) |
| | | parts by mass | 50 | 50 | 50 | 50 | 50 | 50 | 50 |
| Other thermoplastic resin (II) | Polyethylene terephthalate (recycled PET) resin [D-(1)] | parts by mass | 30 | 30 | 30 | 30 | 30 | 30 | 30 |
| | Polyethylene terephthalate (virgin PET) resin [D-(2)] | parts by mass | | | | | | | |
| Other component | Epoxy group-containing acryl-styrene-based copolymer [S-(1)] | parts by mass | 0.1 | 0.1 | 0.1 | 0.1 | 0.1 | 0.1 | 0.1 |
| | Epoxy group-containing acryl-styrene-based copolymer [S-(2)] | parts by mass | | | | | | | |
| Content of rubbery polymer in styrene-based resin (I) | | parts by mass | 14.3 | 14.3 | 14.3 | 14.3 | 14.3 | 14.3 | 14.3 |
| Evaluation item | Charpy impact strength | $kJ/m^2$ | 16 | 19 | 15 | 23 | 27 | 19 | 13 |
| | MFR | g/10 min | 22 | 21 | 30 | 30 | 19 | 22 | 34 |
| | Color tone (YI) | — | 31 | 29 | 36 | 30 | 30 | 35 | 33 |
| | Outer appearance | — | good | good | good | good | good | good | good |
| | Polymerization mode of graft copolymer (A) | — | good | good | good | good | good | good | good |
| | Chemical resistance | — | satisfactory | satisfactory | satisfactory | satisfactory | satisfactory | satisfactory | satisfactory |

TABLE 17

Evaluation Results of Physical Properties of Natural Rubber-containing Thermoplastic Resin Compositions

| | | | Example 508 | Example 509 | Example 510 | Example 511 | Example 512 | Example 513 |
|---|---|---|---|---|---|---|---|---|
| Styrene-based resin (I) | Graft copolymer (A) | Type | A-(4) | A-(4) | A-(4) | A-(4) | A-(4) | A-(4) |
| | | parts by mass | 20 | 20 | 20 | 20 | 20 | 20 |
| | Vinyl-based (co)polymer (B) | Type | B-(1) | B-(1) | B-(1) | B-(1) | B-(1) | B-(1) |
| | | parts by mass | 50 | 50 | 65 | 50 | 50 | 50 |
| Other thermoplastic resin (II) | Polyethylene terephthalate (recycled PET) resin [D-(1)] | parts by mass | 30 | 30 | 15 | | 30 | 30 |
| | Polyethylene terephthalate (virgin PET) resin [D-(2)] | parts by mass | | | | 30 | | |
| Other component | Epoxy group-containing acryl-styrene-based copolymer [S-(1)] | parts by mass | 0.05 | 0.5 | 0.1 | 0.1 | 2 | |
| | Epoxy group-containing acryl-styrene-based copolymer [S-(2)] | parts by mass | | | | | | 14 |
| Content of rubbery polymer in styrene-based resin (I) | | parts by mass | 14.3 | 14.3 | 11.8 | 14.3 | 14.3 | 14.3 |
| Evaluation item | Charpy impact strength | $kJ/m^2$ | 14 | 16 | 19 | 19 | 14 | 16 |
| | MFR | g/10 min | 32 | 27 | 33 | 24 | 21 | 19 |
| | Color tone (YI) | — | 36 | 37 | 32 | 36 | 36 | 34 |
| | Outer appearance | — | good | good | good | good | poor | poor |
| | Polymerization mode of graft copolymer (A) | — | good | good | good | good | good | good |
| | Chemical resistance | — | satisfactory | satisfactory | satisfactory | satisfactory | satisfactory | satisfactory |

TABLE 18

Evaluation Results of Physical Properties of Natural Rubber-containing Thermoplastic Resin Compositions

| | | | Comparative Example 501 | Comparative Example 502 | Comparative Example 503 | Comparative Example 504 | Comparative Example 505 | Comparative Example 506 | Comparative Example 507 | Comparative Example 508 |
|---|---|---|---|---|---|---|---|---|---|---|
| Styrene-based resin (I) | Graft copolymer (A) | Type | A-(1) | A-(9) | A-(7) | A-(9) | A-(10) | A-(11) | A-(12) | A-(13) |
| | | parts by mass | 20 | 20 | 20 | 20 | 20 | 20 | 20 | 20 |
| | Vinyl-based (co)polymer (B) | Type | B-(1) | B-(1) | B-(1) | B-(1) | B-(1) | B-(1) | B-(1) | B-(1) |
| | | parts by mass | 50 | 50 | 50 | 50 | 50 | 50 | 50 | 50 |
| Other thermoplastic resin (II) | Polyethylene terephthalate (recycled PET) resin [D-(1)] | parts by mass | 30 | 30 | 30 | 30 | 30 | 30 | 30 | 30 |
| Epoxy group-containing copolymer (S) | Epoxy group-containing acryl-styrene-based copolymer [S-(1)] | parts by mass | 0.1 | | 0.1 | 0.1 | 0.1 | 0.1 | 0.1 | 0.1 |
| Content of rubbery polymer in styrene-based resin (I) | | parts by mass | 14.3 | 14.3 | 14.3 | 14.3 | 14.3 | 14.3 | 14.3 | 14.3 |
| Evaluation item | Charpy impact strength | $kJ/m^2$ | 13 | 3 | 10 | 9 | 11 | 10 | 5 | 9 |
| | MFR | g/10 min | 13 | 52 | 37 | 40 | 39 | 32 | 23 | 34 |
| | Color tone (YI) | — | 19 | 44 | 41 | 44 | 44 | 36 | 46 | 48 |
| | Outer appearance | — | good | Good | good | good | good | good | good | good |
| | Polymerization mode of graft copolymer (A) | — | good | Good | good | good | good | good | good | poor |
| | Chemical resistance | — | satisfactory | Satisfactory | satisfactory | satisfactory | satisfactory | satisfactory | satisfactory | satisfactory |

The thermoplastic resin compositions of Examples 501 to 511 all had an excellent balance of impact resistance, fluidity, color tone, outer appearance and chemical resistance. Further, particularly because the particle size of the rubbery polymer (R) was controlled and the epoxy group-containing acryl-styrene-based copolymer (S) was incorporated, these thermoplastic resin compositions had an even more excellent impact resistance.

The thermoplastic resin composition of Example 512 contained a large amount of the epoxy group-containing acryl-styrene-based copolymer [S-(1)] and thus had a tendency to exhibit poor outer appearance due to generation of a gel compound. However, this thermoplastic resin composition was excellent in terms of impact resistance, fluidity, color tone and chemical resistance.

The thermoplastic resin composition of Example 513, in which the epoxy group-containing acryl-styrene-based copolymer [S-(2)] was used in place of the epoxy group-containing acryl-styrene-based copolymer [S-(1)], also had a tendency to exhibit poor outer appearance due to generation of a gel compound. However, this thermoplastic resin composition had an excellent balance of impact resistance, fluidity, color tone and chemical resistance.

On the other hand, the resin composition obtained in Comparative Example 501, which did not contain any natural rubber that is a naturally-occurring material, had poor impact resistance. The resin compositions obtained in Comparative Examples 502 to 505 were poor in terms of impact resistance and color tone. The resin composition obtained in Comparative Example 506 also had poor impact resistance. The resin compositions obtained in Comparative Examples 507 and 508 were poor in terms of impact resistance and color tone. Furthermore, the graft copolymer [A-(13)] used in Comparative Example 508 was observed to generate a large amount of aggregates in the latex during the graft polymerization.

Reference Example 24: Polyamide Elastomer (E)

To a reaction vessel, 45 parts by mass of ε-caprolactam, 45 parts by mass of a bisphenol A-ethylene oxide adduct having a number-average molecular weight [Mn] of 1,800, 5 parts by mass of polyethylene glycol having a number-average molecular weight [Mn] of 1,800, 5.2 parts by mass of terephthalic acid and 0.2 parts by mass of "IRGANOX" (registered trademark) 1098 (antioxidant) were supplied, and the reaction vessel was purged with nitrogen. After heating the supplied materials with stirring for 60 minutes at a temperature of 260° C. to obtain a transparent and homogenous solution, the pressure was reduced to 0.07 kPa or less. To the thus obtained solution, 0.1 parts by mass of tetrabutyl titanate was added, and the resultant was allowed to react for 2 hours under a reduced pressure of 0.07 kPa or less and a temperature of 260° C. The thus obtained polymer was extruded into the form of a strand, which was subsequently cut to prepare a pellet-form polyamide elastomer (E).

Reference Example 25: Preparation of Carboxyl Group-Containing Modified Vinyl-Based Copolymer (T)

A monomer mixture composed of 70 parts by mass of styrene, 25 parts by mass of acrylonitrile and 5 parts by mass of methacrylic acid was subjected to 5-hour suspension polymerization at a temperature of 65° C. to 95° C. using ordinary initiator and chain transfer agent, thereby preparing a modified vinyl-based polymer (T) in the form of beads. The limiting viscosity (in methyl ethyl ketone, 30° C.) was measured to be 0.60 dl/g.

Examples 601 to 610, Comparative Examples 601 to 608

Introduced below is the thermoplastic resin composition of the sixth composition group. In accordance with the respective blending ratios shown in Tables 19 to 22, the graft copolymers (A) prepared in Reference Examples 1 to 13 were each blended with the vinyl-based (co)polymer (B) prepared in Reference Example 14 or 15, the polyamide elastomer (E) prepared in Reference Example 24 and the carboxyl group-containing modified vinyl-based copolymer (T) prepared in Reference Example 25. Using a vent-equipped 30-mm biaxial extruder, the resulting mixture was melt-kneaded and extruded at a cylinder preset temperature of 230° C. to produce a pellet-form thermoplastic resin composition.

The thus obtained thermoplastic resin composition was pre-dried for 5 hours in a 90° C. hot-air dryer and then molded into the shape of multi-purpose test piece A prescribed by ISO 3167 (2002) (total length: 150 mm, test section width: 10 mm, thickness: 4 mm) using an electric injection molding machine, SE50 manufactured by Sumitomo Heavy Industries, Ltd., at a cylinder temperature of 230° C. and a mold temperature of 60° C. For the thus obtained test piece, the Charpy impact strength was measured. Further, the thermoplastic resin composition was also molded into a plate molded article (thickness: 3 mm), for which surface specific resistance and electrostatic diffusivity performance (static voltage and static voltage decay half-life) were evaluated. For the thus obtained test piece, physical properties were measured. The measurement results of Examples are shown in Tables 19 and 20, and those of Comparative Examples are shown in Tables 21 and 22.

TABLE 19

Evaluation Results of Physical Properties of Natural Rubber-containing Thermoplastic Resin Compositions

| | | | Example 601 | Example 602 | Example 603 | Example 604 | Example 605 |
|---|---|---|---|---|---|---|---|
| Styrene-based resin (I) | Graft copolymer (A) | Type | A-(2) | A-(3) | A-(4) | A-(5) | A-(6) |
| | | parts by mass | 28 | 28 | 28 | 28 | 28 |
| | Vinyl-based (co)polymer (B) | Type | B-(1) | B-(1) | B-(1) | B-(1) | B-(1) |
| | | parts by mass | 56 | 56 | 56 | 56 | 56 |
| Other thermoplastic resin (II) | Polyamide elastomer (E) | parts by mass | 16 | 16 | 16 | 16 | 16 |
| Other component | Modified vinyl-based copolymer (T) | parts by mass | 5 | 5 | 5 | 5 | 5 |
| Content of rubbery polymer in styrene-based resin (I) | | parts by mass | 14 | 14 | 14 | 14 | 14 |
| Evaluation item | Charpy impact strength | $kJ/m^2$ | 16 | 19 | 15 | 23 | 27 |
| | MFR | g/10 min | 24 | 23 | 32 | 32 | 21 |
| | Color tone (YI) | — | 27 | 25 | 32 | 26 | 26 |
| | Outer appearance | % | good | good | good | good | good |
| | Polymerization mode of graft copolymer (A) | — | good | good | good | good | good |
| | Surface specific resistance | Ω | $4 \times 10^{12}$ | $2 \times 10^{12}$ | $4 \times 10^{12}$ | $2 \times 10^{12}$ | $4 \times 10^{12}$ |
| | Static voltage | V | 1300 | 1280 | 1310 | 1260 | 1320 |
| | Static voltage decay half-life | seconds | 1 | 1 | 1 | 1 | 1 |

TABLE 20

Evaluation Results of Physical Properties of Natural Rubber-containing Thermoplastic Resin Compositions

| | | | Example 606 | Example 607 | Example 608 | Example 609 | Example 610 |
|---|---|---|---|---|---|---|---|
| Styrene-based resin (I) | Graft copolymer (A) | Type | A-(8) | A-(4) | A-(4) | A-(4) | A-(4) |
| | | parts by mass | 28 | 28 | 28 | 28 | 28 |
| | Vinyl-based (co)polymer (B) | Type | B-(1) | B-(1) | B-(1) | B-(1) | B-(2) |
| | | parts by mass | 56 | 56 | 56 | 56 | 56 |
| Other thermoplastic resin (II) | Polyamide elastomer (E) | parts by mass | 16 | 16 | 16 | 16 | 16 |
| Other component | Modified vinyl-based copolymer (T) | parts by mass | 5 | 3 | 8 | 25 | 5 |
| Content of rubbery polymer in styrene-based resin (I) | | parts by mass | 14 | 14 | 14 | 14 | 14 |
| Evaluation item | Charpy impact strength | $kJ/m^2$ | 19 | 14 | 16 | 13 | 13 |
| | MFR | g/10 min | 24 | 34 | 29 | 8 | 37 |
| | Color tone (YI) | — | 29 | 31 | 33 | 34 | 29 |
| | Outer appearance | % | good | good | poor | poor | good |

TABLE 20-continued

Evaluation Results of Physical Properties of Natural Rubber-containing Thermoplastic Resin Compositions

| | | | Example 606 | Example 607 | Example 608 | Example 609 | Example 610 |
|---|---|---|---|---|---|---|---|
| | Polymerization mode of graft copolymer (A) | — | good | good | good | good | good |
| | Surface specific resistance | Ω | $4 \times 10^{12}$ | $3 \times 10^{12}$ | $4 \times 10^{12}$ | $8 \times 10^{12}$ | $4 \times 10^{12}$ |
| | Static voltage | V | 1300 | 1280 | 1300 | 1410 | 1310 |
| | Static voltage decay half-life | seconds | 1 | 1 | 1 | 1.5 | 1 |

TABLE 21

Evaluation Results of Physical Properties of Natural Rubber-containing Thermoplastic Resin Compositions

| | | | Comparative Example 601 | Comparative Example 602 | Comparative Example 603 | Comparative Example 604 |
|---|---|---|---|---|---|---|
| Styrene-based resin (I) | Graft copolymer (A) | Type | A-(1) | A-(9) | A-(7) | A-(9) |
| | | parts by mass | 28 | 28 | 28 | 28 |
| | Vinyl-based (co)polymer (B) | Type | B-(1) | B-(1) | B-(1) | B-(1) |
| | | parts by mass | 56 | 56 | 56 | 56 |
| Other thermoplastic resin (II) | Polyamide elastomer (E) | parts by mass | 16 | 16 | 16 | 16 |
| Other component | Modified vinyl-based copolymer (T) | parts by mass | 5 | | 5 | 5 |
| Content of rubbery polymer in styrene-based resin (I) | | parts by mass | 14 | 14 | 14 | 14 |
| Evaluation item | Charpy impact strength | $kJ/m^2$ | 10 | 3 | 10 | 9 |
| | MFR | g/10 min | 17 | 49 | 41 | 44 |
| | Color tone (YI) | — | 15 | 38 | 37 | 40 |
| | Outer appearance | % | good | good | good | good |
| | Polymerization mode of graft copolymer (A) | — | good | good | good | good |
| | Surface specific resistance | Ω | $4 \times 10^{12}$ | $2 \times 10^{12}$ | $5 \times 10^{12}$ | $5 \times 10^{12}$ |
| | Static voltage | V | 1310 | 1240 | 1360 | 1340 |
| | Static voltage decay half-life | seconds | 1 | 1 | 1 | 1 |

TABLE 22

Evaluation Results of Physical Properties of Natural Rubber-containing Thermoplastic Resin Compositions

| | | | Comparative Example 605 | Comparative Example 606 | Comparative Example 607 | Comparative Example 608 |
|---|---|---|---|---|---|---|
| Styrene-based resin (I) | Graft copolymer (A) | Type | A-(10) | A-(11) | A-(12) | A-(13) |
| | | parts by mass | 28 | 28 | 28 | 35 |
| | Vinyl-based (co)polymer (B) | Type | B-(1) | B-(1) | B-(1) | B-(1) |
| | | parts by mass | 56 | 56 | 56 | 49 |
| Other thermoplastic resin (II) | Polyamide elastomer (E) | parts by mass | 16 | 16 | 16 | 16 |
| Other component | Modified vinyl-based copolymer (T) | parts by mass | 5 | 5 | 5 | 5 |
| Content of rubbery polymer in styrene-based resin (I) | | parts by mass | 14 | 14 | 14 | 14 |
| Evaluation item | Charpy impact strength | $kJ/m^2$ | 11 | 10 | 8 | 7 |
| | MFR | g/10 min | 43 | 36 | 27 | 34 |
| | Color tone (YI) | — | 40 | 32 | 42 | 44 |
| | Outer appearance | % | good | good | good | good |
| | Polymerization mode of graft copolymer (A) | — | good | good | good | poor |
| | Surface specific resistance | Ω | $4 \times 10^{12}$ | $4 \times 10^{12}$ | $4 \times 10^{12}$ | $4 \times 10^{12}$ |
| | Static voltage | V | 1300 | 1300 | 1310 | 1300 |
| | Static voltage decay half-life | seconds | 1 | 1 | 1 | 1 |

The thermoplastic resin compositions of Examples 601 to 607 and 610 all had an excellent balance of impact resistance, fluidity, color tone, outer appearance, surface specific resistance and electrostatic diffusivity performance. Further, particularly because the particle size of the rubbery polymer (R) was controlled and the modified vinyl-based copolymer (T) was incorporated in an appropriate amount, these thermoplastic resin compositions had an even more excellent impact resistance.

The thermoplastic resin compositions of Examples 608 and 609 contained a large amount of the modified vinyl-based copolymer (T) and thus had a tendency to exhibit poor outer appearance due to generation of a gel compound. However, these thermoplastic resin compositions also had an excellent balance of impact resistance, fluidity, color tone, surface specific resistance and electrostatic diffusivity performance.

On the other hand, the resin composition obtained in Comparative Example 601, which did not contain any natural rubber, showed poor impact resistance. The resin compositions obtained in Comparative Examples 602 to 605 were poor in terms of impact resistance and color tone. The resin composition obtained in Comparative Example 606 also had poor impact resistance. The resin composition obtained in Comparative Example 607 was poor in terms of impact resistance and color tone. The composition obtained in Comparative Example 608 was also poor in terms of impact resistance and color tone. Furthermore, the graft copolymer [A-(13)] used in Comparative Example 608 was observed to generate a large amount of aggregates in the latex during the graft polymerization.

Reference Example 26: Polylactic Acid Resin (F)

A polylactic acid resin manufactured by NatureWorks LLC (weight-average molecular weight: 200,000, a poly-L-lactic acid resin which contains 1% by mol of D-lactic acid unit and has a melting point of 175° C.) was prepared.

Reference Example 27: Phosphoric Acid and/or Monosodium Phosphate (U)

Phosphoric acid (0.5 mol/L aqueous solution) (manufactured by Kanto Chemical Co., Inc.) [U-(1)] was prepared.

Anhydrous monosodium phosphate (manufactured by Taiyo Chemical Industry Co., Ltd.) [U-(2)] was also prepared.

Reference Example 28: Acrylic Resin (V)

A polymethyl methacrylate resin (“SUMIPEX” (registered trademark) MH, manufactured by Sumitomo Chemical Co., Ltd.) was prepared.

Examples 701 to 709, Comparative Examples 701 to 708

Introduced below is the thermoplastic resin composition of the seventh composition group. In accordance with the respective blending ratios shown in Tables 23 to 26, the graft copolymers (A) prepared in Reference Examples 1 to 13 were each dry-blended with the vinyl-based (co)polymer (B) prepared in Reference Example 14 or 15, the polylactic acid (F) shown in Reference Example 26, the phosphoric acid and/or monosodium phosphate (U) shown in Reference Example 27 and the acrylic resin (V) shown in Reference Example 28. Then, using a biaxial screw extruder (“TEX-30”, manufactured by The Japan Steel Works, Ltd.) at an extrusion temperature of 220° C., the resultant was melt-kneaded and made into a pellet. The thus obtained pellet was injection-molded using an injection molding machine (“IS55EPN Injection Molding Machine”, manufactured by Toshiba Machine Co., Ltd.) at a molding temperature of 220° C. and a mold temperature of 60° C., thereby preparing a test piece. Various physical properties were measured and evaluated for the thus obtained test piece. The evaluation results of Examples are shown in Tables 23 and 24, and those of Comparative Examples are shown in Tables 25 and 26.

TABLE 23

Evaluation Results of Physical Properties of Natural Rubber-containing Thermoplastic Resin Compositions

| | | | Example 701 | Example 702 | Example 703 | Example 704 |
|---|---|---|---|---|---|---|
| Styrene-based resin (I) | Graft copolymer (A) | Type | A-(2) | A-(2) | A-(4) | A-(6) |
| | | parts by mass | 60 | 30 | 30 | 30 |
| | Vinyl-based (co)polymer (B) | Type | B-(1) | B-(1) | B-(1) | B-(1) |
| | | parts by mass | 35 | 40 | 40 | 40 |
| Other thermoplastic resin (II) | Polylactic acid (F) | parts by mass | 5 | 30 | 30 | 30 |
| Other component | Acrylic resin (V) | parts by mass | | | | |
| | Phosphoric acid (U-(1)) | parts by mass | 0.2 | 0.1 | 0.1 | 0.1 |
| | Monosodium phosphate (U-(2)) | parts by mass | | | | |
| Content of rubbery polymer in styrene-based resin (I) | | parts by mass | 31.6 | 21.4 | 21.4 | 21.4 |
| Evaluation item | Charpy impact strength | $kJ/m^2$ | 40 | 23 | 25 | 26 |
| | MFR | g/10 min | 17 | 21 | 30 | 24 |
| | Color tone (YI) | — | 18 | 5 | 10 | 4 |
| | Surface gloss | % | good | good | good | good |
| | Polymerization mode of graft copolymer (A) | — | good | good | good | good |
| | Charpy impact strength after heat holding | $kJ/m^2$ | 37 | 21 | 23 | 24 |
| | MFR after heat holding | g/10 min | 20 | 24 | 34 | 27 |

TABLE 23-continued

Evaluation Results of Physical Properties of Natural Rubber-containing Thermoplastic Resin Compositions

| | | | Example 701 | Example 702 | Example 703 | Example 704 |
|---|---|---|---|---|---|---|
| | Change in Charpy impact strength | % | 7.5 | 8.7 | 8 | 7.7 |
| | Change in MFR | % | 15 | 12.5 | 11.8 | 11.1 |
| | Load-deflection temperature (0.45 MPa) | ° C. | 90 | 81 | 81 | 82 |
| | Oder during melt-compounding or molding | — | none | none | none | none |
| | Biomass level | % | 12.5 | 33.8 | 37.5 | 33.8 |

TABLE 24

Evaluation Results of Physical Properties of Natural Rubber-containing Thermoplastic Resin Compositions

| | | | Example 705 | Example 706 | Example 707 | Example 708 | Example 709 |
|---|---|---|---|---|---|---|---|
| Styrene-based resin (I) | Graft copolymer (A) | Type | A-(8) | A-(4) | A-(4) | A-(2) | A-(2) |
| | | parts by mass | 30 | 40 | 15 | 30 | 30 |
| | Vinyl-based (co)polymer (B) | Type | B-(1) | B-(1) | B-(1) | B-(1) | B-(2) |
| | | parts by mass | 40 | 20 | 25 | 35 | 40 |
| Other thermoplastic resin (II) | Polylactic acid (F) | parts by mass | 30 | 40 | 60 | 30 | 30 |
| Other component | Acrylic resin (V) | parts by mass | | | | | |
| | Phosphoric acid (U-(1)) | parts by mass | | 0.1 | 0.1 | 0.1 | 0.1 |
| | Monosodium phosphate (U-(2)) | parts by mass | 0.25 | | | | |
| Content of rubbery polymer in styrene-based resin (I) | | parts by mass | 21.4 | 33.3 | 18.8 | 23.1 | 21.4 |
| Evaluation item | Charpy impact strength | $kJ/m^2$ | 24 | 29 | 18 | 32 | 23 |
| | MFR | g/10 min | 20 | 45 | 52 | 17 | 33 |
| | Color tone (YI) | — | 9 | 6 | 4 | 10 | 7 |
| | Surface gloss | % | good | good | good | good | good |
| | Polymerization mode of graft copolymer (A) | — | good | good | good | good | good |
| | Charpy impact strength after heat holding | $kJ/m^2$ | 21 | 26 | 15 | 29 | 21 |
| | MFR after heat holding | g/10 min | 23 | 49 | 60 | 20 | 37 |
| | Change in Charpy impact strength | % | 12.5 | 10.3 | 16.7 | 9.4 | 8.7 |
| | Change in MFR | % | 13 | 8.2 | 13.3 | 15 | 10.8 |
| | Load-deflection temperature (0.45 MPa) | ° C. | 81 | 71 | 60 | 82 | 81 |
| | Oder during melt-compounding or molding | — | none | none | none | none | none |
| | Biomass level | % | 33.8 | 50 | 63.8 | 33.8 | 33.8 |

TABLE 25

Evaluation Results of Physical Properties of Natural Rubber-containing Thermoplastic Resin Compositions

| | | | Comparative Example 701 | Comparative Example 702 | Comparative Example 703 | Comparative Example 704 |
|---|---|---|---|---|---|---|
| Styrene-based resin (I) | Graft copolymer (A) | Type | A-(1) | A-(1) | A-(9) | A-(7) |
| | | parts by mass | 30 | 30 | 30 | 30 |
| | Vinyl-based (co)polymer (B) | Type | B-(1) | B-(1) | B-(1) | B-(1) |
| | | parts by mass | 40 | 20 | 40 | 40 |
| Other thermoplastic resin (II) | Polylactic acid (F) | parts by mass | 30 | 50 | 30 | 30 |

TABLE 25-continued

Evaluation Results of Physical Properties of Natural Rubber-containing Thermoplastic Resin Compositions

| | | | Comparative Example 701 | Comparative Example 702 | Comparative Example 703 | Comparative Example 704 |
|---|---|---|---|---|---|---|
| Other component | Acrylic resin (V) | parts by mass | | | | |
| | Phosphoric acid (U-(1)) | parts by mass | 0.1 | 0.1 | | 0.1 |
| | Monosodium phosphate (U-(2)) | parts by mass | | | | |
| Content of rubbery polymer in styrene-based resin (I) | | parts by mass | 21.4 | 30 | 21.4 | 21.4 |
| Evaluation item | Charpy impact strength | $kJ/m^2$ | 19 | 20 | 12 | 15 |
| | MFR | g/10 min | 23 | 38 | 32 | 40 |
| | Color tone (YI) | — | 2 | 2 | 7 | 15 |
| | Surface gloss | % | good | good | good | good |
| | Polymerization mode of graft copolymer (A) | — | good | good | good | good |
| | Charpy impact strength after heat holding | $kJ/m^2$ | 18 | 17 | 8 | 13 |
| | MFR after heat holding | g/10 min | 25 | 45 | 44 | 44 |
| | Change in Charpy impact strength | % | 5.3 | 15 | 33.3 | 13.3 |
| | Change in MFR | % | 8 | 15.6 | 37.5 | 9.1 |
| | Load-deflection temperature (0.45 MPa) | ° C. | 81 | 61 | 80 | 81 |
| | Oder during melt-compounding or molding | — | none | none | none | none |
| | Biomass level | % | 30 | 50 | 33.8 | 42 |

TABLE 26

Evaluation Results of Physical Properties of Natural Rubber-containing Thermoplastic Resin Compositions

| | | | Comparative Example 705 | Comparative Example 706 | Comparative Example 707 | Comparative Example 708 |
|---|---|---|---|---|---|---|
| Styrene-based resin (I) | Graft copolymer (A) | Type | A-(9) | A-(10) | A-(11) | A-(12) |
| | | parts by mass | 30 | 30 | 30 | 30 |
| | Vinyl-based (co)polymer (B) | Type | B-(1) | B-(1) | B-(1) | B-(1) |
| | | parts by mass | 40 | 40 | 40 | 40 |
| Other thermoplastic resin (II) | Polylactic acid (F) | parts by mass | 30 | 30 | 30 | 30 |
| Other component | Acrylic resin (V) | parts by mass | | | | |
| | Phosphoric acid (U-(1)) | parts by mass | 0.1 | 0.1 | 0.1 | 0.1 |
| | Monosodium phosphate (U-(2)) | parts by mass | | | | |
| Content of rubbery polymer in styrene-based resin (I) | | parts by mass | 21.4 | 21.4 | 21.4 | 21.4 |
| Evaluation item | Charpy impact strength | $kJ/m^2$ | 17 | 17 | 16 | 13 |
| | MFR | g/10 min | 32 | 31 | 29 | 45 |
| | Color tone (YI) | — | 18 | 18 | 10 | 21 |
| | Surface gloss | % | good | good | good | good |
| | Polymerization mode of graft copolymer (A) | — | good | good | good | good |
| | Charpy impact strength after heat holding | $kJ/m^2$ | 15 | 15 | 14 | 10 |
| | MFR after heat holding | g/10 min | 36 | 35 | 33 | 49 |
| | Change in Charpy impact strength | % | 11.8 | 11.8 | 12.5 | 23.1 |
| | Change in MFR | % | 11.1 | 11.4 | 12.1 | 8.2 |
| | Load-deflection temperature (0.45 MPa) | ° C. | 81 | 81 | 81 | 81 |
| | Oder during melt-compounding or molding | — | none | none | none | none |
| | Biomass level | % | 33.8 | 33.8 | 33.8 | 45 |

As clearly seen from the results of Examples 701 to 709, by producing the rubber-containing graft copolymer (A) with a specific internal graft ratio by blending prescribed amounts of natural and synthetic rubbers each having a specific particle size, more environmentally friendly resin compositions having a superior balance of properties such as high impact resistance, good fluidity and color tone, as compared to conventional resin compositions containing only the polylactic acid-based resin (F) were provided without having to introduce a complicated deproteinization treatment. In addition, by incorporating the phosphoric acid [U-(1)] and/or the monosodium phosphate [U-(2)], the impact resistance and the thermal stability were further improved.

On the other hand, the resin composition obtained in Comparative Example 701, which did not contain any natural rubber that is a naturally-occurring material, had low impact resistance. In the resin composition obtained in Comparative Example 702, since a natural rubber was not used and the polylactic acid-based resin (F) having a low thermal deformation temperature was used, although the biomass level was comparable to that of the resin composition of Example 706, the thermal deformation temperature was greatly reduced. The resin compositions obtained in Comparative Examples 703 to 708 had poor impact resistance and color tone.

Reference Example 29: Polycarbonate Resin (G)

"IUPILON" (registered trademark) S2000 manufactured by Mitsubishi Engineering-Plastics Corporation was prepared (this polycarbonate resin has a melt volume rate, which is measured in accordance with ISO 1133 at 300° C. under a load of 1.2 kgf, of 10 cm3/10 min).

Examples 801 to 807, Comparative Examples 801 to 807

Introduced below is the thermoplastic resin composition of the eighth composition group. In accordance with the respective ratios shown in Tables 27 and 28, the graft copolymers (A) prepared in Reference Examples 1 to 13 were each blended with the vinyl-based (co)polymer (B) prepared in Reference Example 14 or 15 and the polycarbonate resin (G) shown in Reference Example 29. The resulting mixture was stirred for 1 minute using a blender and subsequently melt-kneaded using a unidirectionally-rotating biaxial extruder having a screw diameter of 30 mm ("PCM-30", manufactured by Ikegai Machinery Co.; temperature range: 240 to 250° C.). The molten resin extruded from a die nozzle was received by a cutter via a water tank and then cut to obtain a resin pellet. Thereafter, using a molding machine (SE50DU Injection Molding Machine, manufactured by Sumitomo Heavy Industries, Ltd.; molding temperature: 250° C., mold temperature: 60° C.), the thus obtained resin pellet was made into a test piece suitable for evaluation of various physical properties. The evaluation results of Examples are shown in Table 27 and those of Comparative Examples are shown in Table 28.

TABLE 27

Evaluation Results of Physical Properties of Natural Rubber-containing Thermoplastic Resin Compositions

| | | | Example 801 | Example 802 | Example 803 | Example 804 | Example 805 | Example 806 | Example 807 |
|---|---|---|---|---|---|---|---|---|---|
| Styrene-based resin (I) | Graft copolymer (A) | Type | A-(2) | A-(3) | A-(4) | A-(5) | A-(6) | A-(8) | A-(4) |
| | | parts by mass | 10 | 10 | 10 | 10 | 10 | 10 | 10 |
| | Vinyl-based (co)polymer (B) | Type | B-(1) | B-(1) | B-(1) | B-(1) | B-(1) | B-(1) | B-(2) |
| | | parts by mass | 30 | 30 | 30 | 30 | 30 | 30 | 30 |
| Other thermoplastic resin (II) | Polycarbonate resin (G) | parts by mass | 60 | 60 | 60 | 60 | 60 | 60 | 60 |
| Content of rubbery polymer in styrene-based resin (I) | | parts by mass | 12.5 | 12.5 | 12.5 | 12.5 | 12.5 | 12.5 | 12.5 |
| Evaluation item | Charpy impact strength | $kJ/m^2$ | 58 | 57 | 60 | 58 | 59 | 56 | 58 |
| | MFR | g/10 min | 25 | 26 | 27 | 26 | 27 | 25 | 29 |
| | Color tone (YI) | — | 14 | 13 | 17 | 13 | 13 | 16 | 13 |
| | Surface gloss | % | good | good | good | good | good | good | good |
| | Polymerization mode of graft copolymer (A) | — | good | good | good | good | good | good | good |
| | Thermal deformation temperature | ° C. | 101 | 103 | 100 | 102 | 100 | 101 | 100 |

TABLE 28

Evaluation Results of Physical Properties of Natural Rubber-containing Thermoplastic Resin Compositions

| | | | Comparative Example 801 | Comparative Example 802 | Comparative Example 803 | Comparative Example 804 | Comparative Example 805 | Comparative Example 806 | Comparative Example 807 |
|---|---|---|---|---|---|---|---|---|---|
| Styrene-based resin (I) | Graft copolymer (A) | Type | A-(1) | A-(7) | A-(9) | A-(10) | A-(11) | A-(12) | A-(13) |
| | | parts by mass | 10 | 10 | 10 | 10 | 10 | 10 | 12.5 |

TABLE 28-continued

Evaluation Results of Physical Properties of Natural Rubber-containing Thermoplastic Resin Compositions

| | | | Comparative Example 801 | Comparative Example 802 | Comparative Example 803 | Comparative Example 804 | Comparative Example 805 | Comparative Example 806 | Comparative Example 807 |
|---|---|---|---|---|---|---|---|---|---|
| | Vinyl-based (co)polymer (B) | Type | B-(1) | B-(1) | B-(1) | B-(1) | B-(1) | B-(1) | B-(1) |
| | | parts by mass | 30 | 30 | 30 | 30 | 30 | 30 | 27.5 |
| Other Thermoplastic resin (II) | Polycarbonate resin (G) | parts by mass | 60 | 60 | 60 | 60 | 60 | 60 | 60 |
| Content of rubbery polymer in styrene-based resin (I) | | parts by mass | 12.5 | 12.5 | 12.5 | 12.5 | 12.5 | 12.5 | 12.5 |
| Evaluation item | Charpy impact Strength | $kJ/m^2$ | 49 | 45 | 45 | 43 | 46 | 47 | 48 |
| | MFR | g/10 min | 26 | 20 | 22 | 23 | 30 | 20 | 31 |
| | Color tone (YI) | — | 12 | 18 | 19 | 19 | 17 | 20 | 21 |
| | Surface gloss | % | good | good | good | good | good | good | good |
| | Polymerization mode of graft copolymer (A) | — | good | good | good | good | good | good | poor |
| | Thermal deformation temperature | ° C. | 101 | 101 | 102 | 101 | 103 | 101 | 102 |

The thermoplastic resin compositions of Examples 801 to 807 all had an excellent balance of impact resistance, fluidity, color tone and outer appearance. Further, particularly because the particle size of the rubbery polymer (R) was controlled, these thermoplastic resin compositions had excellent impact resistance.

On the other hand, the resin composition obtained in Comparative Example 701, which did not contain any natural rubber that is a naturally-occurring material, had poor impact resistance. The resin compositions obtained in Comparative Examples 802 to 805 had poor impact resistance and color tone. The resin compositions obtained in Comparative Examples 806 and 807 also had poor impact resistance and color tone. Furthermore, the graft copolymer [A-(13)] used in Comparative Example 807 was observed to generate a large amount of aggregates in the latex during the graft polymerization.

INDUSTRIAL APPLICABILITY

The natural rubber-containing thermoplastic resin composition not only shows balanced physical properties of impact resistance, fluidity, color tone and outer appearance, but also has excellent moldability and, depending on the condition, excellent cost performance. Therefore, it can be widely utilized in the application fields such as home electric appliances, communication-related devices and general merchandise.

The invention claimed is:

1. A natural rubber-containing thermoplastic resin composition comprising a graft copolymer (A) obtained by graft-polymerizing 1) a vinyl monomer mixture (a) comprising at least an aromatic vinyl monomer to 2) a rubbery polymer (R) composed of 10 to 70% by mass of a non-deproteinized natural rubber having a weight-average particle size of 0.3 to 1.2 μm and 30 to 90% by mass of a synthetic rubber having a weight-average particle size of 0.2 to 0.4 μm, wherein particles of said natural rubber include not less than 5% by mass of natural rubber particles with a size of 1.0 μm or larger; and particles of said rubbery polymer (R) with a size of 1.0 μm or larger have an internal graft ratio of 20% or higher.

2. The composition according to claim 1, wherein said graft copolymer (A) is obtained by graft-polymerizing 35 to 95 parts by mass of said vinyl monomer mixture (a) to 5 to 65 parts by mass of said rubbery polymer (R); and said vinyl monomer mixture (a) is composed of 60 to 80% by mass of said aromatic vinyl monomer, 20 to 40% by mass of a cyanovinyl monomer and 0 to 20% by mass of a vinyl monomer copolymerizable with these monomers.

3. The composition according to claim 1, wherein said graft copolymer (A) is obtained by graft-polymerizing 40 to 60 parts by mass of said vinyl monomer mixture (a) to 40 to 60 parts by mass of said rubbery polymer (R); and said vinyl monomer mixture (a) is composed of 60 to 80% by mass of said aromatic vinyl monomer, 20 to 40% by mass of a cyanovinyl monomer and 0 to 10% by mass of a vinyl monomer copolymerizable with these monomers.

4. The composition according to claim 1, comprising a styrene-based resin (I) obtained by mixing said graft copolymer (A) and a vinyl-based copolymer (B) obtained by copolymerizing a vinyl monomer mixture (b) comprising at least an aromatic vinyl monomer.

5. The composition according to claim 4, wherein said vinyl monomer mixture (b) is composed of 60 to 80% by mass of said aromatic vinyl monomer, 20 to 40% by mass of a cyanovinyl monomer and 0 to 10% by mass of a vinyl monomer copolymerizable with these monomers.

6. The composition according to claim 4, comprising said rubbery polymer (R) in an amount of 5 to 50% by mass in a total of 100% by mass of said graft copolymer (A) and said vinyl-based copolymer (B) that constitute said styrene-based resin (I).

7. The composition according to claim 4, further comprising another thermoplastic resin (II).

8. A natural rubber-containing thermoplastic resin composition comprising:

the graft copolymer (A) according to claim 1; and a polyethylene terephthalate resin (D), said natural rubber-containing thermoplastic resin composition comprising an epoxy group-containing acryl-styrene-based copolymer (S) in an amount of 0.01 to 1 part by mass with respect to a total of 100 parts by mass of a styrene-based resin (I) and said polyethylene terephthalate resin (D), said styrene-based resin (I) comprising said graft copolymer (A).

9. The composition according to claim 8, wherein said epoxy group-containing acryl-styrene-based copolymer (S) has a weight-average molecular weight [Mw] of 2,000 to 20,000.

10. The composition according to claim 8, wherein said epoxy group-containing acryl-styrene-based copolymer (S) has an epoxy value of 0.5 to 4.0 (meq/g).

11. A molded article obtained by molding the composition according to claim 1.

12. A method of producing the composition according to claim 1 comprising, in graft polymerization of said vinyl monomer mixture (a) to said rubbery polymer (R) comprising said natural rubber, the steps of:

contacting not less than 10% by mass of said vinyl monomer mixture (a) with said rubbery polymer (R) for 30 minutes or longer; and subsequently graft-polymerizing said vinyl monomer mixture (a) to said rubbery polymer (R).

13. The composition according to claim 2, comprising a styrene-based resin (I) obtained by mixing said graft copolymer (A) and a vinyl-based copolymer (B) obtained by copolymerizing a vinyl monomer mixture (b) comprising at least an aromatic vinyl monomer.

14. The composition according to claim 3, comprising a styrene-based resin (I) obtained by mixing said graft copolymer (A) and a vinyl-based copolymer (B) obtained by copolymerizing a vinyl monomer mixture (b) comprising at least an aromatic vinyl monomer.

15. The composition according to claim 5, comprising said rubbery polymer (R) in an amount of 5 to 50% by mass in a total of 100% by mass of said graft copolymer (A) and said vinyl-based copolymer (B) that constitute said styrene-based resin (I).

16. The composition according to claim 5, further comprising another thermoplastic resin (II).

17. The composition according to claim 6, further comprising another thermoplastic resin (II).

18. The composition according to claim 9, wherein said epoxy group-containing acryl-styrene-based copolymer (S) has an epoxy value of 0.5 to 4.0 (meq/g).

19. A method of producing the composition according to claim 2 comprising, in graft polymerization of said vinyl monomer mixture (a) to said rubbery polymer (R) comprising said natural rubber, the steps of:

contacting not less than 10% by mass of said vinyl monomer mixture (a) with said rubbery polymer (R) for 30 minutes or longer; and subsequently graft-polymerizing said vinyl monomer mixture (a) to said rubbery polymer (R).

20. A method of producing the composition according to claim 3 comprising, in graft polymerization of said vinyl monomer mixture (a) to said rubbery polymer (R) comprising said natural rubber, the steps of:

contacting not less than 10% by mass of said vinyl monomer mixture (a) with said rubbery polymer (R) for 30 minutes or longer; and subsequently graft-polymerizing said vinyl monomer mixture (a) to said rubbery polymer (R).

* * * * *

UNITED STATES PATENT AND TRADEMARK OFFICE

CERTIFICATE OF CORRECTION

PATENT NO. : 9,701,820 B2
APPLICATION NO. : 14/427745
DATED : July 11, 2017
INVENTOR(S) : Shibata et al.

It is certified that error appears in the above-identified patent and that said Letters Patent is hereby corrected as shown below:

In the Specification

In Column 63
At Table 8, at Comparative Example 207, change "good" to --poor--.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*